(12) United States Patent
Saito

(10) Patent No.: US 8,224,031 B2
(45) Date of Patent: Jul. 17, 2012

(54) ROAD LINE RECOGNITION APPARATUS

(75) Inventor: Toru Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1302 days.

(21) Appl. No.: 11/410,103

(22) Filed: Apr. 25, 2006

(65) Prior Publication Data

US 2006/0239509 A1    Oct. 26, 2006

(30) Foreign Application Priority Data

Apr. 26, 2005 (JP) .................................. 2005-127732
Feb. 6, 2006 (JP) .................................. 2006-028808

(51) Int. Cl.
*G06K 9/00* (2006.01)
*H04N 17/02* (2006.01)
*G08G 1/00* (2006.01)

(52) U.S. Cl. ........ 382/104; 382/103; 382/106; 382/154; 701/117; 348/187

(58) Field of Classification Search .................. 382/100, 382/103, 104, 106, 107, 154, 199, 209, 266, 382/269; 340/901, 902, 903, 904, 905, 906, 340/907, 908, 438, 439, 938, 939, 988; 701/23, 701/28, 29, 36, 40, 41, 44, 70, 93, 96, 98, 701/116, 117, 225; 348/113, 149; 404/12, 404/93

See application file for complete search history.

(56) References Cited

U.S. PATENT DOCUMENTS 6,212,287 B1 * 4/2001 Olivieri et al. ................ 382/104

(Continued)

FOREIGN PATENT DOCUMENTS

JP    5-347000    12/1993

(Continued)

OTHER PUBLICATIONS

Taylor C J et al., "A Real-Time Approach to Stereopsis and Lane-Finding", Intelligent Vehicles Symposium, 1996, Proceedings of the 1996 IEEE Tokyo, Japan Sep. 19-20, 1996, pp. 1-6.*

(Continued)

*Primary Examiner* — Andrae S Allison
(74) *Attorney, Agent, or Firm* — Smith, Gambrell & Russell, LLP

(57) ABSTRACT

A road line recognition apparatus, including: an imaging section imaging a progress path of a own vehicle including a road to output a couple of images; an image processing section calculating a distance in a real space in a set region of at least an image on one side based on the imaged couple of images; and a detection section detecting a road line; wherein the detection section includes: a road line candidate point detection and conversion processing unit detecting a pixel on a road surface as a road line candidate point based on luminance and the distance with regard to the image on one side, and performing Hough conversion of the road line candidate point; a road line straight line detection processing unit detecting one straight line proper to the road line on each of a right side and a left side of the own vehicle based on at least a position or a behavior of the own vehicle between straight lines obtained by the Hough conversion; and a road line detection processing unit detecting the road line of a shape of a straight line or a curved line by recording a road line position which is a road line candidate point indicating a road line among the road line candidate points based on the detected straight line.

26 Claims, 31 Drawing Sheets

U.S. PATENT DOCUMENTS

| | | | |
|---|---|---|---|
| 6,371,777 B1 * | 4/2002 | Rudoy et al. | 439/155 |
| 6,813,370 B1 * | 11/2004 | Arai | 382/104 |
| 6,845,172 B2 * | 1/2005 | Furusho | 382/104 |
| 6,868,168 B2 * | 3/2005 | Tsuji | 382/104 |
| 6,906,620 B2 * | 6/2005 | Nakai et al. | 340/435 |
| 6,963,657 B1 * | 11/2005 | Nishigaki et al. | 382/106 |
| 7,023,473 B2 * | 4/2006 | Iwai et al. | 348/187 |
| 7,209,832 B2 * | 4/2007 | Yamamoto et al. | 701/301 |
| 7,265,657 B2 * | 9/2007 | Nishida et al. | 340/436 |
| 7,295,682 B2 * | 11/2007 | Otsuka et al. | 382/103 |
| 7,313,265 B2 * | 12/2007 | Nakai et al. | 382/154 |
| 7,362,883 B2 * | 4/2008 | Otsuka et al. | 382/104 |
| 7,421,095 B2 * | 9/2008 | Ikeda et al. | 382/104 |
| 2003/0099377 A1 * | 5/2003 | Hanawa | 382/104 |

FOREIGN PATENT DOCUMENTS

| | | |
|---|---|---|
| JP | 7-302346 | 11/1995 |
| JP | 2001-92970 | 3/2001 |
| JP | 2003-281552 | 10/2003 |
| JP | 2004-310522 | 11/2004 |

OTHER PUBLICATIONS

Luong Q-T et al., "An Integrated Stereo-Based Approach to Automatic Vehicle Guidance", Computer Vision, 1995, Proceedings., Fifth International Conference on Cambridge, MA, USA Jun. 20-23, 1995, pp. 52-57.*

* cited by examiner

T

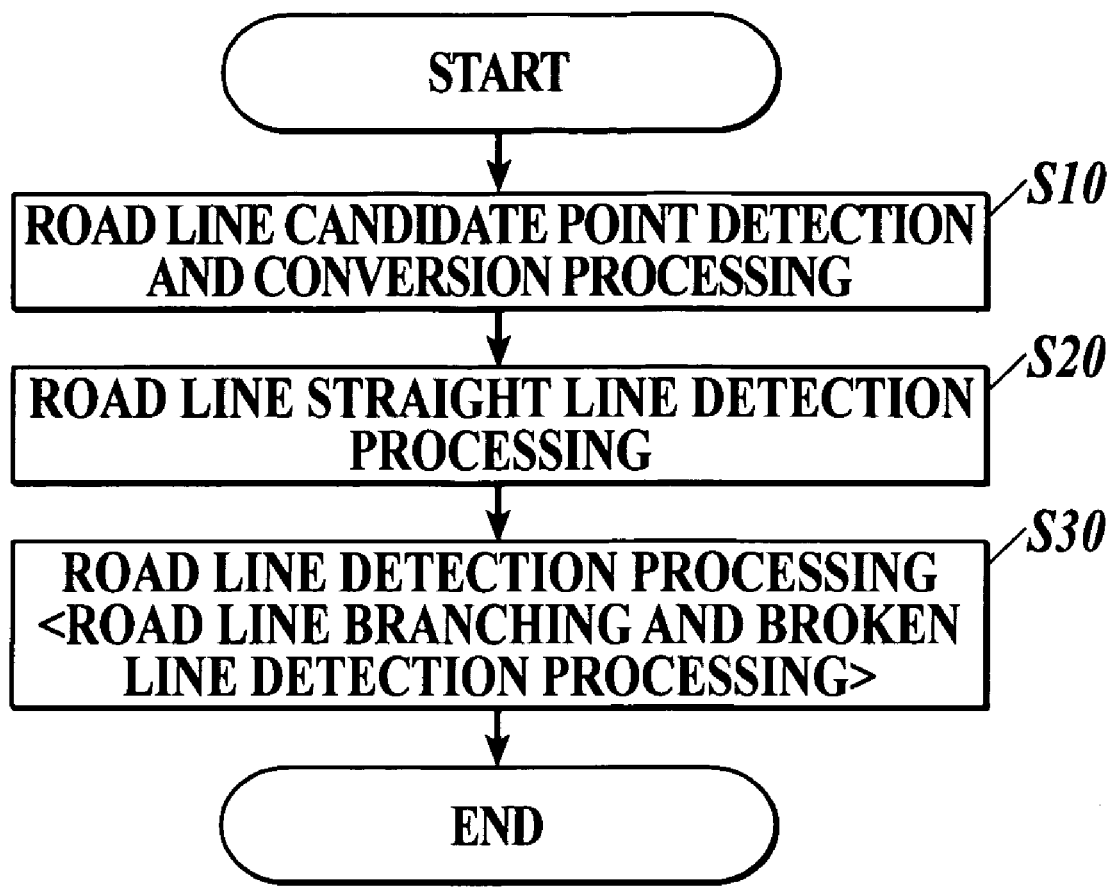

$b = -Jj \times a + Ij$

ROAD LINE RECOGNITION APPARATUS

BACKGROUND OF THE INVENTION

1. Field of the Invention

The present invention relates to a road line recognition apparatus, and more particularly to a road line recognition apparatus which recognizes a road line, following the road line in the shapes of a straight line and a curved line. The road line recognition apparatus recognizes the road line in distinction of whether the road line is continuous line or a broken line, and the recognition apparatus can also recognize a road line branching.

2. Description of Related Art

In recent years, there has been advanced the development of a road recognition apparatus which recognizes a road shape, which is a premise of the improvement of safety, automatic control and the like, by performing the image processing of an imaged image with an on-vehicle stereo camera or an on-vehicle video camera for the improvement of the driving safety of a motorcar or the like, the automatic control of a vehicle, and the like (see, for example, the following Patent Documents 1-3 and the like).

In order to recognize the shape of the road on which a vehicle is running, it is important to recognize the positions of road lines such as a no-passing line marked on a road surface in the front of a own vehicle, division lines by which a roadway is marked off from side strips, and the like. Accordingly, such a road recognition apparatus generally focuses attention on the luminance of the pixels of an imaged image, and is configured to recognize a road line by taking advantage of a significant difference between the luminance of the pixels of a roadway and a road line to extract a pixel portion at which the luminance significantly changes as an edge.

In the present invention, a continuous line and a broken line which are marked on a road surface such as the no-passing line and the division line for marking off the side strip are referred to as road lines, as mentioned above, and the distance between adjacent road lines is referred to as a road width, and further the width of a road line itself is referred to as a road line width.

| [Patent Document 1] | JP 2001-92970A |
| [Patent Document 2] | JP Hei-5-347000A |
| [Patent Document 3] | JP 2004-310522A |

However, in case of the road recognition apparatus based on the camera information as mentioned above, there is a possibility of mistaking a road mark such as a pedestrian crossing having luminance information similar to that of a road line. In particular, when it is made to be a condition of road line recognition that the interval of a high luminance portion is equivalent to that of a road line width as the road line recognition apparatus described in Patent Document 1, there are some cases where a pedestrian crossing having white line portions thereof each having a width wider than the road line width cannot be detected. Moreover, if the detection width of the high luminance portion in road line recognition is expanded, there are some cases where a pedestrian crossing marked to be thinnish is mistaken as a roadway.

Moreover, in case of the road line recognition apparatus described in Patent Document 1, for example, as shown in FIG. 43A, when white lines indicating road lines are marked so as to cross the front of the course of a driver's vehicle, there are some cases where the marks of the white lines are mistaken as the course of the own vehicle as shown by thick lines in FIG. 43B.

Road recognition, especially the technique for recognizing road lines surely, is a very important technique used as the basis of the automatic control of a vehicle and the information supplement to the driver of the vehicle for realizing various purposes such as an improvement of safeties, such as prevention of collision and rear-end collision, an improvement of the comfort of driving, safety ensuring of a pedestrian crossing a road, and the like, and such a technique is in a technical field the establishment of which is desired strongly.

In such a technology, it is required that it is possible to stably and precisely detect a road line without being especially affected by a complicated road shape such as a sharp curve, dirt on a road surface, rainy weather and the like. Furthermore, it is also desired to precisely grasp and recognize a change of the road width of a road line caused by a road line branching or the like even if the change happens.

SUMMARY OF THE INVENTION

The present invention was developed in view of such a situation, and it is an object of the invention to provide a road line recognition apparatus capable of precisely detecting a road line on which a own vehicle travels between imaged images in the front of the vehicle. In particular, it is an object of the invention to provide a road line recognition apparatus which is difficult to be affected by a complicated road shape such as a sharp curve, dirt on a road surface, a rainy weather and the like to stably detect a road line, and which can precisely recognize a change of the road width of a road line caused by a road line branching or the like even if the change happens.

In order to solve the problem, according to a first aspect of the invention, the road line recognition apparatus, comprises:

an imaging section imaging a progress path of a own vehicle including a road to output a couple of images;

an image processing section calculating a distance in a real space in a set region of at least an image on one side based on the imaged couple of images; and a detection section detecting a road line; wherein the detection section includes:

a road line candidate point detection and conversion processing unit detecting a pixel on a road surface as a road line candidate point based on luminance and the distance with regard to the image on one side, and performing Hough conversion of the road line candidate point;

a road line straight line detection processing unit detecting one straight line proper to the road line on each of a right side and a left side of the own vehicle based on at least a position or a behavior of the own vehicle between straight lines obtained by the Hough conversion; and a road line detection processing unit detecting the road line of a shape of a straight line or a curved line by recording a road line position which is a road line candidate point indicating a road line among the road line candidate points based on the detected straight line.

According to the first aspect of the present invention, straight lines proper for a right road line and a left road line based on judging from the position, the behavior and the like of a own vehicle between a plurality of straight lines obtained by performing Hough conversion of road line candidate points detected on a reference image are detected, and a road line position on the lower side of the reference image, namely on a side nearer to the own vehicle, is decided on the basis of the detected straight lines before tracing pertinent road line positions in order. Consequently, it is possible to stably and precisely detect the road lines while excluding a high luminance portion of reflected light on a road surface generated by rainy weather or the like, or a mark or the like which is not a road line, e.g. a mark indicating a road line branching shown in the center of a road, even if such a false signal is generated.

Moreover, because the road line positions on the side nearer to the own vehicle are decided before the road line positions are traced in order, it is possible to precisely follow the road line positions to detect them even if the road lines have the shapes of straight lines or curved lines, and it becomes possible to precisely follow the road line positions to detect the road lines even if the road lines have complicated road shapes such as sharp curves.

On the other hand, because it is possible for a driver to detect road lines while always ascertaining whether points in a real space corresponding to pixels on a reference image are on a road surface or not based on the distance data obtained by stereo matching processing in the image processing section, or because it is possible for the driver to detect the road lines while previously excluding solid bodies situated at higher positions than that of the road surface, the apparatus can very accurately detect the road lines without confusing the solid bodies with the road lines.

In accordance with a second aspect of the invention, in the first aspect of the invention, the road line candidate point detection and conversion processing unit of the detection section sets a search region on the image on one side in order to search for a road line candidate point only in a circumference of a detection position of the road line or the straight line, detected last time, on the image on one side in this time detection when the road line has been detected in a last time detection or when the road line has not been detected but the straight line has been detected in the last time detection.

According to the second aspect of the invention, on a reference image, because the possibility of detecting a road line at a position near to a position where the road line has been detected the last time is high on a reference image, it is possible in the road line detection this time to limit a search region of a road line candidate point to the neighborhood of the road line or the straight line which has been detected the last time. By limiting the search region in this manner, the possibility of false detection can also be reduced, and it becomes possible to attain the improvement of a throughput speed in addition to the effects of the first aspect of the invention described above.

In accordance with the third aspect of the invention, in the first aspect of the invention, the road line candidate point detection and conversion processing unit of the detection section sets a search region on the image on one side in order to search for a road line candidate point only in a circumference of a position distant from a presumption locus presumed by a behavior of the own vehicle expressed on the image on one side by a predetermined distance in this time detection when both of the road line and the straight line have not been detected for predetermined times.

According to the third aspect of the invention, the possibility of finding a road line at a position distant from a certain distance from a presumption locus presumed from the behavior of a own vehicle is high. Consequently, in addition to the effects of the aspects described above, the possibility of detecting a road line candidate point by performing the search of the road line candidate point only in the circumference of the position separated from the presumption locus by a predetermined distance even if neither a road line nor a straight line was detected at the last detection. Moreover, by limiting the search region in this manner, the possibility of false detection can be made to be low, and at the same time the improvement of the throughput speed can be attained. In accordance with the fourth aspect of the invention, in the recognition apparatus of the third aspect of the invention, the road line candidate point detection and conversion processing unit of the detection section sets the search region of this time detection to be expanded in comparison with the search region in a last time detection.

According to such a road line recognition apparatus, when neither a road line nor a straight line was detected at the last detection, the possibility of detecting a road line candidate point becomes higher by expanding the search region in comparison with the case of the second aspect, and consequently it becomes possible to exhibit the effects of the third aspect more surely.

According to the fifth aspect of the invention, in the recognition apparatus of the second aspect of the invention, the road line candidate point detection and conversion processing unit of the detection section enlarges the search region of a road line part or a straight line part distant more than the first separation distance threshold value from a presumption locus presumed based on the behavior of the own vehicle in this time detection to a neighborhood of an end of the own vehicle presumed from the presumption locus when the road line or the straight line, detected in the last time detection, are distant more than the first separation distance threshold value from the presumption locus.

In the recognition apparatus of the second aspect of the invention, when a road width is expanding owing to a road line branching or the like, the expanding road line or the expanding straight line is traced, and only their circumferences are searched. Then, the case where a road line which newly appears on the side nearer to the own vehicle cannot be recognized will occur. The recognition apparatus according to the fifth aspect of the invention, expands the search region to the neighborhood of the own vehicle when a road line becomes distant from the presumption locus of the deriver's own vehicle by a certain distance or more, and thereby it becomes possible to precisely detect the road line candidate point corresponding to the road line which newly appears, and to exhibit the effect of each of the aspects described above more precisely.

According to the sixth aspect of the invention, in the recognition apparatus of the second aspect, the road line candidate point detection and conversion processing unit of the detection section enlarges the search region of a road line part or a straight line part close to be within a second separation distance threshold value to a presumption locus presumed based on the behavior of the own vehicle at the detection this time to a direction of being distant from the own vehicle by a predetermined quantity when the road line or the straight line, detected the last detection, is close to be within a second separation distance threshold value to the presumption locus.

In the second aspect, if, for example, a road mark marked on a road, the white traces of the tires of a preceding vehicle remaining on a road in a rain weather, and the like are recognized as a road line or a straight line by mistake, then searches are performed only to the circumference of the mistaken road line or the mistaken straight line after that. Consequently, a case where true road lines cannot be recognized occurs. According to the sixth aspect of the invention, in the second invention, when a road line is close to a presumption locus of the own vehicle, the search region is expanded toward the direction to be distant from the own vehicle. Thereby, it becomes possible to precisely detect a road line candidate point corresponding to the true road line, and it becomes possible to exhibit the effects of each of the aspects described above more precisely.

According to the seventh aspect of the invention, in the recognition apparatus of the second aspect, the road line candidate point detection and conversion processing unit of the detection section enlarges the search region from a road line or a straight line, being on an opposite side of the road line or the straight line detected last time, to position distant to a direction of the road line or the straight line by a predetermined quantity at time of setting the search region based on the road line or the straight line, both detected last time, at the detection, this time.

In the second aspect, when the interval of the road lines or the straight lines on the right and the left sides which were detected the last time is expanding or reducing, there is the possibility of a false detection, although there is the case of detecting a road line branching or a road line joining. According to the seventh aspect of the invention, the search region is expanded up to the position distant from the opposite road line or the straight line on the opposite side by the road width as well as the circumferences of the road lines or the straight lines on the right and the left side which were detected the last time. Thereby, it becomes possible to precisely detect a road line candidate point even in case of a false detection, and then it becomes possible to precisely exhibit the effects of each of the aspects described above.

According to the eighth aspect of the invention, in the recognition apparatus of the second aspect, the road line candidate point detection and conversion processing unit of the detection section sets the search region based on the road line or the straight line, detected last time, in the detection this time, and when a line segment connecting a road line candidate point detected on a present horizontal line with a road line candidate point detected immediately before deviates from the search region at time of searching for a road line candidate point while shifting a horizontal line of the image on one side upward by one pixel in the search region, the road line candidate point detection and conversion processing unit expands the search region into a line segment direction.

In the second aspect, there is a case where a road line candidate point is deviating from a search region when the road line candidate point is searched for by shifting a horizontal line on a reference image upward from the lower side one pixel by one pixel in the search of the road line candidate point. According to the eighth aspect of the invention, in such a case, the search region is expanded into the direction in which the road line candidate point is deviating. Thereby, it becomes possible to precisely detect the road line candidate point, and it becomes possible to precisely exhibit the effects of each of the aspects described above.

According to the ninth aspect of the invention, in the recognition apparatus of the first aspect, the road line candidate point detection and conversion processing unit of the detection section does not search a region of a width of the own vehicle from a presumption locus presumed from a behavior of the own vehicle, the presumption locus being set as a center of the width, in a search of a road line candidate point.

According to the ninth aspect of the invention, a region for the width of a own vehicle around a presumption locus is excluded from the search region. Thereby, the possibility of mistaking a road mark indicating the maximum speed or a traveling direction which is marked at the center of a road, white traces of the tires of a front vehicle remaining on a road at the time of a rainy weather, or the like as a road line candidate point is reduced. Consequently, it becomes possible to exhibit the effects of each of the aspects described above more surely, and it becomes possible to reduce the load of processing.

According to the tenth aspect of the invention, in the recognition apparatus of the ninth aspect, the road line candidate point detection and conversion processing unit of the detection section searches the region of the width of the own vehicle from the presumption locus presumed from the behavior of the own vehicle up to a position distant from the road line or the straight line, detected at the last detection, by a predetermined distance in the region in the search of the road line candidate point.

According to the tenth aspect of the invention, the circumferences of the road lines or the straight lines which were detected the last time are also searched for even if they are in the region of the width of the own vehicle around the presumption locus in the ninth aspect. Thereby, even when the own vehicle strides across a road line on lane changing or the like, it becomes possible to detect a road line candidate point, and it becomes possible to exhibit the effect of the ninth aspect more precisely.

According to the eleventh aspect of the invention, in the recognition apparatus of the first aspect, the road line candidate point detection and conversion processing unit of the detection section sets a pixel portion other than a pixel portion indicating a solid body extracted on the image on one side based on information of the distance calculated by the image processing section, and perform a search for a road line candidate point in the set search region in the search of the road line candidate point.

According to the eleventh aspect of the invention, in addition to the effects of each of the aspects described above, it becomes possible to search only the region on a road surface, and consequently the process of judging whether a detected road line candidate point exists on the road surface in the real space or not can be omitted to make it possible to shorten the processing time of the road line recognition processing.

According to the twelfth aspect of the invention, in the recognition apparatus of the first aspect, the road line straight line detection processing unit of the detection section detects a straight line proper to the road line based on a distance between road lines calculated from distance data detected by the image detection section and the number of pixels between the road lines.

According to the twelfth aspect of the invention, a road line candidate is calculated by calculating the distance between road lines based on the distance data calculated with a stereo camera, and consequently the road line candidate can be more accurately calculated to make it possible to more precisely exhibit the effects of each of the aspects described above.

According to the thirteenth aspect of the invention, in the recognition apparatus of the first aspect, the road line straight line detection processing unit of the detection section detects a straight line proper to the road line each of right and left sides of the own vehicle out of the straight lines obtained by the Hough conversion, based on parallelism with a presumption locus calculated based on distance data detected by the image detection section, a distance from a road line detected last time, and a distance from a road line presumed from an opposite road line detected last time.

According to the thirteenth aspect of the invention, it becomes possible to detect a pertinent straight line having high consistency with the presumption locus of the own vehicle and the road line detected the last time between a plurality of straight lines indicating the road lines on the right and the left sides obtained by Hough conversion when the plurality of straight lines can be obtained. Consequently, it becomes possible to precisely exhibit the effects of each of the aspects described above, and it becomes possible to improve the reliability of an apparatus.

According to the fourteenth aspect of the invention, in the recognition apparatus of the thirteenth aspect, the road line straight line detection processing unit of the detection section detects only one of straight lines, each detected as the straight line proper to the road line on the right side and the left side of the own vehicle, as the straight line proper to the road line based on each counted value on the Hough plane of each straight line, the parallelism with the presumption locus of the own vehicle calculated based on the distance data detected by the image detection section, and a displacement quantity from a road line position detected last time when a road width in the real space of the straight lines detected on the right side and the left side of the own vehicle is not within a predetermined range, or the parallelism of the straight lines is worse than a set threshold value.

According to the fourteenth aspect of the invention, only the straight line on one side which is proper as a road line is detected when the road width, the parallelism or the like between the straight lines detected on the right and the left sides of the own vehicle is bad. Thereby, the effect of the third aspect described above is more precisely exhibited, and it becomes possible to more improve the reliability of an apparatus.

According to the fifteenth aspect of the invention, in the recognition apparatus of the first aspect, the road line detection processing unit of the detection section converts a number of pixels between the road line positions on the right side and the left side to a road width in the real space based on distance data, and calculates a maximum value and a minimum value of the road width based on the converted road width when the road line positions on both of the right and the left sides are detected at time of recording the road line positions, the road line candidate points indicating the road line, out of the road line candidate points using the straight line detected on each of the right and the left sides of the own vehicle as a reference.

According to the fifteenth aspect of the invention, a road line position is selected between the road line candidate points severally detected on the basis of the straight lines each having been detected either on the right and the left sides of the own vehicle, and the interval of the road line positions on both the left and the right sides is converted into a road width when the road line positions are detected on both the sides. Thereby the maximum value and the minimum value of the road width of the roadway detected this time can be calculated. By using the maximum value and the minimum value of the road width for various kinds of processing, it becomes possible to exhibit the effects of each of the aspects described above more efficiently.

According to the sixteenth aspect of the invention, in the recognition apparatus of the first aspect, the road line detection processing unit of the detection section is shifting a horizontal line of the image on one side upward by one pixel while recording a road line candidate point as the road line position when displacement in a vertical direction and a horizontal direction between a road line candidate point detected on an upper horizontal line after the road line positions detected on the horizontal line based on the detected straight lines have reached a predetermined number and the last detected road line position is severally within a predetermined value.

According to the sixteenth aspect of the invention, first a straight line proper to indicate a road line used as a basis of road line recognition is severally detected on the both of the left and the right sides of the own vehicle in a region on the lower side of a reference image which is the side nearer to the own vehicle, and the road line on the upper side of the reference image which is the side farther than the own vehicle is being traced on the basis of the straight lines. Thereby it becomes possible to precisely detect and recognize the road lines which are curved or subjected to a road line branching or a road line joining, and the effects of each of the aspects described above are precisely exhibited.

According to the seventeenth aspect of the invention, in the recognition apparatus of the fifteenth aspect, the road line detection-processing unit of the detection section is shifting a horizontal line of the image on one side upward by one pixel while recording a road line candidate point as the road line position when displacement in a vertical direction and a horizontal direction between a road line candidate point detected on an upper horizontal line after the road line positions detected on the horizontal line based on the detected straight lines have reached a predetermined number and the last detected road line position is severally within a predetermined value, and when the road width converted from the number of pixels between the road line positions on the right side and the left side is out of a range from the minimum value to the maximum value, the road line detection processing unit detects a road line on which a road line position having higher parallelism with the presumption locus of the own vehicle as a road line to be set as the reference.

According to the seventeenth invention, the road lines which are curved or are subjected to a road line branching or a road line joining are detected similarly in the sixteenth aspect. At this time, in the case where the parts of the road lines which are curved or are subjected to the road line branching or the road line joining are out of the range from the maximum value to the minimum value of the road width grasped in the part of the straight line near to the own vehicle, which road line of the road lines on the right and the left sides is the one which the own vehicle should follow is judged from the parallelism of the road lines with the presumption locus of the own vehicle. Consequently, in addition to the effects of each of the aspects described above, the road line having the higher parallelism with the presumption locus is set as the road line which should be referred to, and it becomes possible to take advantage of the information of the road line which should be referred to in the various kinds of processing such as key plane control.

According to the eighteenth aspect of the invention, in the recognition apparatus of the seventeenth aspect, the road line detection processing unit of the detection section detects a road line on which a road line position having lower parallelism with the presumption locus of the own vehicle as a road line at a road line branching when the road width in the real space converted form the number of pixels between the road line positions on the right side and the left side exceeds the maximum value, and calculates a position in the real space of a road line position at which the calculated road width first exceeds the maximum value, and further calculates a distance from the own vehicle to the road line position to detect the calculated distance as a distance where the road line branching starts.

According to the eighteenth invention, in addition to the effects of each of the aspects described above, it becomes possible to precisely grasp a road line branching point, and, it becomes possible to amend, for example, the reliability of the road lines and the road line position which are characterized as a road line branching to precisely determine which road line between the right and the left road lines should be relied on and followed with the key plane control or the like.

That is, the reliability of a road line that is a continuous line is generally amended to be higher than that of a road line which is a broken line. Consequently, when a road line on the side of leading a vehicle to advance into a right-turn lane after a road line branching is a continuous line, the vehicle will advance into the right-turn lane along the continuous line, although the driver of the car wants to go straight on. However, if the reliability of the road line or the road line position on the side characterized as a road line branching based on the characterization as the road line branching described above is amended to be lower than the reliability of the road line or the like on the opposite side, then a vehicle can be made to progress along the road line which is a broken line at the road line branching point and can be automatically controlled to go straight on as it is without advancing into the right-turn lane. Consequently, it becomes possible to accurately perform the control such as the key plane control.

According to the ninteenth aspect of the invention, in the recognition apparatus of the seventeenth aspect, the road line detection processing unit of the detection section detects a road line on which a road line position having lower parallelism with the presumption locus of the own vehicle as a road line at a road line joining when the road width in the real space converted form the number of pixels between the road line positions on the right side and the left side is lower than the minimum value, and calculates a position in the real space of a road line position at which the calculated road width first becomes lower than the minimum value, and further calculates a distance from the own vehicle to the road line position to detect the calculated distance as a distance where the road line joining starts.

According to the nineteenth aspect of the invention, in addition to the effects of each of the aspects described above, it becomes possible to precisely grasp a road line joining point. Moreover, for example, it is possible to amend the reliability of a road line or a road line position which is characterized as a road line joining to precisely determine which road line between the road lines on the right and the left sides should be relied on to be followed by the key plane control or the like.

According to the twentieth aspect of the invention, in the recognition apparatus of any one of the above aspects, the road line detection processing unit of the detection section calculates distances between road line positions belonging to a detected road line to detect whether the road line is a continuous line or a broken line, and characterizes information of the detected road line or information of the road line positions as the continuous line or the broken line to output the information.

According to the twentieth invention, in addition to the effects of each of the aspects described above, it becomes possible to recognize a road line with a clear distinction about whether the road line is a continuous line indicating, for example, a no-passing line a division line making off a side stripe and a roadway, and the like, or a broken line indicating a lane allowed to overtake, and also it is possible to amend the reliability of a road line or a road line position according to, for example, the feature of the continuous line or the broken line to precisely determine which road line between the right and the left road lines should be relied on to be followed by the key plane control or the like. Moreover, it becomes possible to take advantage of the output information from a road line recognition apparatus in the state in which whether the road line is a continuous line or a broken line is clearly distinguished at the time of taking advantage of the aspect to other control.

According to the twenty-first aspect of the invention, in the recognition apparatus of any one of the above aspects, the road line candidate point detection and conversion processing unit detects a pixel on the image on one side as a road line candidate point based on the luminance and the distance of each pixel with regard to the image on one side, and performs the Hough conversion of the road line candidate point, the pixel detected as the road line candidate having the luminance and a derivative value of luminance being larger than a predetermined first start point luminance threshold value and first start point edge strength threshold value, respectively.

According to the twenty-first aspect of the invention, in addition to the effects of each of the aspects described above, road line detection is performed based on the luminance of each pixel of a reference image imaged by the imaging section and the derivative value of luminance calculated from the luminance of each pixel, and thereby the luminance variations of the road surface and the road line can be recognized in clear distinction from the luminance variation caused by dirt on the road surface. Moreover, it becomes possible to precisely detect a road line even when the road surface luminance is wholly high owing to a rainy weather or the like.

According to the twenty-second aspect of the invention, in the recognition apparatus of twenty-first aspect, the road line candidate point detection and conversion processing unit of the detection section searches a horizontal line of the image on one side, and when a pixel portion is found in which luminance values are equal to or more than a second start point luminance threshold value which is larger than the first start point luminance threshold value and derivative values of luminance is equal to or more than a second start point edge strength threshold value and further average luminance of a high luminance pixel portion corresponding to a road line is equal to or more than a predetermined first road line average luminance threshold value, the road line candidate point detection and conversion processing unit deletes road line candidate points corresponding to a pixel portion in which average luminance of an already detected high luminance pixel portion is smaller than the first road line average luminance threshold value, and saves road line candidate points corresponding to the newly found pixel portion to set as an object of the Hough conversion.

According to the twenty-second aspect of the invention, in addition to the effects of each of the aspects described above, when a fading road line and a newly repainted road line are marked on a road surface, the newly repainted road line can be precisely detected, and more accurate road line recognition is enabled.

According to the twenty-third aspect of the invention, in the recognition apparatus of twenty-first aspect, the road line candidate point detection and conversion processing unit of the detection section searches a horizontal line of the image on one side from a start point capable of being the road line candidate point, and when pixels, at each of which a derivative value of luminance is less than a predetermined end point edged strength threshold value inclusive or a luminance value is smaller than a luminance value of the start point, are not detected, despite searching, up to a number of the pixels, the number corresponding to a road line width threshold value set according to a distance from the own vehicle on the real space of the horizontal line and a road line width, the road line candidate point detection and conversion processing unit does not set the start point as a road line candidate point and does not set it as an object of the Hough conversion.

Even if a start point which can be a road line candidate point is found on a horizontal line of a reference image, the possibility that the start point is not the one corresponding to a road line is high when a high luminance portion continues for a long time in the state of exceeding a road line width threshold value. Accordingly, according to the twenty-third aspect of the invention, the start point is not recorded as a road line candidate point, and is not treated as an object of Hough conversion, and thereby the lowering of the probability of a false detection is made to be possible. Then, it becomes possible to surely exhibit the effects of each of the aspects described above.

According to the twenty-fourth aspect of the invention, in the recognition apparatus of twenty-first aspect, the road line candidate point detection and conversion processing unit of the detection section searches a horizontal line of the image on one side from a start point capable of being the road line candidate point, and detects a pixel at which a derivative value of luminance is less than a predetermined end point edged strength threshold value inclusive or a luminance value is smaller than a luminance value of the start point as an end point, and further when a difference between average luminance of pixels from the start point to the end point and road surface luminance is smaller than a predetermined second road line average threshold value, the road line candidate point detection and conversion processing unit does not set the start point as a road line candidate point, and does not set it as an object of the Hough conversion.

Even if a start point which can be a road line candidate point is found on a horizontal line of a reference image and an end point is found within a range of a road line width threshold value, the possibility that the start point is not the one corresponding to a road line is high when the difference between the average luminance of the high luminance portion from the start point to the end point and the road surface luminance does not satisfy the minimum average luminance required as the road line. Accordingly, according to the twenty-fourth aspect of the invention, the start point is not recorded as a road line candidate point, and is not treated as an object of Hough conversion, and thereby the lowering of the probability of a false detection is made to be possible. Then, it becomes possible to more surely exhibit the effects of each of the aspects described above.

According to the twenty-fifth aspect of the invention, in the recognition apparatus of twenty-fourth aspect, when the derivative value of luminance at the start point is smaller than a third start point edge strength threshold value which is set to a value larger than the first start point edge strength threshold value, and a number of the pixels from the start point to the end point is larger than a second road line width threshold value set correspondingly to an ordinary road line width based on a distance from the own vehicle on the real space of the horizontal line and a road line width, the road line candidate point detection and conversion processing unit of the detection section sets the second road line width average luminance threshold value to a higher value, and compares the difference between the average luminance of the pixels from the start point to the end point and the road surface luminance with the second road line average luminance threshold value.

In the twenty-fourth aspect, even if the road line candidate point satisfies the condition mentioned above, there is the possibility of detecting, for example, snow or the like gathered up by the side of a road. Consequently, if the derivative value of luminance at a start point does not significantly build up but gently builds up, and if the high luminance portion is larger than a general road line width although the high luminance portion is within the range of the road line width threshold value, then the possibility of detecting the snow or the like is high. Accordingly, according to the twenty-fifth aspect of the invention, the threshold value of the minimum average luminance of the high luminance portion which is necessary for the difference between the average luminance and road surface luminance to be a road line is reset to a higher value to make the reference stricter. Consequently, the possibility that only the road line candidate point corresponding to a road line remains is heightened. Thereby it becomes possible to lower the probability of false detection, and it becomes possible to precisely exhibit the effects of the twenty-fourth aspect described above.

According to the twenty-sixth aspect of the invention, in the recognition apparatus of twenty-fourth aspect, when the derivative value of luminance at the start point is not smaller than a third start point edge strength value which is set to a value larger than the first start point edge strength threshold value, and a number of the pixels from the start point to the end point is not larger than a second road line width threshold value set correspondingly to an ordinal road line width based on a distance from the own vehicle on the real space of the horizontal line and a road line width, the road line candidate point detection and conversion processing unit of the detection section sets the second road line width average luminance threshold value to a lower value, and compares the difference between the average luminance of the pixels from the start point to the end point and the road surface luminance with the second road line average luminance threshold value.

When the derivative value of luminance at a start point is significant and the high luminance portion is at not much more than a general road line width like a road line candidate point corresponding to a road line detected in a dark tunnel, the possibility of detecting a road line candidate point corresponding to a road line. Accordingly, adversely to the twenty-fifth aspect, according to the twenty-sixth aspect, the threshold value of the minimum average luminance of the high luminance portion which is necessary for the difference between the average luminance and road surface luminance to be a road line is reset to a lower value to make the reference looser. Thereby, it becomes possible to precisely detect the road line candidate point corresponding to a road line in such a dark situation, and it becomes possible to precisely exhibit the effects of the twenty-fourth aspect described above.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein;

FIG. 6 is a flowchart showing the basic flow of the processing performed by a detection section;

FIG. 16 is a graph showing luminance variations in case of imaging snow on the side of a road and the like;

FIG. 17 is a graph showing luminance variations in case of performing imaging under a dark situation in a tunnel or the like;

FIG. 37 is a figure illustrating the search regions set only as the circumferences of the tire tracks of a front vehicle, or the like;

DETAILED DESCRIPTION OF THE PREFERRED EMBODIMENTS

In the following, an embodiment of a road line recognition apparatus according to the present invention is described by reference to the attached drawings.

Figure 1:
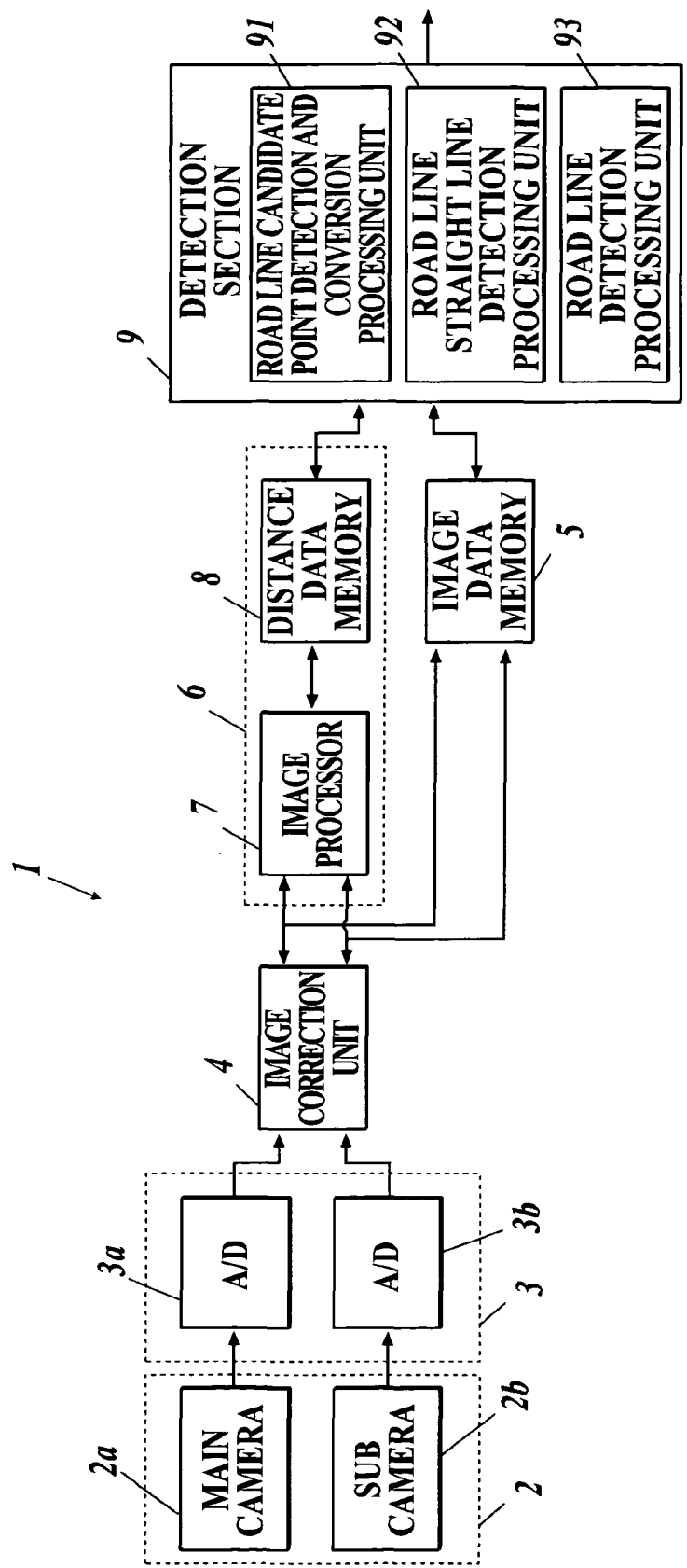
FIG. 1 is a block diagram of a road line recognition apparatus according to the present embodiment.

FIG. 1 is a block diagram of a road line recognition apparatus according to the present embodiment. The road line recognition apparatus 1 is mainly composed of an imaging section 2, a conversion section 3, an image processing section 6 and a detection section 9.

The imaging section 2 is a section for imaging the circumference of a vehicle, and is configured to image a sight including a road in the traveling direction of a vehicle at a predetermined sampling period to output a couple of images. The present embodiment employs a stereo camera composed of a couple of a main camera 2a and a sub camera 2b, each building in an image sensor such as a CCD and a CMOS sensor, the image sensors being synchronized with each other.

The main camera 2a and the sub camera 2b are installed, for example, in the neighborhood of a room mirror with a predetermined interval in the width direction of the vehicle. A camera nearer to a driver between the couple of the stereo camera is set as the main camera 2a imaging an image, which is a basis of calculating a distance with regard to each pixel and of detecting road lines, as will be described later. The other camera, which is farther from the driver, is set as the sub camera 2b imaging an image, which is compared with the image imaged with the main camera 2a for obtaining the distance and the like mentioned above.

A/D converters 3a and 3b as the conversion section 3 are connected to the main camera 2a and the sub camera 2b, respectively. The A/D converters 3a and 3b are configured so that a couple of analog images output from the main camera 2a and the sub camera 2b are converted into a reference image and a comparison image, respectively, which are digital images each having the luminance of predetermined luminance gradations such as a gray scale of 256 gradations at each pixel.

An image correction unit 4 is connected to the A/D converters 3a and 3b, and the image correction unit 4 is configured so as to use the affine transformation for performing image correction such as the correction of luminance including the removal and the like of misalignment caused by errors of the installation positions of the main camera 2a and the sub camera 2b and noises to the reference image and the comparison image which have been output from the A/D converters 3a and 3b.

Figure 2:
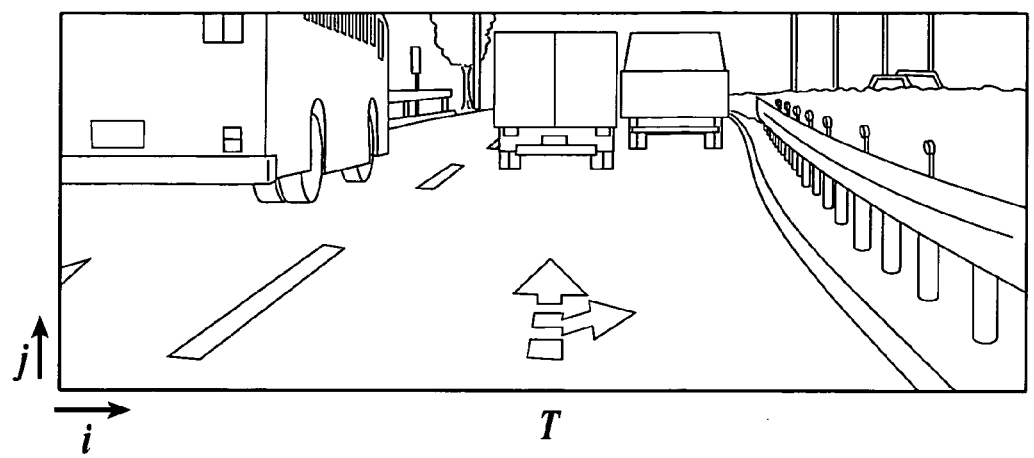
FIG. 2 is a figure illustrating a reference image made to be digital data.

Incidentally, the image correction unit 4 is configured, for example, so as to output a reference image T as image data composed of luminance of 512 pixels in the horizontal direction and 200 pixels in the vertical direction as shown in FIG. 2, and to output a comparison image as image data composed of luminance of 640 pixels in the horizontal direction and 200 pixels in the vertical direction, though the comparison image is not shown. Moreover, each image data is stored in an image data memory 5 connected to the image correction unit 4, and at the same time each image data is transmitted to the detection section 9.

The image processing section 6 is connected to the image correction unit 4, and the image processing section 6 is mainly composed of an image processor 7 and a distance data memory 8.

The image processor 7 is configured to calculate a parallax dp for calculating a distance in a real space with regard to each set region being a block composed of each pixel or a plurality of pixels of the reference image T based on the digital data of the reference image T and the comparison image which are output from the image correction unit 4 by the stereo matching processing and the filtering processing of the image correction unit 4. The details of the calculation of the parallax dp are described in JPA Hei 5-114099 filed by the present applicant before, but the gist of the contents is briefly described in the following.

The image processor 7 is configured to calculates one parallax dp to each pixel block of 4×4 pixels with regard to the reference image T including 512×200 pixels. As mentioned above, luminance $p1_{ij}$ of 0-255 is severally assigned to 16 pixels constituting one pixel block, and the luminance $p1_{ij}$ of the 16 pixels forms luminance characteristics peculiar to the pixel block. Incidentally the suffixes i and j of the luminance $p1_{ij}$ indicate an i coordinate and a j coordinate of a pixel at a bottom left corner of a pixel block when the bottom left corner of an image plane of the reference image T and the comparison image is set as the origin and a horizontal direction and a vertical direction are set as the i coordinate axis and the j coordinate axis, respectively.

In the stereo matching processing in the image processor 7, as described above, the reference image T is divided up to 128×50 pixel blocks to each 4×4 pixels, and the comparison image is divided into epipolar lines of four pixels in width, each extending in the horizontal direction. And, the stereo matching processing is made to take out one pixel block of the reference image T, and to search for a pixel block on the epipolar line of the comparison image, the epipolar line corresponding to the taken-out pixel block, the pixel block having the minimum city block distance CB obtained from the following formula (1), i.e. the pixel block on the comparison image having a luminance characteristic similar to that of the pixel block of the reference imager, while shifting into the horizontal direction, i.e. the i direction, one pixel by one pixel on the epipolar line.

$$CB = \Sigma |p1ij - p2ij| \quad (1)$$

Incidentally, $p2_{ij}$ denotes the luminance of a pixel having coordinates (i, j) on the comparison image.

The image processor 7 is configured to calculate the misaligned quantity between the pixel block on the comparison image specified in this manner and the original pixel block on the reference image T, and to allocate the calculated misaligned quantity to the pixel block on the reference image T as the parallax dp.

Incidentally the parallax dp is a relative the horizontal relative misaligned quantity in the horizontal direction related to the mapping position of the same body in the reference image T and the comparison image, the misalignment being resulted from the separation of the certain distance between the main camera 2a and the sub camera 2b. The distance from the middle position of the main camera 2a and the sub camera 2b to the body and the parallax dp are associated with each other based on the principle of triangulation.

To put it concretely, if the point on the road surface right under the middle between the main camera 2a and the sub camera 2b in the real space is set as the origin and the X-axis, the Y-axis and the Z-axis are set in the direction of the width of the own vehicle at the time of facing the traveling direction of the vehicle, the direction of the height of the vehicle, and the direction of the length of the vehicle, i.e. the distance direction, respectively, then coordinates conversions from a point (i, j, dp) on a distance image to a point (X, Y, Z) in the real space are performed based on the following formulae (2)-(4).

$$X = CD/2 + Z \times PW \times (i - IV) \quad (2)$$

$$Y = CH + Z \times PW \times (j - JV) \quad (3)$$

$$Z = CD/(PW \times (dp - DP)) \quad (4)$$

That is, the middle position between the main camera 2a and the sub camera 2b, accurately the distance L from a point on the road surface just under the middle to the body, and the parallax dp are uniquely associated with each other by substituting the distance L for the Z in the formula (4). Hereupon, CD denotes the interval between the main camera 2a and the sub camera 2b; PW denotes a view angle per one pixel; CH denotes the installation heights of the main camera 2a and the sub camera 2b; IV and JV denote the i coordinate and the j coordinate of a point at infinity on the distance image in the front of the own vehicle; and DP denotes the parallax of a vanishing point.

Moreover, the image processor 7 is configured to perform filtering processing to the parallax dp which has been obtained in this manner with the object of improving the reliability of the parallax dp, and to output only the parallax dp which is regarded as valid parallax. That is, for example, even if a pixel block of 4×4 pixels which consists of only an image of a roadway and has few features is scanned on an epipolar line, the whole part in which a roadway of a comparison image is imaged has high correlation, and consequently, even if a corresponding pixel block is specified and the parallax dp thereof is calculated, the reliability of the parallax dp is low. Accordingly, the image processor 7 is configured to invalidate such parallax dp in the filtering processing, and to output zero as the value of the parallax dp.

Consequently, the distance data of each pixel of the reference image T output from the image processor 7, i.e. the parallax dp for calculating the distance in the real space of each pixel block of the reference image T generally becomes the data having valid values only to the so-called edge portions, in which the differences of the luminance $p1_{ij}$ between the pixels adjacent on the left and right directions in the reference image T are large.

The distance data of each pixel block of the reference image T which is calculated in the image processor 7 is scheduled to be stored in the distance data memory 8 of the image processing section 6. Incidentally, in the processing in the detection section 9, one pixel block of the reference image T is scheduled to be treated as 4×4 pixels, and the 16 pixels belonging to the one pixel block are severally designed to be processed as independent pixels which have the same parallax dp.

The detection section 9 is made of a microcomputer, in which a CPU, a ROM, a RAM, an input-output interface and the like, which are not shown, are connected to buses, in the present embodiment. The detection section 9 is configured to perform the detection of a road line in the reference image T transmitted from the image correction unit 4 based on the luminance information of each pixel of the reference image T and the distance data read from the distance data memory 8.

The detection section 9 is equipped with a road line candidate point detection and conversion processing unit 91, a road line straight line detection unit 92 and a road line detection processing unit 93.

The road line candidate point detection and conversion processing unit 91 is configured to perform the detection of a pixel having the possibility of showing the road line from the reference imager T assigned by the conversion section 3, i.e. the detection of a road line candidate point, based on the luminance $p1_{ij}$ of each pixel of the reference image T and the parallax dp of each pixel of the reference image T, which parallax dp has been calculated in the image processor 7. Moreover, the road line candidate point detection and conversion processing unit 91 is configured to perform the Hough conversion of each of the detected road line candidate points.

In the present invention, the road line candidate point detection and conversion processing unit 91 is configured to detect not only a new road line clearly marked on a general asphalt but also a thin luminance road line such as a fading line. Moreover, when a thin luminance road line and a new road line are detected, or when a new road line is repainted on a thin luminance road line in the state of partially overlapping therewith, the present embodiment is configured to detect only the new road line.

The search is programmed to be performed in a manner of shifting into an i coordinate axis one pixel by one pixel on a horizontal line j having a fixed j coordinate and having one pixel width in the reference image T as shown in FIG. 2, and of shifting the horizontal line j upward one pixel by one pixel at ever end of the search on the horizontal line j in the reference image T.

Figure 3:
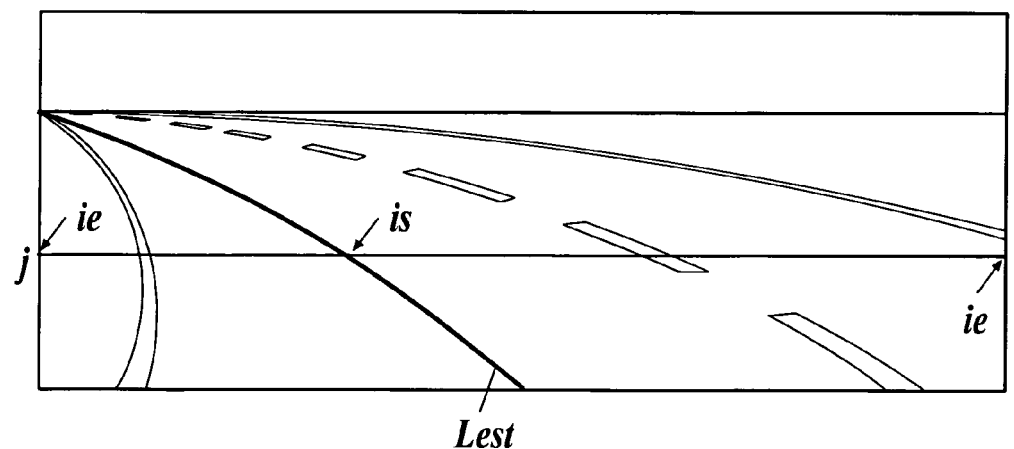
FIG. 3 is a figure illustrating a presumption locus, a search start point and a search end point.

The present embodiment is configured to calculate a yaw rate as the behavior of the own vehicle based on the measured vehicle speed of the own vehicle and the rudder angle of the steering wheel of the measured own vehicle, and to calculate a presumption locus Lest of the own vehicle as shown in FIG. 3 based on the calculated yaw rate. The search of the road line candidate point is designed to be performed in the manner of setting the pixel of an intersection point of the presumption locus Lest and the horizontal line j which is subjected to the search as a search start point is, and of starting the search from the search start point is to a search end point ie while offsetting into the right direction and the left direction.

Incidentally, in the present embodiment, because the reference image T is one imaging only the front region of the own vehicle in the traveling direction as shown in FIG. 3, search is performed to all the regions of the reference image T. That is, the search end points ie which are pixels at which the search is ended are set to the pixels at the both ends on the right and the left sides. However, it is also possible to limit the search region more. Moreover, for example, in case of a reference image imaged with an imaging apparatus capable of imaging the circumference of 360° of the own vehicle, it is also possible to perform the search in the state in which the search region is limited only to the front region.

Figure 4:
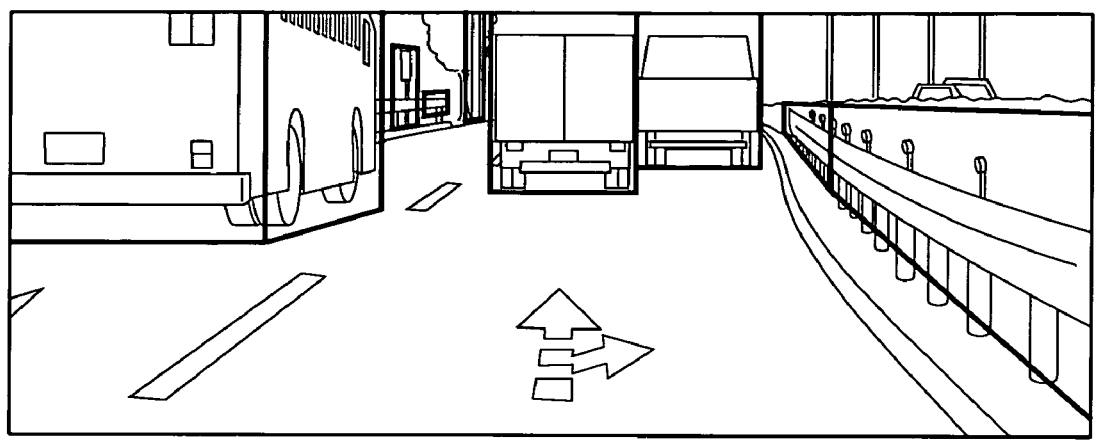
FIG. 4 is a figure illustrating the frame enclosing the solid bodies extracted from a front sight.
Figure 5:
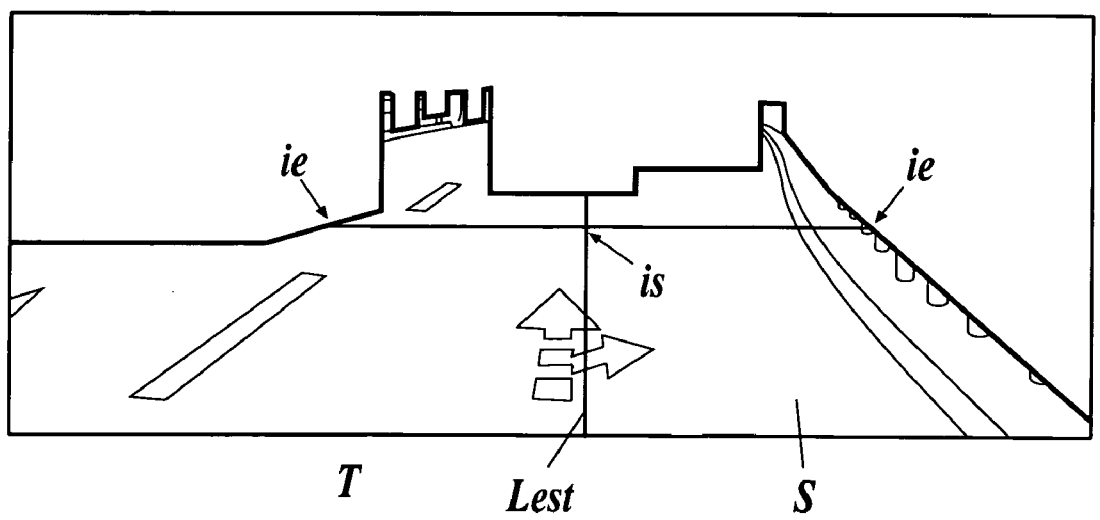
FIG. 5 is a figure illustrating the search region of a part other than the solid bodies of FIG. 4.

Moreover, if the road line recognition apparatus 1 of the present embodiment is configured to have the function of the vehicle exterior monitoring apparatus described in, for example, JP 3315054, then it is possible to extract solid bodies from the front sight in the state of being enclosed by frames using the reference image T imaged by the imaging apparatus 2 and a comparison image, as shown in FIG. 4. Accordingly, it is also possible to configure the road line recognition apparatus 1 to set a search region S to a part other than the extracted solid bodies as shown in FIG. 5 after having performed the processing beforehand, or simultaneously in parallel with the processing, and to perform the search in the set search region S.

The road line candidate point detection and conversion processing is designed to perform the Hough conversion of every road line candidate point detected by the search on the horizontal line j. In the present embodiment, the Hough conversion is performed using a known method.

The road line straight line detection processing unit 92 of the detection section 9 is configured to detect a straight line proper to a road line, i.e. a road line straight line by performing the following processing. The processing is to extract a single or a plurality of straight lines as road line candidates on both the right and the left sides of the own vehicle from a Hough plane obtained by performing the Hough conversion of the road line candidate points detected by the search to the right and the search to the left, to select one straight line proper to a road line to each of the right and the left sides from the extracted road line candidates based on the position, the behavior and the like of the own vehicle, and to turn down the straight lines unsuitable for the road lines based on the parallelism of the straight lines on both the right and the left sides and the like.

The road line detection processing unit 93 of the detection section 9 is configured to judge whether each road line candidate point is a pixel indicating a right road line or a left road line or not by referring to the road line straight lines detected by the processing in the road line straight line detection processing unit 92, and to record the road line candidate position judged to be a pixel indicating a road line as a road line position. The road line detection processing unit 93 is configured to detect a road line while following a road line in the state of a straight line or a curved line by tracing the relevant road line positions toward the upper side of the reference image T by reference to the detected road line positions.

Moreover, the road line detection processing unit 93 of the present embodiment is configured to detect a road line branching accompanied by the increase of a road width based on the obtained information of a road line for characterizing a road line position as a road line branching, and to detect whether a road line is a continuous line such as a no-passing line and a division line or a broken line for further characterizing a road line position as a continuous line or a broken line.

It is also possible to make detection section 9 be equipped with another function of, for example, detecting a pedestrian crossing on the reference image T.

Moreover, the road line recognition apparatus 1 of the present embodiment is configured to output the information of a detected road line, the information of road line positions characterized as a continuous line, a broken line and a road line branching, and the like. The road line recognition apparatus 1 is configured to output the information of the road line position and the like from the detection section 9 of the road line recognition apparatus 1 to various control units such as a not shown automatic transmission (AT) control unit, an engine control unit, a break control unit, a traction control system (TCS) control unit, a vehicle behavior control unit and the like. The information is scheduled to be used in each control unit as the information for control. Moreover, it is also possible to configure the road line recognition apparatus 1 to transmit the information of a road line or the like to a display section such as a monitor for displaying the information, or to transmit the information to an alarm device to issue a necessary warning.

Next, the operation of the road line recognition apparatus 1 according to the present embodiment is described. Incidentally the operation of the imaging section 2, the conversion section 3, the image correction unit 4 and the imaging processing section 6 is as stated above.

The detection section 9 recognizes a road line on the reference image T based on the basic flow shown in FIG. 6.

First, the road line candidate point detection and conversion processing unit 91 of the detection section 9 performs road line candidate point detection and conversion processing (Step S10), which is the first process of the basic flow. The concrete processing performed by the road line candidate point detection and conversion processing unit 91 is described in accordance with the flowchart shown in FIGS. 7A AND 7B. Here, the case where search is performed about all the regions of the reference image T is described. Incidentally although the case where the reference image T is searched from the presumption locus $L_{est}$ to the right is described below, it is also the same as when performing the search from the presumption locus Lest to the left, and the search to the left is carried out separately simultaneously.

The pixel at the intersection point of the horizontal line j on the $j^{th}$ row of the reference image T on which the search and the presumption locus $L_{est}$ mentioned above is set to the search start point is, and the search end point ie is set (Step S101). In the case of the present embodiment, as mentioned above, the search end point ie is the pixel at the right end on the horizontal line j of the reference image T.

Successively, it is judged whether the search pixel satisfies the following first start point conditions or not (Step S103) while making the search pixel offset to the right (Step S102).
[First Start Point Conditions]
Condition 1: the luminance $p1_{ij}$ of the search pixel is larger than the road surface luminance $p_{road}$ by the first start point luminance threshold value $p_{th1}$ or more, and edge strength $E_{ij}$ expressed by the derivative value of luminance is the first start point edge strength threshold value or more.
Condition 2: a point in the real space corresponding to the search pixel is situated on the road surface.

Here, the road surface luminance $p_{road}$ is calculated for every horizontal line j as a luminance value the frequency occurrence of which in the luminance histogram of the pixels on the horizontal lines j-1, j-2, j-3 and j-4 for four rows, on which the search has been already performed, directly under the row on which the search is now performed.

Figure 8A:
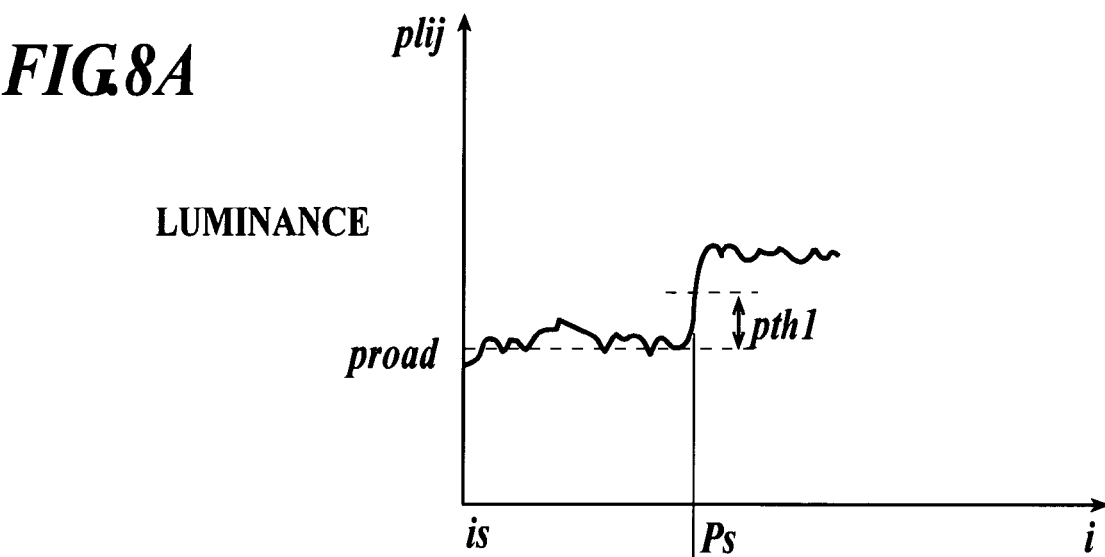
FIGS. 8A and 8B are figures illustrating a first start point luminance threshold value $p_{th1}$ and a first start point edge strength threshold value $E_{th1}$, respectively.
Figure 8B:
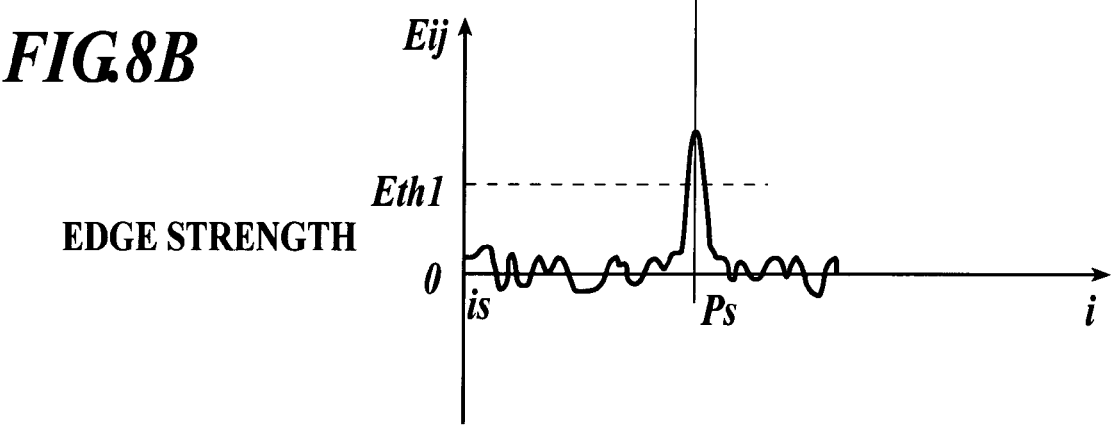

The condition 1 requires that the luminance $p1_{ij}$ of the search pixel becomes larger from the neighborhood of the road surface luminance $p_{road}$ by the magnitude of the first start point luminance threshold value $p_{th1}$, as shown in FIG. 8A, and that the edge strength $E_{ij}$, which is the derivative value of luminance in the pixel, is the first start point edge strength threshold value $E_{th1}$ or more, as shown in FIG. 8B. If a search pixel satisfies such conditions, there is the possibility that the search pixel is the point indicating an edge portion of a road line on the horizontal line j, i.e. a start point Ps.

However, even if a search pixel satisfies the condition 1, there is the possibility that the pixel is the pixel indicating an edge portion such as the part of a vehicle body such as a pillar, a bumper and the like of a preceding vehicle, a guard rail, a utility pole and the like. The pillar of a preceding vehicle and the like exist at a position higher than the road surface. Accordingly, for excluding the pixel of an edge portion when the pixel indicates a body existing at a position higher than the road surface even if the pixel satisfies the condition 1, the condition 2 requires that the point on the real space corresponding to a pixel having the possibility of being the start point Ps is on a road surface.

When the road line candidate point detection and conversion processing unit 91 judges that a search pixel satisfies the condition 1, the road line candidate point detection and conversion processing unit 91 reads the distance data of the search pixel, i.e. the parallax dp, from the distance data memory 8, and judges whether the read distance data satisfies the condition 2. Incidentally, as shown in FIG. 5, in case of limiting the search region S to the part other than solid bodies, the condition 2 becomes unnecessary because the search region S is limited on a road surface.

Figure 9:
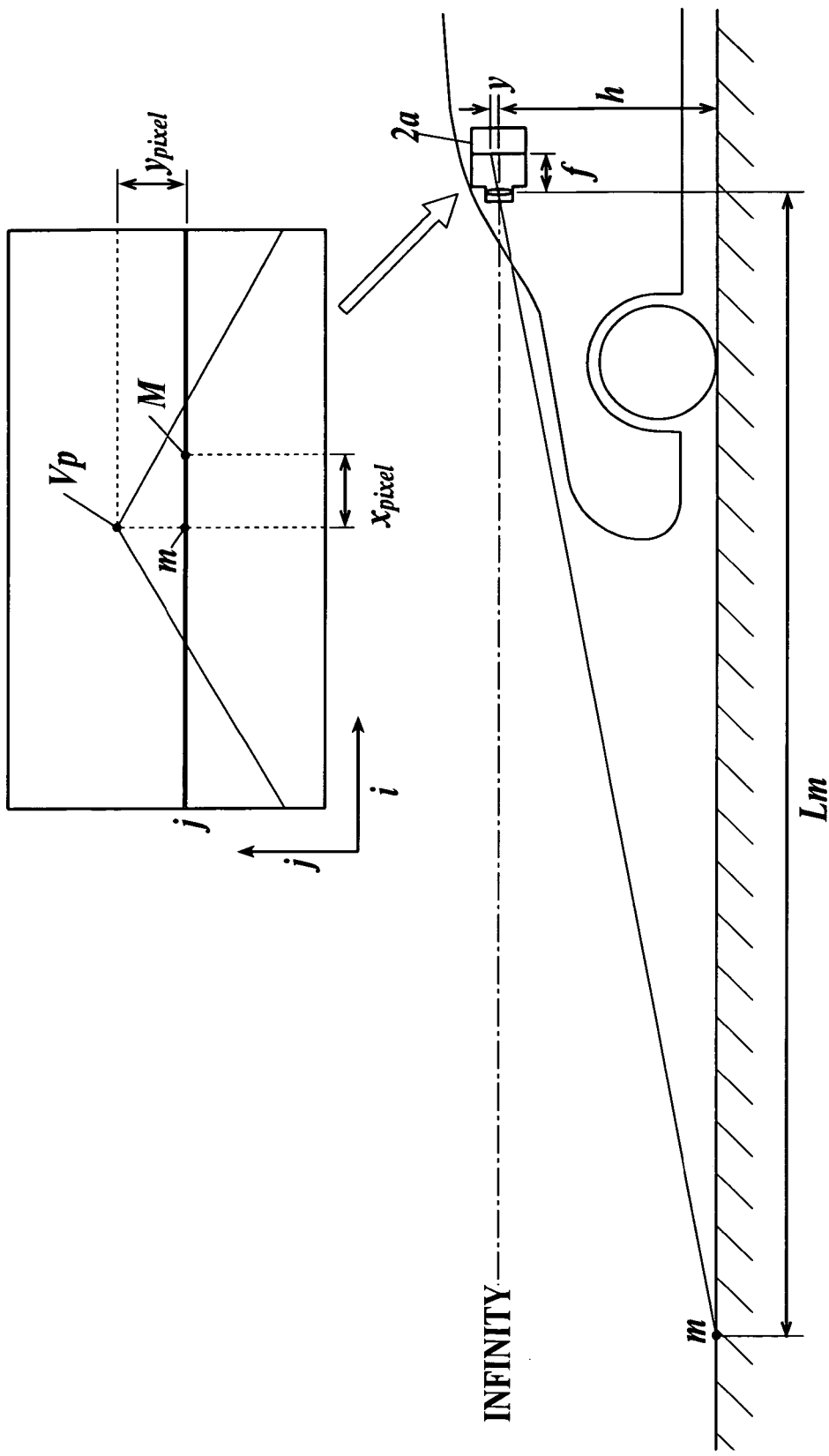
FIG. 9 is a figure illustrating a calculation method of a distance to a point on the road surface corresponding to a pixel on a reference image.

Here, a technique of judging whether the condition 2 is satisfied or not is simply described. As shown in FIG. 9, first, when the foot of a perpendicular line dropped from a vanishing point Vp to a horizontal line j to which a search pixel M belongs on the reference image T is supposed to be a pixel m, the point m in the real space corresponding to the pixel m is situated in the front of a own vehicle. When it is supposed that the point m is situated on the road surface, a misalignment y between the image of the point m at the image formation position of the main camera 2a and the vanishing point Vp is expressed by the following formula (5) where $L_m$ denotes the distance from the main camera 2a mounted on the own vehicle to the point m, f denotes the focus distance of the main camera 2a, and h denotes the installation height of the main camera 2a.

$$y = h \times f / L_m \tag{5}$$

Because the relation of $y_{pixel} = y/p$ is true when the pixel interval between the pixel m and the vanishing point Vp on the reference image T is denoted by $y_{pixel}$ and the pixel length is denoted by p, the pixel interval $y_{pixel}$ between the pixel m and the vanishing point Vp and the distance Lm from main camera 2a to the point m satisfy the relation of $$y_{pixel} = y/p = h \times f / (L_m \times p) \tag{6},$$

namely $$L_m = h \times f / (p \times y_{pixel}) \tag{7}.$$

Because the j coordinate of the vanishing point Vp is known beforehand, the distance $L_m$ from the own vehicle to the point m in the real space can be calculated based on formula (7) from the j coordinate of the horizontal line j.

Moreover, similarly, the distance $L_{m-M}$ between the point m on the real space and the point M on the road surface corresponding to the search pixel M can be calculated from the pixel interval $x_{pixel}$ between the pixel m and the search pixel M on the reference image T. Then, the distance $L_M$ in the real space between the own vehicle and the point M on the road surface is calculated from the distance $L_{m-M}$ and the distance $L_m$.

And the distance $L_M$ between the own vehicle and the road surface in the real space and the distance calculated based on the triangulation principle from the parallax dp of the pixel M read from the distance data memory are compared. When the distance $L_M$ and the distance calculated based on the triangulation principle agree with each other within a certain error range, it can be judged that the point M in the real space corresponding to the search pixel M is situated on the road surface. When the distance calculated based on the parallax dp is smaller than the distance $L_M$, it can be judged that the point M in the real space corresponding to the search pixel M is a pillar of a preceding vehicle existing on a position higher than the road surface or the like.

Incidentally, instead of performing the calculation for judging whether the conditions 2 is satisfied or not as mentioned above, for example, the judging may be performed by previously preparing a table in which a parallax is assigned to each pixel on the supposition that the road surface is a flat surface, and then by performing the judgment in contrast to the table. Moreover, when the correspondence between the horizontal line j and the parallax shifts by the behavior of a vehicle such as pitching, the gradient of a road surface, and the like, the calculation of the distance $L_M$ and the like is performed in consideration of also the point, or the values of the parallaxes of the table are amended.

Figure 7A:
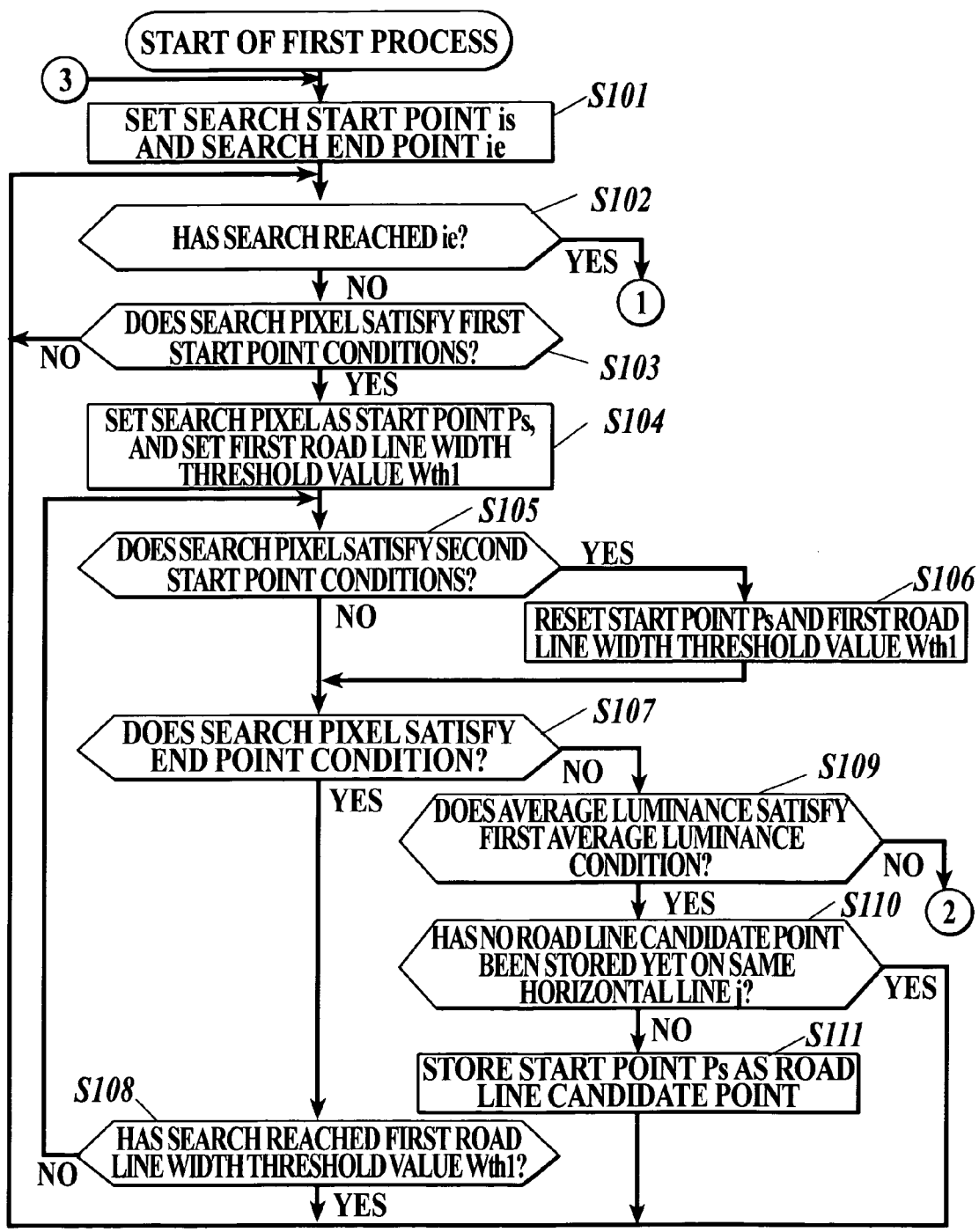
FIGS. 7A and 7B are flowcharts showing a processing in road line candidate point detection and conversion processing.
Figure 7B:
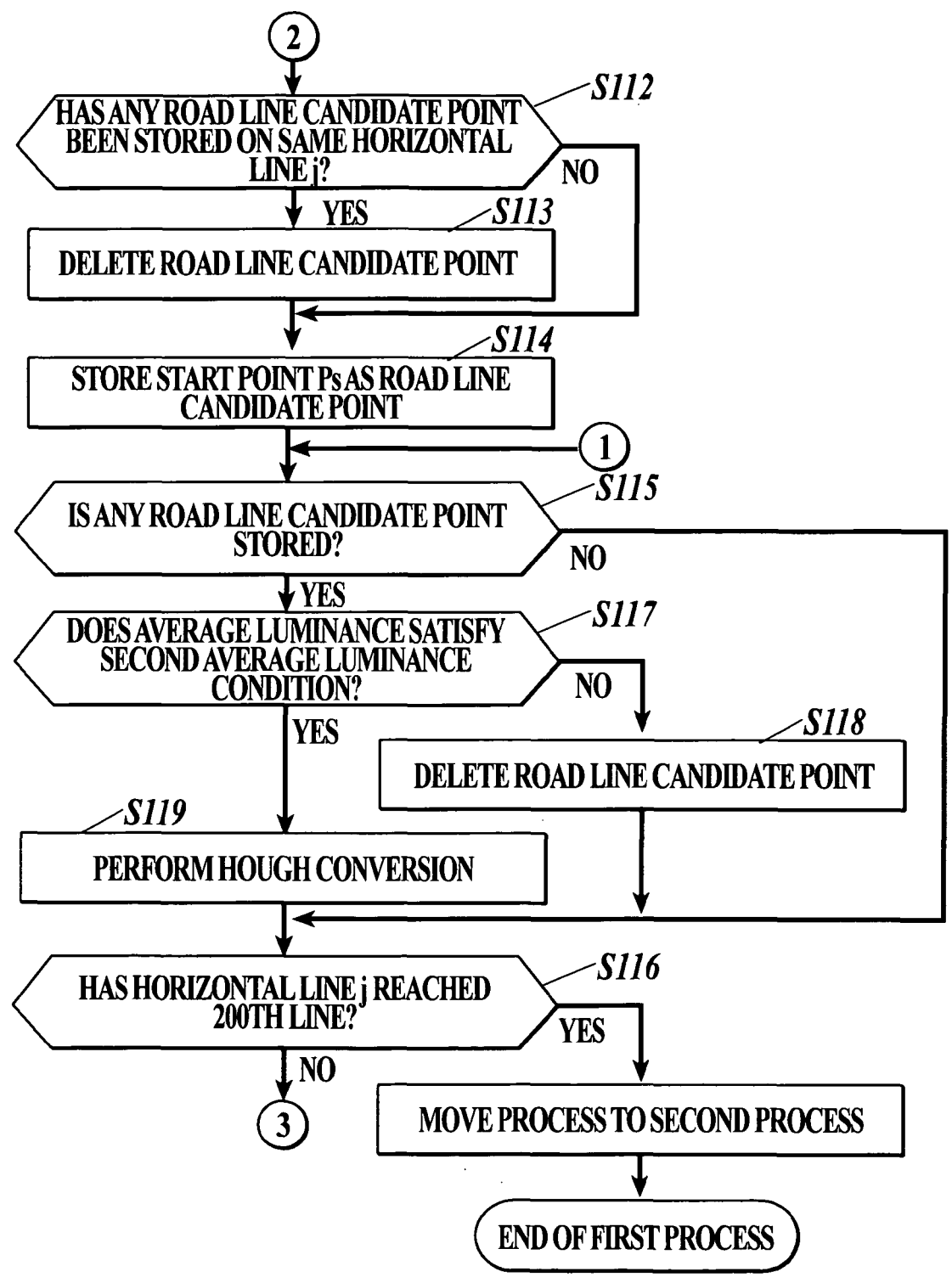

When the search pixel is judged to satisfy the first start point conditions (Step S103 in FIG. 7A: YES), the road line candidate point detection and conversion processing unit 91 sets the search pixel on the RAM as the start point Ps, and sets a first road line width threshold value Wth1 (Step S104).

In the present embodiment, the first road line width threshold value $W_{th1}$ is set to be a width of 30 cm in the right and left direction in the real space in case of being viewed from the own vehicle because a road line width is about 10 cm to about 15 cm in the real space. The first road line width threshold value $W_{th1}$ as the number of pixels corresponding to the threshold value of 30 cm of the road line width according to the distance $L_m$ from a own vehicle to the region in the real space corresponding to a horizontal line j is given to each horizontal line j as a table. Accordingly, the road line candidate point detection and conversion processing unit 91 reads the first road line width threshold value $W_{th1}$ corresponding to the horizontal line j to which search is performed from the table.

After the road line candidate point detection and conversion processing unit 91 has set the start point Ps and the first road line width threshold value $W_{th1}$, the road line candidate point detection and conversion processing unit 91 continues the search while offsetting to the right on the horizontal line j to judge whether the search pixel satisfies the following second start point conditions or not (Step S105).

[Second Start Point Conditions]

Condition 3: the luminance $p1_{ij}$ of the search pixel is larger than the road surface luminance $p_{road}$ by the second start point luminance threshold value $p_{th2}$ or more, and the edge strength $E_{ij}$ expressed by the derivative value of luminance is the second start point edge strength threshold value $E_{th2}$ or more, provided that $P_{th2} > p_{th1}$.

Condition 4: the difference between the average luminance of from the start point Ps to the pixel on the pixel at immediate left of the search pixel and the road surface luminance $p_{road}$ is the first road line average luminance threshold value $A_{th1}$ or less.

Condition 5: a point in the real space corresponding to the search pixel is situated on the road surface.

When a search pixel satisfies the second start point conditions (Step S105: YES), the set of the original start point Ps and the first road line width threshold value $W_{th1}$ is released, and the present search pixel is reset as a new start point Ps. Moreover, the first road line width threshold value $W_{th1}$ is also reset, being associated with the new start point Ps (Step S106).

Figure 10:
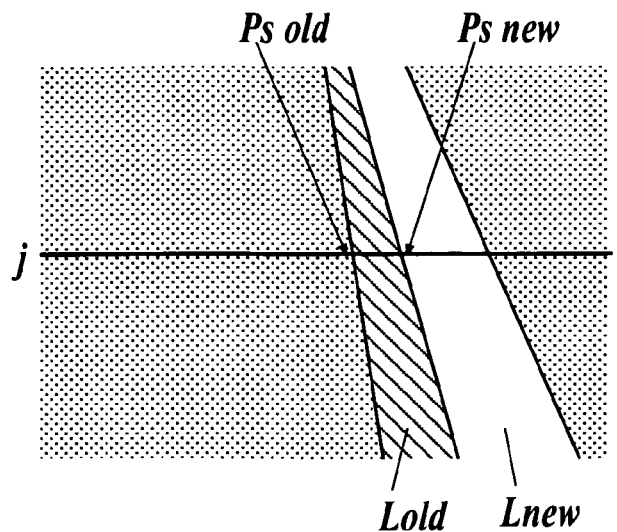
FIG. 10 is a figure illustrating a new road line overlapping with an old road line in part.

When a pixel Psold, which has satisfied the first start point conditions and has been set as the start point Ps, is actually a pixel corresponding to the end of an old fading road line $L_{old}$ and a newly repainted road line $L_{new}$ is drawn in partially overlapping with the old road line $L_{old}$ as shown in FIG. 10, the judgment of the second start point conditions is for canceling the setting of the original start point Ps to newly set a pixel $Ps_{new}$ corresponding to the end of the repainted road line $L_{new}$ as the start point Ps.

Figure 11A:
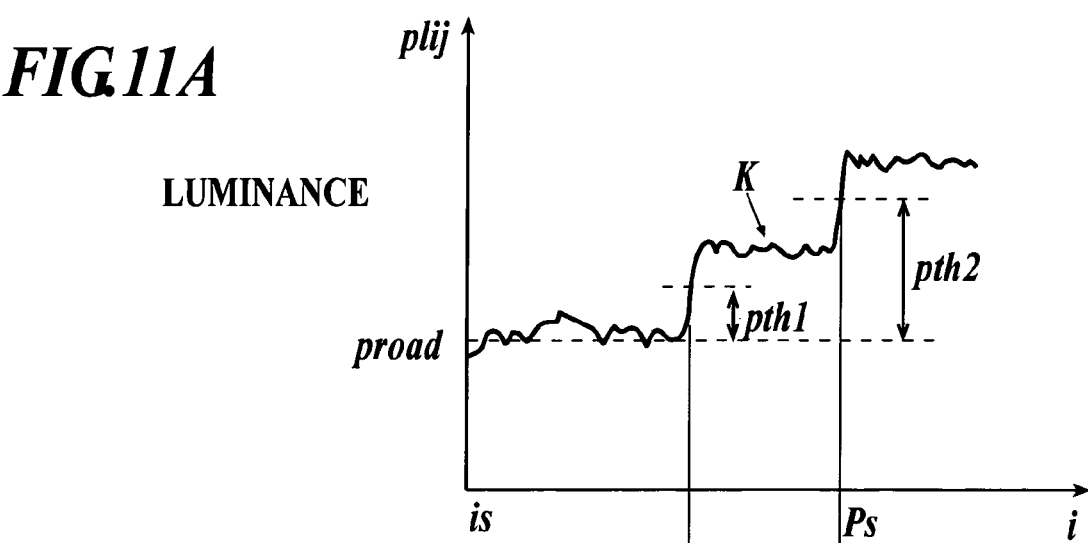
FIGS. 11A and 11B are figures illustrating a second start point luminance threshold value $p_{th2}$ and a second start point edge strength threshold value $E_{th2}$, respectively.
Figure 11B:
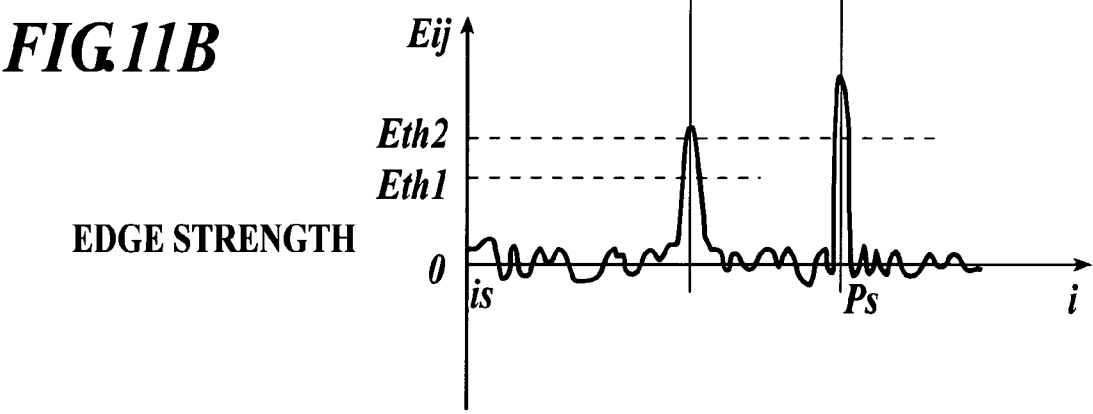

Consequently, because the pixels corresponding to the repainted road line $L_{new}$ have higher luminance than that of the pixels of the old road line $L_{old}$, in the condition 3 the second start point luminance threshold value $p_{th2}$ is set to be larger than the first start point luminance threshold value $p_{th1}$ as shown in FIG. 11A. Moreover, because it is expected that the derivative value of luminance at the edge portion of the repainted road line $L_{new}$ becomes larger in comparison with that of the old road line $L_{old}$, in the present embodiment the second start point edge strength threshold value $E_{th2}$ is set to be larger than the first start point edge strength threshold value $E_{th1}$. But, a start point edge strength threshold value is suitably set.

Moreover, the condition 4 means that the reset of the start point Ps is performed only when the difference between the average luminance of the region from the original start point Ps to the pixel at the immediate left of the present search pixel, namely the region K shown in FIG. 11A, and the road surface luminance $p_{road}$ is the first road line average luminance threshold value $A_{th1}$ or less. That is, when the average luminance of the region K is larger than the road surface luminance $p_{road}$ and the difference between them is larger than the first road line average luminance threshold value $A_{th1}$, it is thinkable that the road line corresponding to the region K is marked as a road line which is not the old road line but a road line which is alive in a sense now. Accordingly, it is unnecessary to reset the start point Ps.

Adversely when the average luminance of the region K is larger than the road surface luminance $p_{road}$ but the difference between them is the first road line average luminance threshold value $A_{th1}$ or less, i.e. when the condition 4 is satisfied, it is thinkable that the road line corresponding to the region K is the old road line $L_{old}$ and the present search pixel, the luminance of which has significantly changed, is at the edge portion of the newly repainted road line $L_{new}$. Accordingly, the start point Ps is reset. In this manner, the first road line average luminance threshold value $A_{th1}$ is an index indicating a live road line, and is set in order to extract such a road line $L_{new}$.

The condition 5 is similar to the condition 2 of the first start point conditions. When the road line candidate point detection and conversion processing unit 91 judges that a search pixel satisfies the conditions 3 and 4, the road line candidate point detection and conversion processing unit 91 reads the distance data of the search pixel, i.e. the parallax dp thereof, from the distance data memory 8, and judges whether the search data satisfies the condition 5 or not.

Moreover, the road line candidate point detection and conversion processing unit 91 also resets the first road line width threshold value $W_{th1}$ simultaneously with the reset of the start point Ps, as mentioned above, and the road line candidate point detection and conversion processing unit 91 newly starts to count whether the number of pixels for the first road line width threshold value $W_{th1}$ has been searched for from the start point Ps or not.

Incidentally, in the general road line detection, there are many cases of detecting a general road line from the beginning instead of detecting the road line $L_{new}$ repainted on the old road line $L_{old}$. In such cases, the search pixel satisfying the first start point conditions simultaneously satisfies the second start point conditions. Accordingly, the search pixel is set as the start point Ps when the search pixel satisfies the first start point conditions, and the first road line width threshold value $W_{th1}$ is set. And then the search pixel is instantaneously judged that it satisfies the second start point conditions, and the start point Ps and the like are reset. In this case, it is also possible to configure the road line candidate point detection and conversion processing unit 91 to omit the reset processing.

The road line candidate point detection and conversion processing unit 91 continues the search while further offsetting to the right on the horizontal line j, and judges whether the search pixel satisfies the following end point condition or not (Step S107 of FIG. 7A).

[End Point Condition]
Condition 6: the edge strength $E_{ij}$ expressed by the derivative value of luminance of a search pixel is an end point edge strength threshold value $-E_{th2}$ or less, or the luminance value of the search pixel is smaller than the luminance value at the start point Ps. Although the illustration is omitted, the condition 6 indicates that an end point Pe is a point where a search operation moves from a high luminance pixel corresponding to a road line to a low luminance pixel corresponding to a road surface.

Incidentally, although the absolute value of the end point edge strength threshold value $-E_{th2}$ is set to be the same as the absolute value of the second start point edge strength threshold value $E_{th2}$ in the present embodiment, the absolute value of the end point edge strength threshold value $-E_{th2}$ can be set to be a value different from that of the second start point edge strength threshold value $E_{th2}$. Moreover, in addition to the condition 6, it is also possible to add, for example, that the luminance $p1_{ij}$ of the search pixel is larger than the road surface luminance $p_{road}$ by the end point luminance threshold value $p_{th3}$ or more, and that the point in the real space corresponding to the search pixel is situated on a road surface, and the like as conditions.

When no point satisfying the end point condition, i.e. the end point Pe, is detected (Step S107: NO), the road line candidate point detection and conversion processing unit 91 performs the search until reaching the first road line width threshold value $W_{th1}$. When the end point Pe is not detected even if the search has reached the first road line width threshold value $W_{th1}$ (Step S108: YES), the road line candidate point detection and conversion processing unit 91 releases the settings of the start point Ps and the first road line width threshold value $W_{th1}$, and successively continues the search on the horizontal line j to repeat the processing from the judgment of whether the search pixel satisfies the first start point conditions or not (Step S103).

Moreover, when the end point Pe corresponding to the start point Ps satisfying the first start point conditions or the second start point conditions is detected (Step S107: YES), the road line candidate point detection and conversion processing unit 91 successively judges whether the average luminance from the start point Ps to a pixel at the immediate left to the end point Pe satisfies the following first average luminance condition or not (Step S109). And the road line candidate point detection and conversion processing unit 91 changes the contents of the processing after that based on the light and darkness of the luminance of the found road line.

[First Average Luminance Condition]
Condition 7: the difference between the average luminance of the pixels from the start point Ps to a pixel at the immediate left of the end point Pe and the road surface luminance $P_{road}$ is the first road line average luminance threshold value $A_{th1}$ or less.

In the present embodiment, the value same as the first road line average luminance threshold value $A_{th1}$ in the condition 4 of the second start point conditions is used as the first road line average luminance threshold value $A_{th1}$ in the condition 7. As mentioned above, the first road line average luminance threshold value $A_{th1}$ is a threshold value separating the average luminance corresponding to the fading old road line $L_{old}$ from the average luminance corresponding to the newly repainted road line $L_{new}$.

When the road line candidate point detection and conversion processing unit 91 judges that the average luminance from the start point Ps to the pixel at the immediate left of the end point Pe satisfies the first average luminance condition (Step S109: YES), namely when the road line candidate point detection and conversion processing unit 91 judges that the road line is one having low average luminance, the road line candidate point detection and conversion processing unit 91 sets the start point Ps as the road line candidate point to save the coordinate (i, j) of the start point Ps on the image plane of the reference image T in a not shown storage section (Step S111) when no road line candidate points on the same horizontal line j are saved in the storage section (Step S110: NO).

Moreover, when a road line candidate point has been already saved on the same horizontal line j (Step S110: YES), the road line candidate point detection and conversion processing unit 91 does not save the start point Ps which has been detected this time, and releases the settings of the start point Ps and the first road line width threshold value $W_{th1}$. Then, the road line candidate point detection and conversion processing unit 91 successively continues the search on the same horizontal line j to repeat the processing from the judgment of whether a search pixel satisfies the first start point conditions or not (Step S103).

Thus, when only a road line with low average luminance is found in this manner, the road line candidate point detection and conversion processing unit 91 continues the search on the horizontal line j to search for a road line with high average luminance. When the road line candidate point detection and conversion processing unit 91 cannot find any road line with high average luminance, the start point Ps of a road line with low average luminance which has been first found is set as the road line candidate point on the horizontal line j.

On the other hand, when the road line candidate point detection and conversion processing unit 91 judges that the average luminance of the pixels from the start point Ps to the pixel at the immediate left of the end point Pe does not satisfy the first average luminance condition (Step S109: NO), namely when the road line candidate point detection and conversion processing unit 91 judges that the road line is one with high average luminance, the road line candidate point detection and conversion processing unit 91 deletes a road line candidate point of a road line with low average luminance which candidate point has been already saved at the time of the search on the same horizontal line j (Step S113) when such a road line candidate point exists (Step S112: YES), and saves the present start point Ps as a road line candidate point (Step S114).

In this manner, in the present embodiment, when a road line which has high average luminance and is alive in a sense is found, a road line candidate point to a road line which has low average luminance is deleted, and the start point Ps of the road line with the high average luminance is saved as the road line candidate point to break off the search on the horizontal line j.

Incidentally, in addition, the road line candidate point detection and conversion processing unit 91 can be configured, for example, to save all of the start points Ps of the pixel portions which satisfy the end point condition to be judged to be road lines as road line candidate points, or to continue the search on the horizontal line j after finding a road line with high average luminance.

In the present embodiment, there are three cases where the search on the horizontal line j is ended as described above. One of them is a case where a road line having high average luminance has been found and the search is broken off. Another is a case where only road lines having low average luminance have been found and the search has reached the search end point ie. The other one is a case where no road lines have been found and the search has reached the search end point ie.

When the search on the horizontal line j ends, the road line candidate point detection and conversion processing unit 91 judges whether any road line candidate point is saved or not (Step S115). If no road line candidate points are saved (Step S115: NO), the road line candidate point detection and conversion processing unit 91 judges whether the horizontal line j has reached the $200^{th}$ row (Step S116). When the horizontal line j has not reached the $200^{th}$ row (Step S116: NO), the road line candidate point detection and conversion processing unit 91 shifts the horizontal line to be searched upward by one pixel to the reference image T, and repeats the processing procedure described above.

If a road line candidate point is saved (Step S115: YES), the road line candidate point detection and conversion processing unit 91 judges whether the average luminance of the pixels from the road line candidate point to the pixel at the immediate left of the end point Pe satisfies the following second average luminance condition or not (Step S117).

[Second Average Luminance Condition]

Condition 8: the difference between the average luminance of the pixels from a road line candidate point to the pixel at the immediate left of the corresponding end point Pe and the road surface luminance $p_{road}$ is a second road line average luminance threshold value $A_{th2}$ or more.

In the present embodiment, as described above, the first road line average luminance threshold value $A_{th1}$ is a threshold value separating the average luminance corresponding to a fading old road line $L_{old}$ and the average luminance corresponding to a newly repainted road line $L_{new}$. The second road line average luminance threshold value $A_{th2}$ in the condition 8 makes off the difference of the minimum average luminance required as the road line and the road surface luminance $p_{road}$, and a value smaller than the first road line average luminance threshold value $A_{th1}$ is suitably set.

When the road line candidate point detection and conversion processing unit 91 judges that a road line candidate point does not satisfy the second average luminance condition (Step S117: NO), the road line candidate point detection and conversion processing unit 91 deletes the road line candidate point (Step S118), and judges whether the horizontal line j has reached the $200^{th}$ row or not (Step S116). When the horizontal line J has not reached the $200^{th}$ row (Step S116: NO), the road line candidate point detection and conversion processing unit 91 upward shifts the horizontal line to be searched for one pixel to the reference image T, and repeats the processing procedure described above.

At the step at which the road line candidate point detection and conversion processing unit 91 has judged that a road line candidate point satisfies the second average luminance condition (Step S117: YES), it results in that the road line candidate point has finally detected on the horizontal line j.

Successively, the road line candidate point detection and conversion processing unit 91 executes the Hough conversion of the road line candidate point detected on the horizontal line j as described above (Step S119). Incidentally the Hough conversion aims at detecting a straight line from a plurality of points on the reference image T.

In the present embodiment, as described above, a well-known method is used for the Hough conversion. To put it concretely, for example, when it is supposed that a coordinate on the reference image T of a detected road line candidate point is set to $(I_j, J_j)$, and that the road line candidate point exists on the following straight line on the reference image T $$i=aj+b \qquad (8),$$

the coordinates $I_j$ and $J_j$ satisfy the following formula (9)

$$I_j=aJ_j+b \qquad (9).$$

The above formula (9) can be transformed to $$B=-J_j \times a+I_j \qquad (10).$$

Figure 12:
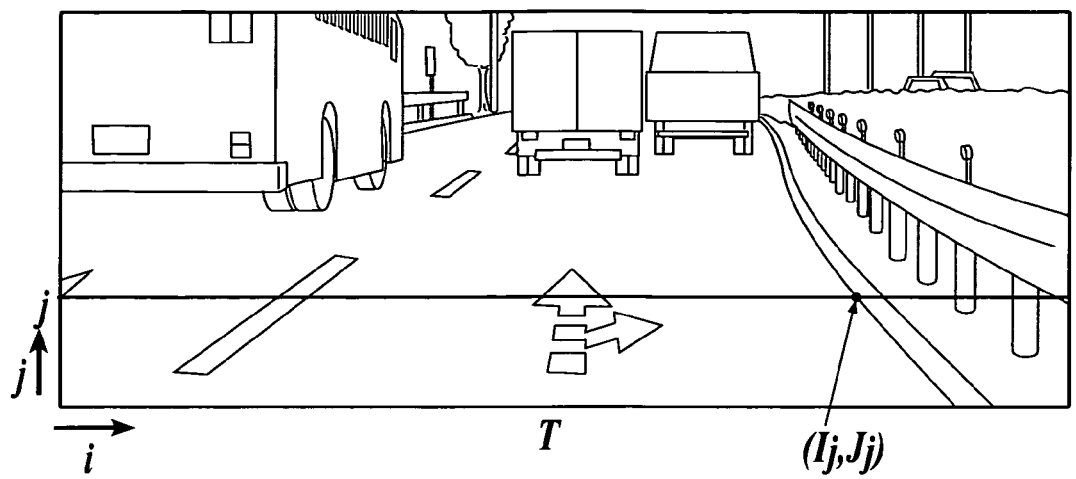
FIG. 12 is a figure illustrating a road line candidate point detected on a horizontal line j.
Figure 13:
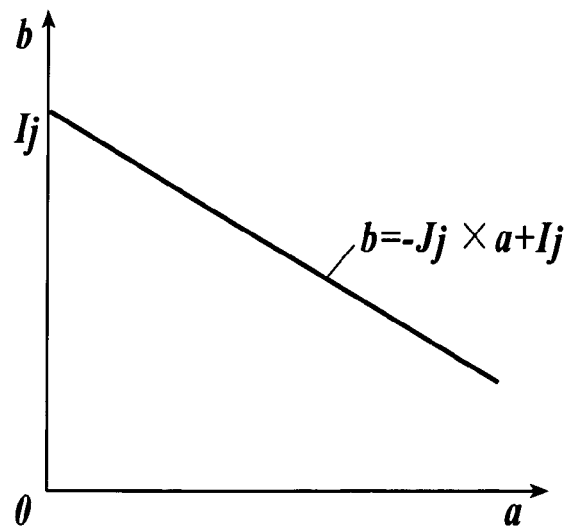
FIG. 13 is a figure illustrating a straight line drawn on an a-b plane, which is a Hough plane.

As it can be known from the formula (10), when a road line candidate point $(I_j, J_j)$ is detected on a horizontal line j by the road line candidate point detection processing as shown in FIG. 12, one straight line can be drawn on an a-b plane, which is the Hough plane, as shown in FIG. 13 by setting the coordinates $I_j$ and $-J_j$ as the b intercept and the gradient, respectively.

Figure 14:
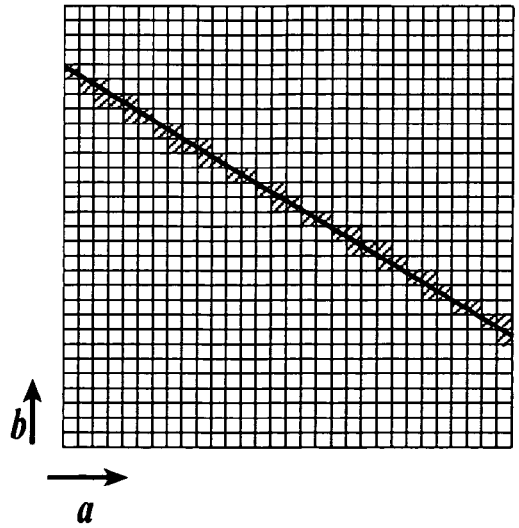
FIG. 14 is a diagram illustrating the squares of the a-b plane on which a straight line passes.

The a-b plane is comparted into squares of a predetermined size as shown in FIG. 14. When the straight line expressed by the formula (10) is drawn, the counted value of the squares such as the squares which include oblique lines shown in FIG. 14 and are passed through by the straight line is increased by one. Incidentally, because predetermined values of a and b correspond to each square on the a-b plane, the selection of a square on the a-b plane is synonymous with the selection of the values of corresponding a and b, namely the selection of the straight line on the reference image T expressed by the formula (8).

The road line candidate point detection and conversion processing unit 91 performs a search while shifting the horizontal line j upward one pixel by one pixel to the reference image T, and performs the Hough conversion at every time of detecting a road line candidate point to add the counted value of the squares on the a-b plane. When the search has been finally completed to the $200^{th}$ row at the uppermost level of the reference image T, as shown in a region A of FIG. 15, a plurality of road line candidate points is obtained, and each square on the a-b plane becomes the state in which a counted value is severally added.

Figure 15:
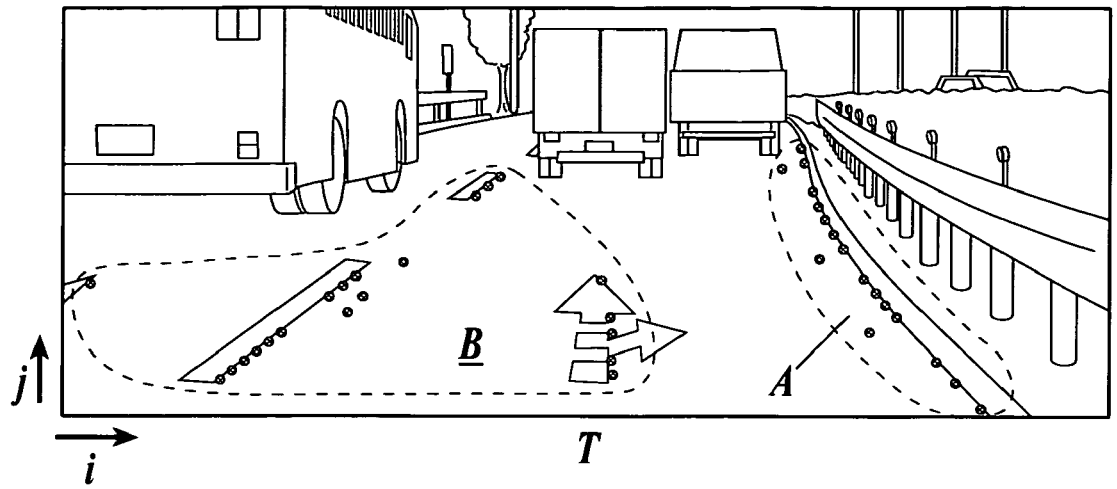
FIG. 15 is a figure showing road line candidate points detected by search on a horizontal line.

Incidentally, although road line candidate points are shown to be sparsely detected in a sense on the reference image T and in the real space in FIG. 15 and the following drawings, it is needless to say that a lot of road line candidate points are more finely detected actually. Moreover, although the description has been given in the above to the case where the search is preformed on the horizontal line j in the reference image T from the presumption locus Lest to the right, similar processing is simultaneously performed also in the case where the search is performed from the presumption locus Lest to the left. As shown in a region B of FIG. 15, a plurality of road line candidate points is obtained, and an a-b plane is created separately from the case of the rightward search. Each square on the a-b plane becomes the state in which a counted value is severally added.

Moreover, the Hough conversion is not limited to the method described above, but the Hough conversion may be performed to form the state in which a counted value is severally added to each square on a $\rho$-$\theta$ plane, for example, on the supposition that a road line candidate point $(I_j, J_j)$ is situated on a straight line $$\rho = i \sin\theta + j \cos\theta \quad (11),$$

that is $$\rho = I_j \sin\theta + J_j \cos\theta \quad (12)$$

is true.

Moreover, the origin of the straight line at the time of supposing that the road line candidate point $(I_j, J_j)$ exists on the straight line i=aj+b may be set anywhere, and it is possible to set the origin at the pixel in the bottom left corner in the image plane similarly to the origin of the reference image T. In the present embodiment, the pixel at the middle of the pixel row at the lowermost row in the reference image T, i.e. the pixel at the coordinate (256, 0), is set as the origin of the straight line.

When the Hough conversions of all of the road line candidate points detected by the searches to the right and to the left on the horizontal line j and the addition of the counted value to each square on the two a-b planes have been completed (Step S116: YES), the road line candidate point detection and conversion processing (Step S10), which is the first process of the basic flow shown in FIG. 6, ends.

Incidentally, in the road line candidate point detection described above, for example, when the snow which lies on the road is gathered up on the side of the road, there is the possibility that the snow and the pixels in the edge portions of the road surface are falsely detected as the road candidate points.

Figure 16:
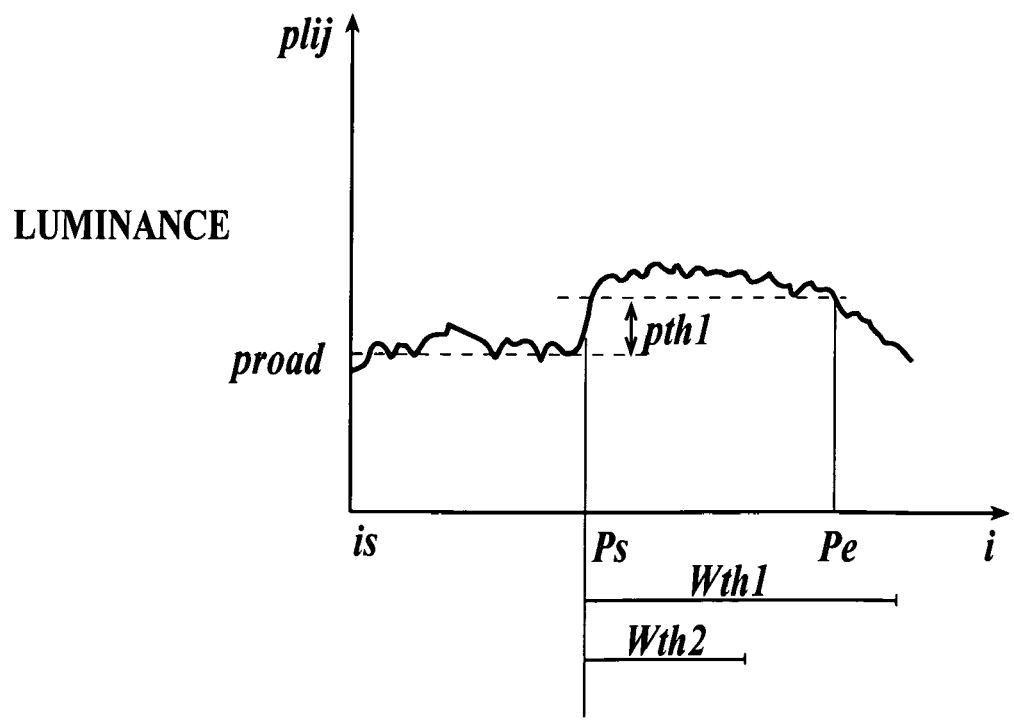

That is, when snow is imaged in the portions of the side of the road on the basic image T and a search is performed along the horizontal line j, there is the case where, as shown in FIG. 16, at the start point Ps, the luminance $p1_{ij}$ becomes larger than the road surface luminance $p_{road}$ by the first start point luminance threshold value pth1 or more and to satisfy the first start point conditions. Then the further search is performed on the horizontal line j. When the end point Pe at which the search pixel satisfies the end point condition is detected within the first road line width threshold value $W_{th1}$ and further the search pixel does not satisfy the first average luminance condition, namely when the difference between the average luminance from the start point Ps to the end point Pe and the road surface luminance $p_{road}$ is larger than the first road line average luminance threshold value $A_{th1}$, the start point Ps is saved as a road line candidate point to be falsely detected.

Accordingly, it is desirable to constitute the road line candidate point detection to exclude the start point of the pixel portion corresponding to the snow from the road line candidate points. To put it concretely, for example, by focusing attention on the fact that the average luminance of the pixels of the portion corresponding to snow is generally smaller than the average luminance of the pixels of the portion corresponding to a road line, the road line candidate detection is configured to judge whether there is the possibility that the high luminance pixel portion is the portion corresponding to the snow or not based on the following snow and the like judgment condition before performing the judgment of the road line candidate point detection and conversion processing unit 91 about whether the second average luminance conditions are satisfied or not (Step S117 in FIG. 7B).

[Snow and the Like Judgment Condition]

Condition 9: the derivative value of luminance at the start point Ps corresponding to a detected road line candidate point is smaller than a third start point edge strength threshold value $E_{th3}$, and the number of pixels from the start point Ps to the end point Pe is larger than a second road line width threshold value $W_{th2}$, wherein $E_{th3} > E_{th1}$, $W_{th2} < W_{th1}$.

Here, at a start point equivalent to snow, the derivative value of luminance at a start point corresponding to a road line is small, and a luminance value frequently increases gently at the start point without rising clearly. Accordingly, the third start point edge strength threshold value $E_{th3}$ having a comparatively large value equivalent to the derivative value of luminance at the start point corresponding to the road line is set, and the selection is first performed based on the fact of whether the derivative value of luminance at the start point Ps is larger than the threshold value or smaller than the threshold value.

And the width of the pixel portion equivalent to the snow generally appears to be larger than the width of the pixel portion corresponding to road line. Accordingly, the second road line width threshold value $W_{th2}$ is set to be comparatively narrow so that it may be about 20 cm in the real space correspondingly to the width of a general road line, and further selection is performed based on whether the number of pixels from the start point Ps to the end point Pe is larger than the second road line width threshold value $W_{th2}$ or smaller than it.

When the road line candidate point detection and conversion processing unit 91 judges that the start point Ps corresponding to a road line candidate point satisfies the snow and the like judgment condition and there is the possibility that the high luminance pixel portion is the portion equivalent to snow, the road line candidate point detection and conversion processing unit 91 resets the second road line average luminance threshold value $A_{th2}$, which marks off the difference between the average luminance required at the minimum as a road line and the road surface luminance $p_{road}$ and becomes the basis of the judgment of the second average luminance condition (Step S117), to a value higher than the present situation value.

When the difference between the average luminance of the pixels from the start point Ps to the end point Pe and the road surface luminance $p_{road}$ is the second road line average luminance threshold value $A_{th2}$ which has been newly reset to be higher, or more, the road line candidate point corresponding to the start point Ps is considered as the object of the Hough conversion. When the difference is smaller than the second road line average luminance threshold value $A_{th2}$, the possibility of the false detection of snow or the like is regarded to be high, and the road line candidate point is deleted not to be set as the object of the Hough conversion. Thus, it is possible to reduce the false detection of a road line candidate point by snow or the like.

On the other hand, adversely to the case of the snow or the like, there is the case where, although a road line candidate point to be considered to correspond to a road line has been obtained, the average luminance of the pixels from the start point Ps to the end point Pe does not satisfy the second road line average luminance threshold value $A_{th2}$, which makes off the difference between the average luminance required as the road line at the minimum and the road line surface luminance $p_{road}$, and the road line candidate point is deleted from being a road line candidate point.

Figure 17:
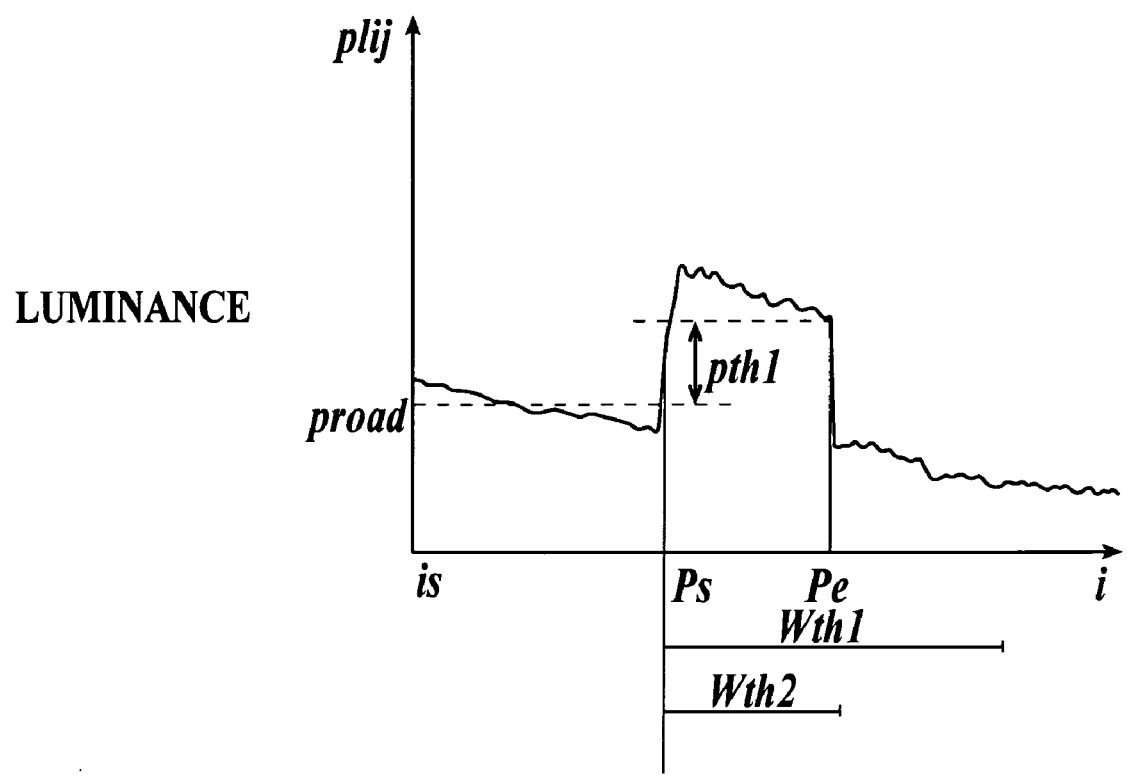

For example, in a tunnel or the like, the illumination in the tunnel does not sufficiently reach a road line near to the wall surface of the tunnel, and as shown in FIG. 17, there is a case where the start point Ps satisfies the first start point conditions and the end point Pe satisfies the end point condition but the average luminance of the pixels from the start point Ps to the end point Pe does not satisfy the second road line average luminance threshold value $A_{th2}$.

It is more preferable to leave such a road line candidate point corresponding to the start point Ps as it is, and to make the object of the Hough conversion under such a dark situation. Specifically, the road line candidate point detection and conversion processing unit 91 judges, for example, judges whether the following tunnel and the like judgment condition is satisfied or not before performing the judgment of whether the snow average luminance condition is satisfied or not (Step S117 in FIG. 7B) like the snow and the like judgment condition. And when the condition is satisfied, the road line candidate point detection and conversion processing unit 91 judges that there is the possibility that the high luminance pixel portion becomes dark in a tunnel, and resets the second road line average luminance threshold value $A_{th2}$ to be a value lower than the present situation value.

[Tunnel and the Like Judgment Condition]

Condition 10: the derivative value of luminance at the start point Ps corresponding to a detected road line candidate point is the third start point edge strength threshold value $E_{th3}$ or more, and the number of the pixels from the start point Ps to the end point Pe is the second road line threshold value $W_{th2}$ or less, wherein $E_{th3} > E_{th1}$, $W_{th2} < W_{th1}$.

That is, when the derivative value of luminance at the start point Ps is equal to or more a comparatively large value of the third start point edge strength threshold value E3 equivalent to the derivative value of luminance at the start point corresponding to the road line described above, and when the number of pixels from the start point Ps to the end point Pe is equal to or less the second road line threshold value $W_{th2}$, which is set to be comparatively narrow correspondingly to the width of a general road line described above, the possibility that the road line candidate point is obtained correspondingly to the road line. Accordingly, the second road line average luminance threshold value $A_{th2}$ is reset to be a value lower than the present situation value to make it easy that the second road line average luminance threshold value $A_{th2}$ is left as a road line candidate point.

When such a configuration is adopted, it becomes possible to precisely detect a road line candidate point corresponding to a road line darkly imaged in the tunnel or the like, and to detect the road line more precisely. Incidentally, the newly reset second road line average luminance threshold value $A_{th2}$ may be configured so that it is used as it is in search of the horizontal line j+1 following the present horizontal line j, or may be configured to be returned to the original value in the search of the line after the horizontal line j+1.

Next, the processing moves to road line straight line detection processing (Step S20), which is the second process of the basic flow. The road line straight line detection processing is performed by the road line straight line detection processing unit 92 of the detection section 9.

The road line straight line detection processing unit 92 performs the processing of extracting a singular or a plurality of squares having large counted values severally from each of the a-b planes of searches to the right and to the left which have been obtained by the Hough conversion, namely extracting a singular or a plurality of straight lines on the reference image T expressed by the formula (8) severally, and performing judgment from the position, the behavior and the like of the own vehicle to select one proper straight line as a road line to each of the right and the left. Moreover, the road line straight line detection processing unit 92 performs the processing of turning down the straight lines unsuitable as the road lines based on the parallelism of the selected straight lines on the both of the right and the left sides and the like to detect the road line straight lines.

To put it concretely, first, the a value is changed at each row in which the be value is fixed in the a-b plane in which the counted value is calculated to each square to obtain the square to which the counted value becomes the maximum and the maximum value. When the maximum value is plotted to the b, a distribution shown in FIG. 18 can be obtained.

Figure 18:
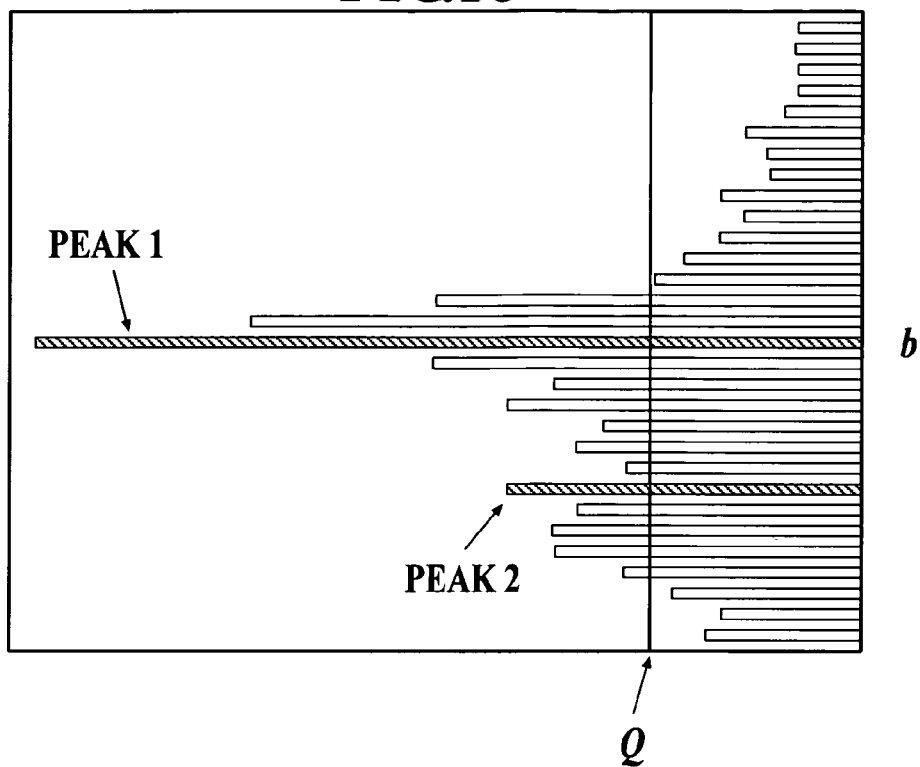
FIG. 18 is a graph showing a distribution of the maximum values of counted values of each line on the a-b plane.

In the present embodiment, the road line straight line detection processing unit 92 extracts an average value of the distributions obtained in this manner as a peak threshold value Q, and extracts the maximum value of the distributions and the local maximal values exceeding the peak threshold value Q as straight lines as candidates indicating road lines, i.e. as peak straight lines. In a distribution as shown in FIG. 18, a peak straight line r1 being the maximum value and a peak straight line r2 being the local maximal value are extracted. Similar operations are performed to the a-b plane obtained by the leftward search on the horizontal line j to extract peak straight lines l1, l2, . . . .

Figure 19:
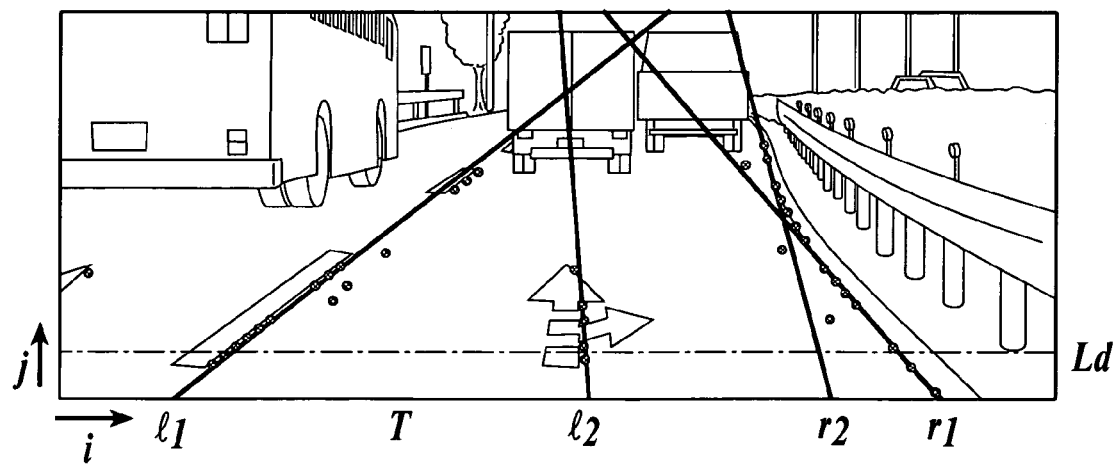
FIG. 19 is a figure showing peak straight lines on a reference image.
Figure 20:
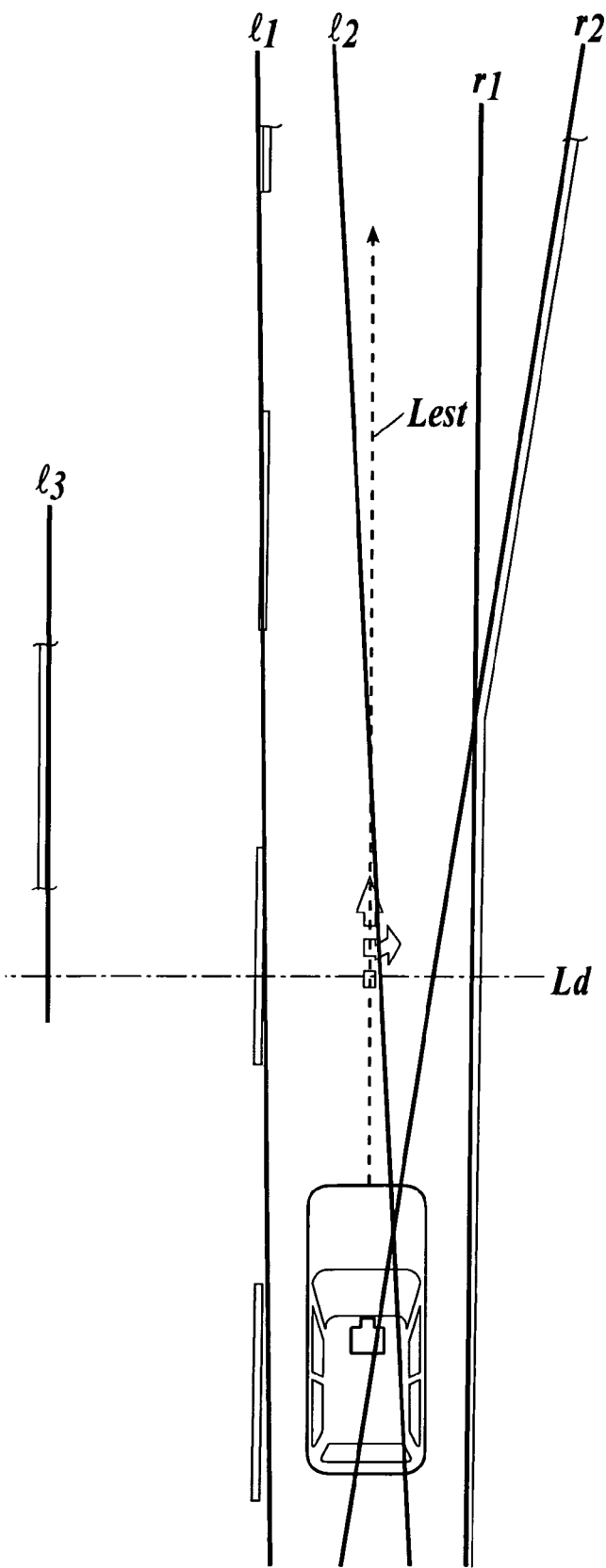
FIG. 20 is a figure showing the peak straight lines of FIG. 19 on a real space.

If the peak straight lines extracted in this manner are expressed in the reference image T, they can be expressed for example as shown in FIG. 19. If the straight lines are expressed in the real space, they can be expressed as shown in FIG. 20.

Incidentally the method of extracting the peak straight lines is not limited to the method described above, and for example it is also possible to set all of the peak straight lines having the distributions exceeding the peak threshold value Q as the peak straight lines. Moreover, in the present embodiment, when no prominent peaks are found in the distribution as shown in FIG. 18, the detection of a road line is judged to be failed, and the extraction of peak straight lines are designed not to be performed.

Successively, the road line straight line detection processing unit 92 turns down the peak straight lines suiting with the following selection conditions between a plurality of extracted peak straight lines, and performs the selection until only one peak straight line can be obtained to each case of the rightward and the leftward searches.

[Selection Conditions]

Condition 11: the position of a peak straight line at a predetermined front distance exists inside of the positions of the width of a vehicle which is converted from the center of a own vehicle. However, in case of a continuously detected road line, the condition 11 is not applied when variations from the road line position detected the last time is within a predetermined threshold value.

Condition 12: the parallelism with the presumption locus $L_{est}$ of a own vehicle is larger than a certain threshold value.

Condition 13: if there are a peak straight line situated at a position where the right and left difference distance from the center of the own vehicle in a predetermined front distance expressed by an alternate long and short dash line Ld in FIGS. 19 and 20 is farther than a predetermined value far_th and a peak straight line situated at a position where the right and left difference distance is nearer than a predetermined value near_th, a peak straight line corresponds to the one situated farther than the predetermined value far_th, wherein far_th>near_th.

Incidentally, when a plurality of peak straight lines exist even after the selection in accordance with the conditions 11-13, the following condition 14 is applied.

Condition 14: the peak straight line nearest to the road line presumption center position presumed from the position and the width of the road line detected the last time is left.

Incidentally, in the present invention, the road line detected the last time, the road line position detected the last time, which will be described later, and the like indicate the road line, the road line position and the like detected immediately before the road line recognition processing executed at the present time, namely the ones detected by the processing before by one sampling period, in the case where the detection section 9 is continuously detecting the road lines in a predetermined sampling period. However, the term of the last time is not necessarily limited to the last processing, but it is suitably determined how long the time when the processing bringing about the result to be employed has been performed should be retroacted.

At a position comparatively near to the own vehicle, a road line is generally imaged at a position distant in some measure from the center of the own vehicle. Moreover, when the position of a peak straight line exists on the inside of the position of the width of the vehicle converted from the center of the own vehicle as shown in FIG. 19, there are many chances of recognizing a road mark marked at the center of the road, a white trace of a tire of the front vehicle which is remaining on the road in a rainy whether or the like, and the like as a road line by mistake. Accordingly, the condition 11 means performing turning down a peak straight line when the peak straight line is situated on the inside of the width of the vehicle at a position comparatively near to the own vehicle. Consequently, the peak straight lines r2 and 12 shown in FIGS. 19 and 20 are turned down by the condition 11.

Incidentally the proviso of the condition 11 is attached in consideration of the continuity from the road line detected the last time in case of a lane changing and the like. In this case, the peak straight lines are not turned down. That is, even when the peak straight lines are situated on the inside of the width of the vehicle, the possibility that the own vehicle straddles a road line after performing a lane changing when a variation from the road line detected the last time is small. Accordingly, the proviso means that the peak straight line is not turned down from the peak straight line as a candidate of a road line straight line but the peak straight line is left as a candidate.

Figure 21:
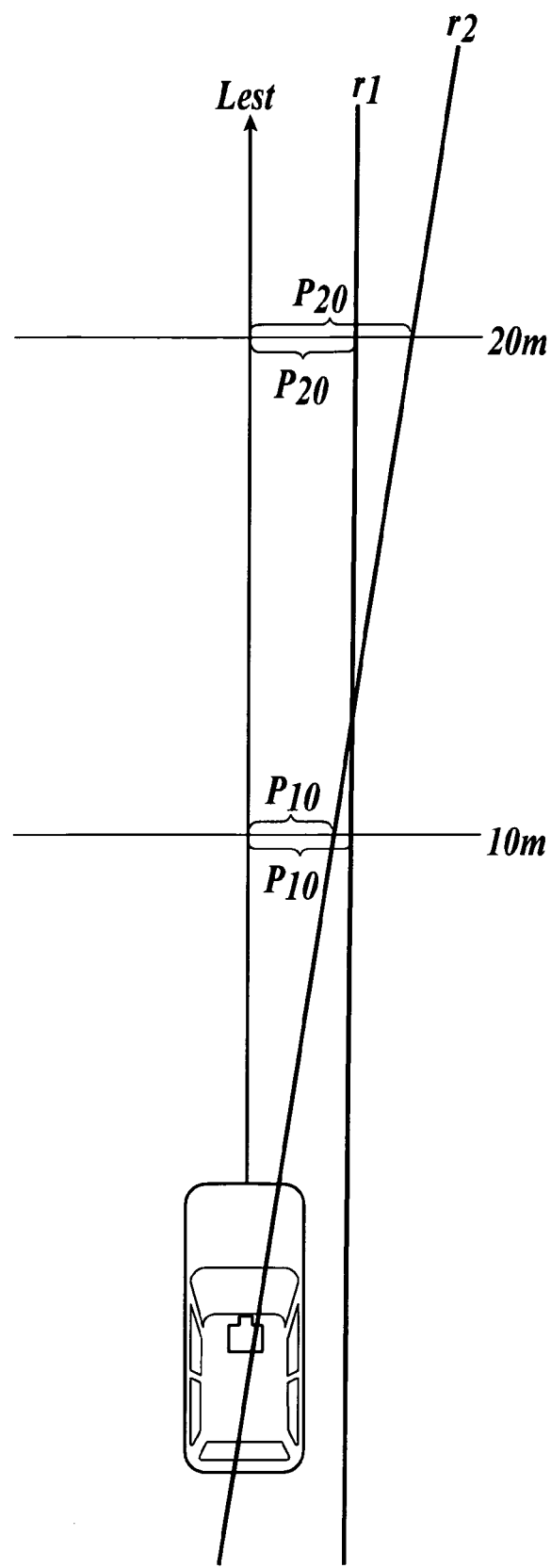
FIG. 21 is a figure illustrating a calculation method of the parallelism between a peak straight line and the presumption locus of a own vehicle.

The condition 12 means excluding the peak straight lines with the small parallelism with the presumption locus $L_{est}$ of the own vehicle described above. In the present embodiment, the parallelism of the peak straight line with the presumption locus $L_{est}$ of the own vehicle is expressed by, for example, as shown in FIG. 21, a value obtained by dividing the absolute value $|p_{10}-p_{20}|$ of the difference between distances $p_{10}$ and $p_{20}$ by an interval 10 m, where the distances $p_{10}$ and $p_{20}$ are ones between the presumption locus $L_{est}$ of the own vehicle and a peak straight line at the front of the own vehicle by 10 m and 20 m in the real space. The smaller the value of the parallelism, the higher the degree of being parallel is expressed. Even if the peak straight line r2 of FIG. 20 clears the condition 11, it is turned down by the condition 12. Incidentally the parallelism can be calculated by other calculation methods as long as the methods can indicate the degree of the parallel between the presumption locus Lest of the own vehicle and the peak straight line by a numeral value.

Moreover, the condition 13 means excluding, for example, a peak straight line l3, when the peak straight line l3 corresponding to a road line of the next course is extracted, as shown in FIG. 20.

Figure 26:
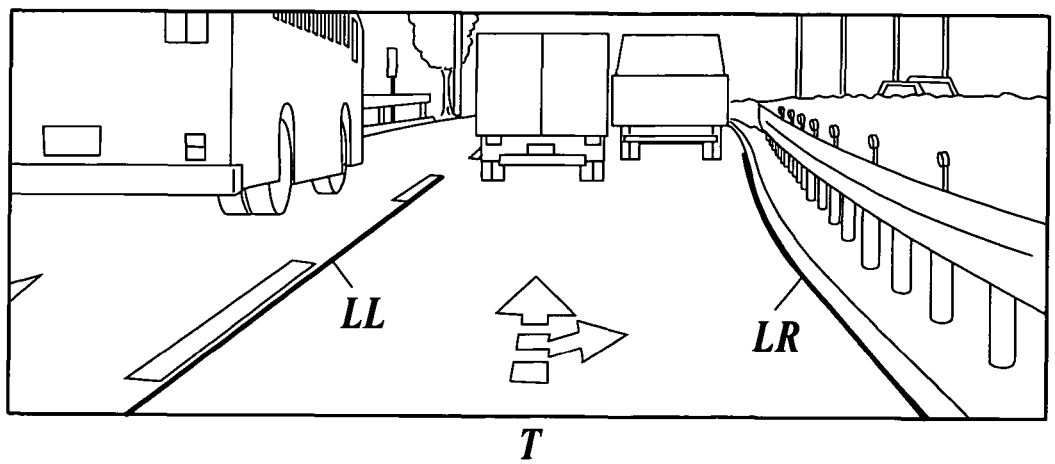
FIG. 26 is a figure showing the right road line and the left road line which are finally detected.

Furthermore, the condition 14 means, for example, leaving a peak straight line nearest to the right road line LR detected the last time as shown in FIG. 26, which will be described later, between a plurality of peak straight lines obtained by rightward search, or leaving the peak straight line nearest to the road line presumption center position of the right road line which is parallel to a left road line LL, an opposite road line detected the last time as shown in FIG. 26, and which is presumed at a position distant by a road width detected the last time in the case where the right road line LR has not been detected the last time to exclude the other peak straight lines. A plurality of peak straight lines obtained by the leftward search is also similarly processed.

The road line straight line detection processing unit 92 obtains peak straight lines from each Hough plane obtained by the rightward search and the leftward search in this manner, and selects one peak straight line indicating a straight line proper as a road line on each of the right and the left sides by reference to a presumption locus $L_{est}$ and the like obtained by the center position of the own vehicle and a yaw rate as the behavior of the vehicle. Incidentally, as described above, when no prominent peaks in the distribution as shown in FIG. 18 are found, no peak straight lines have been extracted, and no selections of peak straight lines are performed.

Successively, when a peak straight line has been selected on each of the right and the left sides in this manner, the road line straight line detection processing unit 92 judges whether the two peak straight lines satisfy the following consistency condition or not. When they satisfy the consistency condition, the road line straight line detection processing unit 92 detects the two peak straight lines as the road line straight lines severally.

[Consistency Condition]

Condition 15: any of the following conditions (i)-(iii) is not satisfied.

(i) The parallelism of the peak straight lines on both the right and the left sides is the threshold value or more.

(ii) The road widths of the peak straight lines on both the right and the left sides are the minimum width threshold value or less.

(iii) The road widths of the peak straight lines on both the right and the left sides are the maximum width threshold value or more.

The conditions (i)-(iii) of the condition 15 mean not detecting the two peak straight lines simultaneously as the road line straight lines severally in the case where the interval of the two peak straight lines become widen or narrow to a limit of a certain degree or more as the two peak straight lines become more distant from the own vehicle (i), and in the case where the road width itself is too wide or too narrow even if the parallelism of the two peak straight lines are good (ii) and (iii).

In the present embodiment, when the two peak straight lines do not satisfy the consistency condition, the road line straight line detection processing unit 92 turns down one of the two peak straight lines by comparing the counted value in the Hough plane of each peak straight line, the displacement quantities of the road line positions detected the last time, the parallelism with the presumption locus $L_{est}$, and the like. Then, the road line straight line detection processing unit 92 detects the remaining other peak straight line as the road line straight line.

Figure 22:
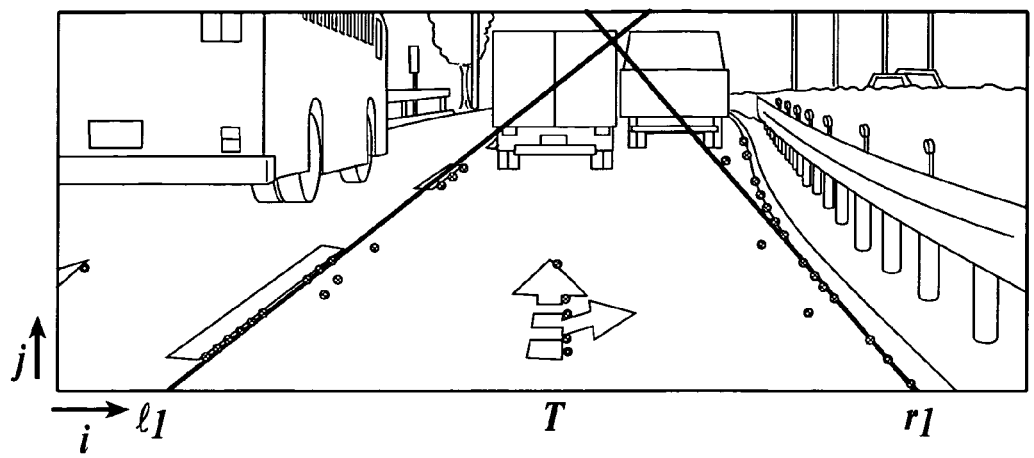
FIG. 22 is a figure showing detected right road line and a detected left road line on the reference image.

In this manner, for example, the peak straight line r1 and the peak straight line l1 are selected out of the four peak straight lines r1, r2, l1 and l2 extracted in FIG. 19, and as shown in FIG. 22, the peak straight lines r1 and l1 are detected as the road line straight line r1 indicating the right road line and the road line straight line l1 indicating the left road line, respectively. Then, the road line straight line detection processing (Step S20), which is the second process of the basic flow of FIG. 6, ends. Moreover, also when only either road line straight line of the right and the left sides is detected as described above, the road line straight line detection processing (Step S20) ends.

Next, the basic processing moves to a road line detection processing (Step S30), which is a third process of the basic flow. The road line detection processing is performed by the road line detection processing unit 93 of the detection section 9.

The road line detection processing unit 93 refers to the road line straight lines obtained by the processing described above in the road line candidate point detection and conversion processing unit 91 and the road line straight line detection processing unit 92 to detect the road lines in the shape of a straight line or in the shape of a curved line which exist on the right and the left sides of the own vehicle. Moreover, at the same time, the road line detection processing unit 93 recognizes and detects a road line branching accompanied by the increase of a road width, and further recognizes and detects whether the road line is a continuous line such as a no-passing line, a division line or the like or a broken line indicating an overtaking allowed state.

In the processing, similarly to the road line candidate point detection and conversion processing, road line candidate points which have been extracted are detected by performing scans to the right and to the left on the horizontal line j of the width of one pixel with the j coordinate being fixed in the reference image T, and the horizontal line j is shifted upward by one pixel to the reference image T at every end of the detection on one horizontal line j to perform the processing to the whole region of the reference image T.

The road line detection processing unit 93 of the present embodiment first decides the road line position on the lower side of the reference image T, namely on the side nearer to the own vehicle. To put it concretely, the road line detection processing unit 93 start a search on the horizontal line j from j=0, and records the road line candidate points situated at positions at which the differences in the i direction from each straight line are within a threshold value as the road line positions until the number of the candidate points reaches a predetermined number, for example, on the basis of the straight line r1 indicating the right road line and the straight line l1 indicating the left road line which have been detected in the road line straight line detection processing described above and are shown in FIG. 22.

Figure 23:
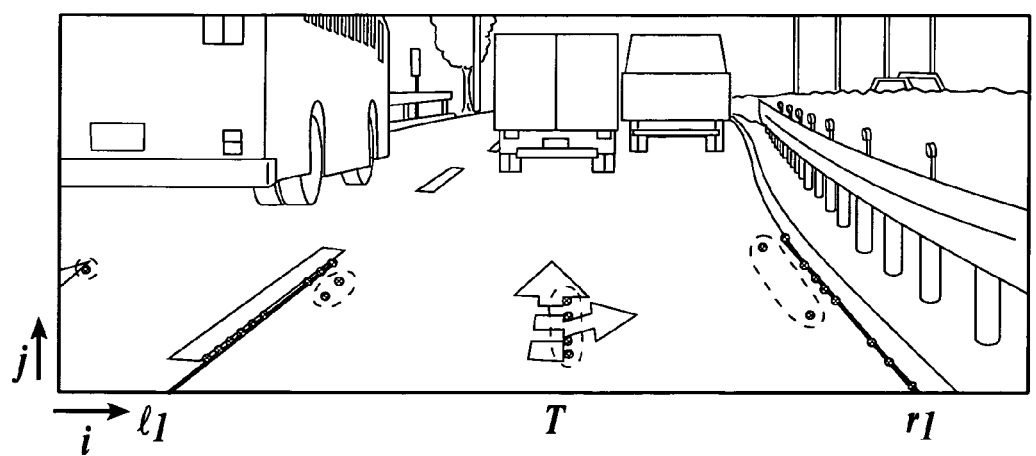
FIG. 23 is a figure showing road line candidate points excluded in road line detection processing first.

At this stage, the road line candidate points which are enclosed by broke lines as shown in FIG. 23 and are not situated at positions where the differences from the straight lines in the i direction are not within a threshold value are not regarded as the points indicating the road lines, and are excluded as false detection. Moreover, during this period, the road line detection processing unit 93 is recording the intervals of the road line positions belonging to the right road line and the road line positions belonging to the left road line. That is, to put it concretely, the road line detection processing unit 93 uses a distance image to convert the number of pixels between the corresponding road line positions from the distance data to the road widths in the real space while recording, and calculates the maximum value $L_{maxth}$ and the minimum value $L_{minth}$ of the road width.

Incidentally, the maximum value $L_{maxth}$ and the minimum value $L_{minth}$ of the road width are one of judgment references of whether the road line positions are correctly detected or not at the time of tracing the road line positions without being restrained by the straight lines r1 and l1 which indicate the right road line and the left road line, respectively, which will be described later. Consequently, for example, when the dispersion of the converted road widths are very small, it is also possible to configure the road line detection processing unit 93 to calculate, for example, a value larger than the average value of the road widths by a predetermined value as the maximum value of the road widths and a value smaller than the average value of the road widths by a predetermined value as the minimum value of the road widths.

Successively, when the road line detection processing unit 93 has recorded the predetermined number of the road line positions on or in the neighborhood of the straight lines r1 and l1 indicating the right road line and the left road line, respectively, the road line detection processing unit 93 traces the road lines on the horizontal line j on the next upper side by reference to the road line position detected the last time. Even when the road lines curve, the road line detection processing unit 93 follows the curve to detect the road line positions That is, when the predetermined number of road line positions has been recorded, the road line detection processing unit 93 judges whether the displacement between the road line candidate point detected next on the horizontal line on the next upper side and the road line position detected at last of the predetermined number in the i direction and the j direction is within a predetermined value or not. When the displacement is judged to be within the predetermined value, the road line detection processing unit 93 records the road line candidate point as a road line position.

That is, the road line detection processing unit 93 shifts the horizontal line upward by one pixel until the predetermined number of road line positions has been detected while detecting the road line positions based on the straight lines r1 and l1 indicating the right road line and the left road line, respectively. After the predetermined number of road line positions has been detected, the road line detection processing unit 93 is detecting the road line positions by the processing described above without being restricted by the straight lines r1 and l1 indicating the right road line and the left road line, respectively, any longer on the horizontal lines upper than that.

Figure 24A:
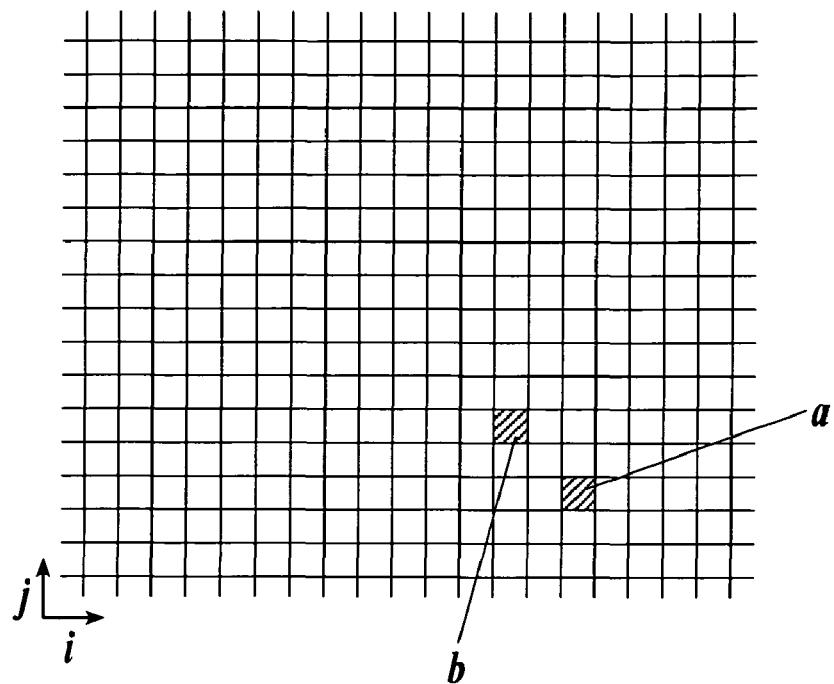
FIGS. 24A and 24B are figures illustrating conditions for recording road line candidate points as road line positions.

After this, similarly, as shown in FIG. 24A, when the road line detection processing unit 93 detects a road line candidate point on the horizontal line j, the road line detection processing unit 93 judges whether the detected road line candidate point has been displaced from the road line position a detected the last time into the i direction and the j direction within the predetermined value or not. When the road line detection processing unit 93 judges that the displacement is within the predetermined value, the road line detection processing unit 93 proceeds to record the road line candidate point detected this time as a road line position b.

Figure 24B:
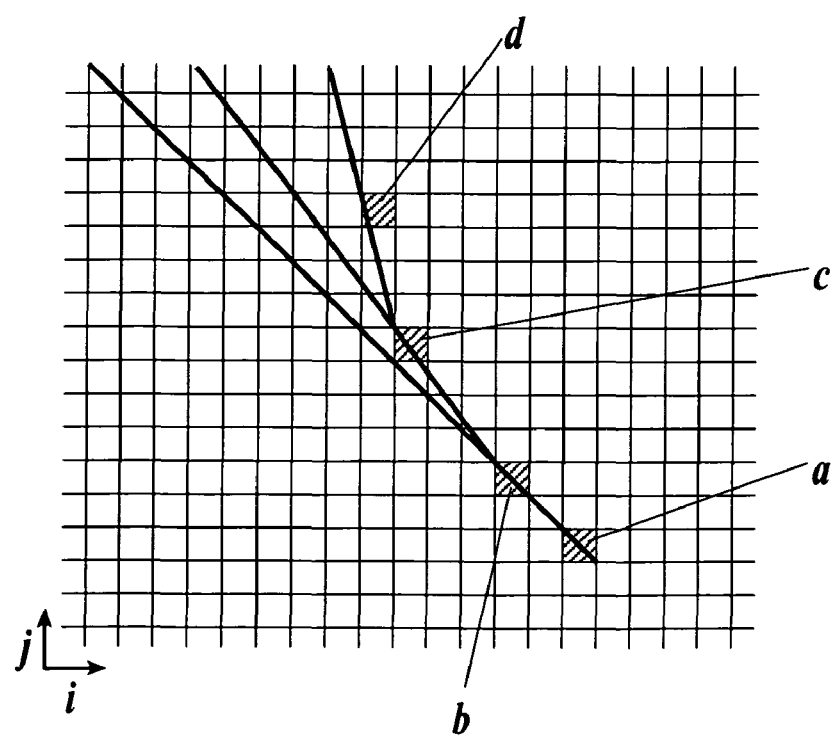

Moreover, also when a road line candidate point is detected on the horizontal line j and the displacement of the candidate point from the road line position detected the last time in the i direction and in the j direction is not within the predetermined value, the road line detection processing unit 93 records the road line candidate points detected this time as road line positions c, d, . . . when the displacement in the i direction from the straight line obtained by lengthening the road line position detected the last time, i.e. the straight line connecting the road line position b and the road line position a in FIG. 24B, is within the predetermined value.

Figure 25:
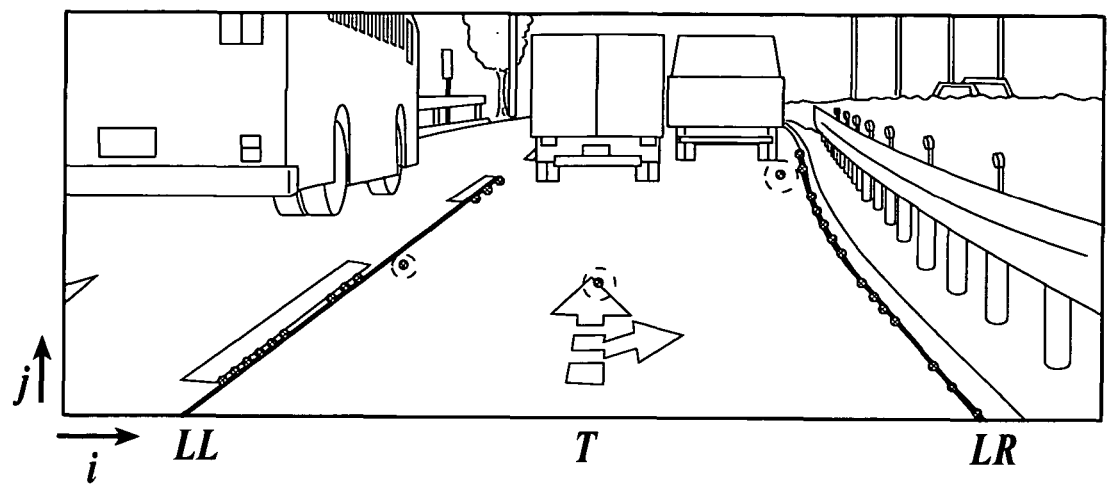
FIG. 25 is a figure showing road line candidate points which does not fall under the conditions shown in FIGS. 24A and 24B to be excluded.

The road line detection processing unit 93 ascertains the interval between the right and the left road lines in the real space, i.e. the road width, while shifting the horizontal line j to the upper portion of the reference image T to detect road line positions one by one. Then, as shown in FIG. 25, the road line detection processing unit 93 follows the road line in the shape of a straight line or a curved line while detecting the right road line LR and the left road line LL. Moreover, the road line candidate points as shown in FIG. 25 in the state of being enclosed by broken lines which points do not fulfill the reference and have little relevance to the road line position detected the last time are excluded as false detection.

Thus, as shown in FIG. 26, the road lines LR and LL on the right and the left sides of the own vehicle are detected.

The road line detection processing unit 93 of the present embodiment also performs the detection of whether a road line is a continuous line or a broken line.

Specifically, like the right road line shown in FIG. 25, how far a road line position is distant from a road line position detected the last time in the real space is calculated using a distance image in the real space. When the road line position is detected at a position not being distant more than a predetermined value and the summation length thereof is connected to be longer than the predetermined value, the road line in the section is recognized as a road line of a continuous line, and the road line position is recorded by being characterized by being labeled or flagged as a continuous line. Thus, the road line of the continuous line is detected.

Moreover, like the left road line LL shown in FIG. 25, when the left road line LL is recognized as a road line but the distance thereof from the road line position detected the last time is distant more than a predetermined distance, the road line in that section is recognized as a road line of a broken line, and the road line position is recorded by being characterized as the broken line. Thus the road line of the broken line is detected. In the present embodiment, the road line of the continuous line and the road line of the broken line are distinguished from each other to be recognized in this manner.

On the other hand, the road line detection processing unit 93 of the present embodiment calculates the distance between the right and the left road lines LR and LL to judge whether the road width is increasing or not. When the road width is increasing, the road line detection processing unit 93 recognizes the increase as a road line branching, and is configured to recognize which road line is the so-called right road line which should be referred to for road line detection, travel control and the like after this, and to recognize which road line is the road line of the road line branching.

Figure 28:
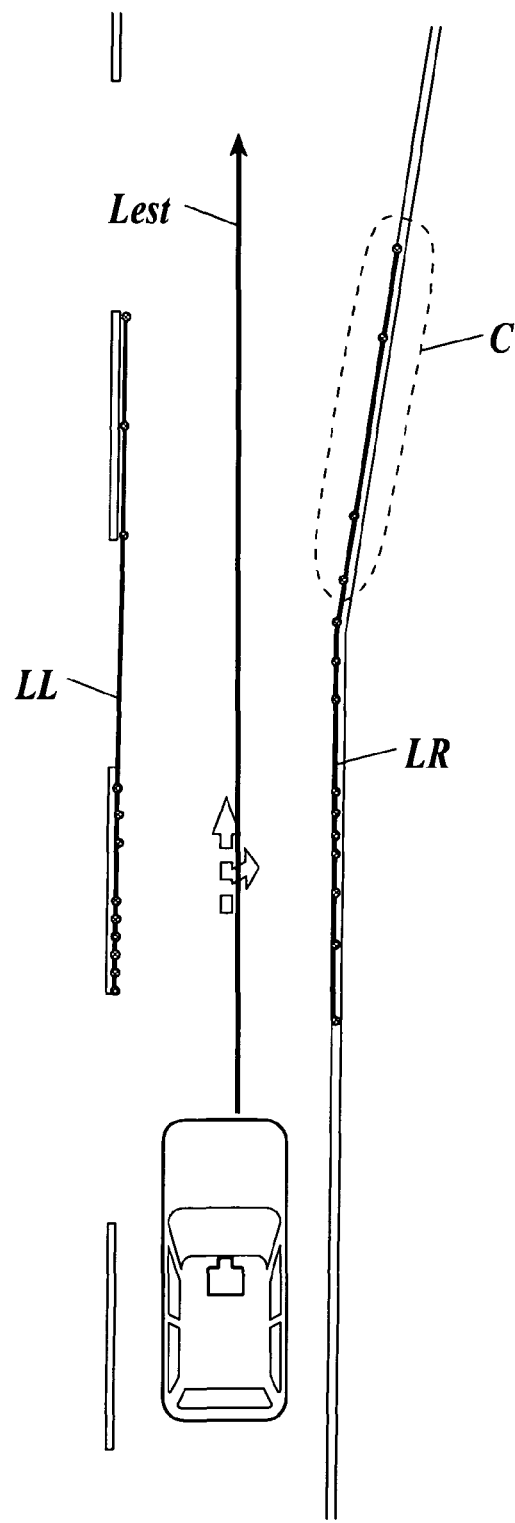
FIG. 28 is a figure showing a road line position characterized as a road line branching in the real space.
Figure 30:
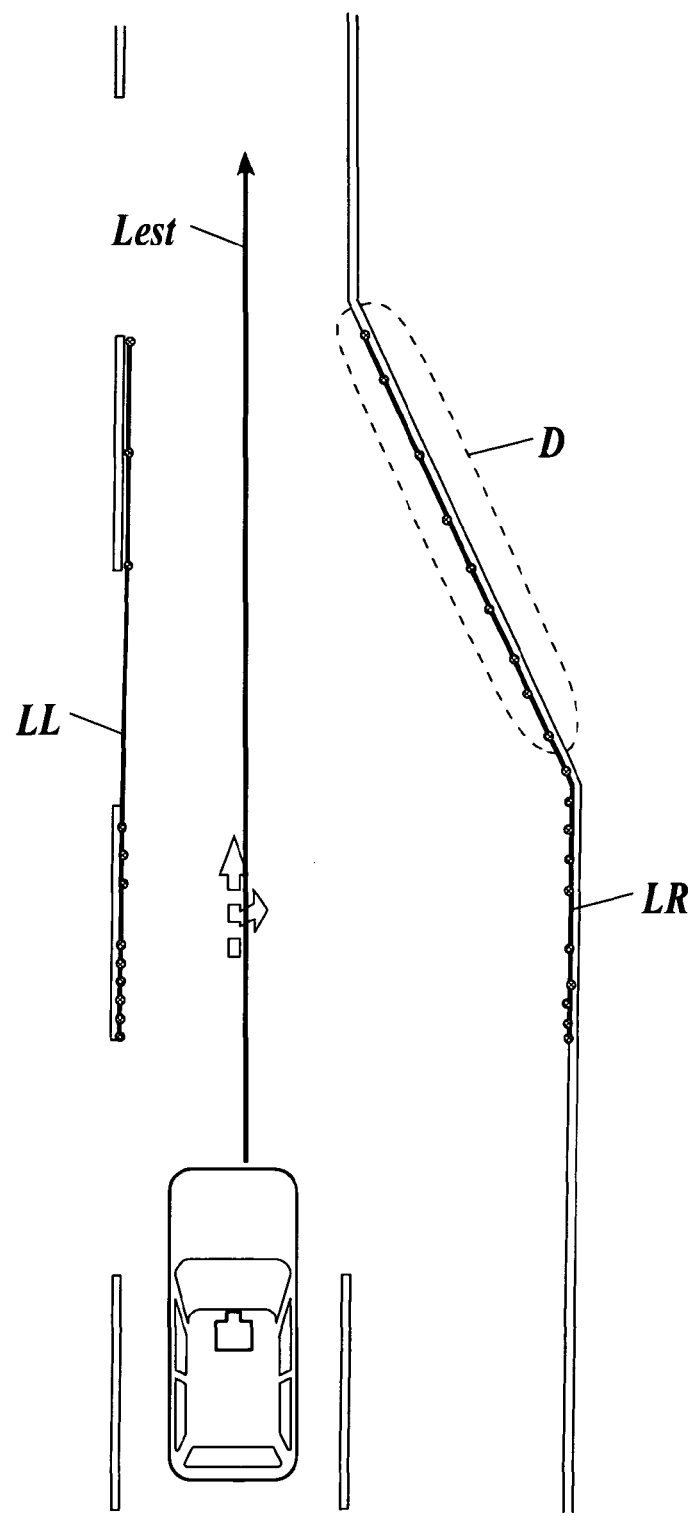
FIG. 30 is a figure showing a road line position characterized as a road line joining in the real space.

To put it concretely, the road line detection processing unit 93 judges that either the right or the left road line position is false detection when a calculated road width becomes out of the range from the minimum value $L_{minth}$ to the maximum value $L_{maxth}$ of the road line at the time of calculating the road width between the right and the left road line positions using the road line of the part in which the road width is widening as shown in FIG. 28, which shows the road lines, road line positions and the like of FIG. 25 in the real space, and the road line of the part in which the road width is narrowing as shown in FIG. 30, i.e. using the distance data.

And the road line width detection processing unit 93 detects a road line to which the road line position having higher parallelism with the presumption locus $L_{est}$ of the own vehicle in the real space as the road line which should be made as the reference.

Moreover, when the calculated road width exceeds the maximum $L_{maxth}$ of the road width, the road line detection processing unit 93 recognizes the road line to which the road line position having lower parallelism with the presumption locus $L_{est}$ of the own vehicle belongs, namely the part C of the road line position enclosed by a broken line on the right road line LR side in the example of FIG. 28 as a road line branching, and records the road line position by characterizing the road line position as the road line branching. Then, the road line detection processing unit 93 detects the road line to which the road line positions belong, i.e. the right road line LR in the example of FIG. 28, as the road line of the road line branching. Moreover, at the same time, the road line detection processing unit 93 calculates the position in the real space of the road line position which is closest to the own vehicle and belongs to the part C at which the calculated road width first exceeds the maximum value $L_{maxth}$ of the road width, and calculates the distance from the own vehicle to the road line position to record the calculated distance as the distance where the road line branching starts.

Figure 29:
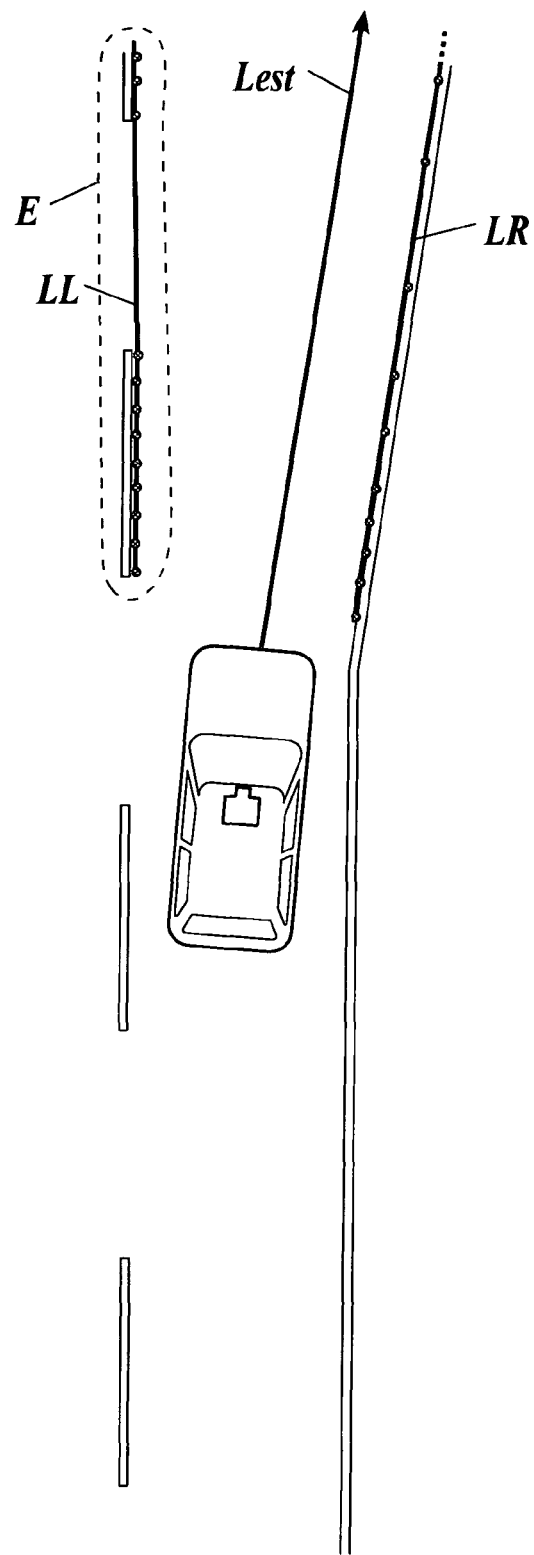
FIG. 29 is a figure showing a road line position characterized as a road line branching in the real space.

Incidentally, in FIG. 28, for example, when the own vehicle is going to further move forward and advance into the right-turn lane, as shown in FIG. 29, the parallelism of the road line position on the left road line LL side with the presumption locus $L_{est}$ of the own vehicle becomes lower in turn. Accordingly, the road line detection processing unit 93 recognizes a part E of the road line position enclosed by a broken line on the left line LL side as a road line branching, and records the road line position by characterizing as the road line branching to detect the left road line LL as the road line of the road branching in this case.

Moreover, when the calculated road width is less than the minimum value $L_{minth}$ of the road width, the road line detection processing unit 93 recognizes the road line to which the road line position having lower parallelism with the presumption locus $L_{est}$ of the own vehicle belongs, namely a part D of the road line portion enclosed by a broken line on the right road line LR side in the example of FIG. 30, as a road line joining, and records the road line position while characterizing as the road line joining. Thus, the road line detection processing unit 93 detects the road line to which the road line position belongs, i.e. the right road line LR in the example of FIG. 30, as the road line of the road line joining. Moreover, at the same time, the road line detection processing unit 93 calculates the position in the real space of the road line position which is closest to the own vehicle and belongs to the part D at which the calculated road width is first less than the minimum value $L_{minth}$ of the road width, and calculates the distance from the own vehicle to the road line position to record the calculated distance as the distance where the road line joining starts.

Moreover, the road line detection, the detection of the continuous line and the broken line, and the detection of the road line branching are simultaneously performed in parallel with the detection processing of a road line position which is performed while shifting the horizontal line j upward by one pixel on the reference image T. Moreover, because the part C of the road line position enclosed by the broken line on the right road line LR side of FIG. 28 is a road line branching and at the same time is a continuous line, as described above, the road line position is characterized as the continuous line road line branching. The road line position of the part D of the road line position enclosed by the broken line on the right road line LR side of FIG. 30 is characterized as a continuous line road line joining. The part E of the road line position enclosed by the broken line on the left road line LL side of FIG. 29 is also characterized as a broken line road line branching.

The road line detection processing unit 93 further calculates a road width presumed from the detected right and the left road lines LR and LL or the right and the left road line straight lines r1 and l1 at the stage at which the right road line LR and the left road line LL are detected at the detection this time, or similarly at this stage also when the right and the left road lines have not been detected and only either the right or the left road line straight lines r1 or l1 has been detected. Incidentally in the present specification, the presumed road width is referred to as a presumption road width ΔL.

Figure 27:
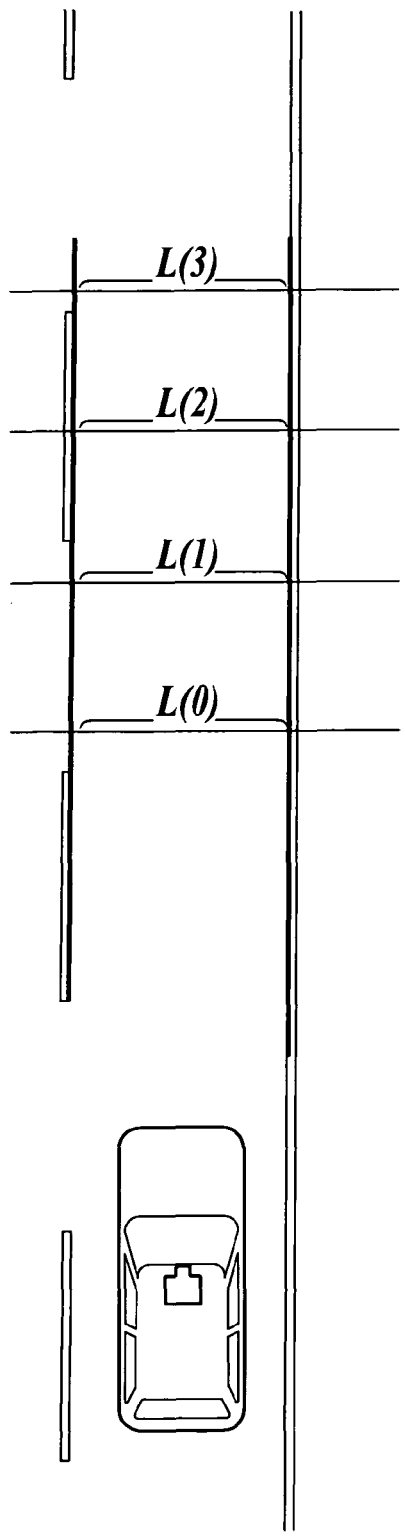
FIG. 27 is a figure illustrating a calculation method of presumption road width.

In the calculation of the presumption road width ΔL, the road line detection processing unit 93 first, as shown in FIG. 27, converts the detected right road line LR and the left road line LL in the real space, and calculates the intervals L(0), L(1), L(2) and L(3) between both the road lines at several points at predetermined distances in the front of the own vehicle, for example each point at 10 m, 14 m, 18 m and 22 m in the front of the own vehicle. And the road line detection processing unit 93 calculates a presumption road width $\Delta L_{pre}$ this time in conformity with the following formula (13) as the average value of the calculated intervals.

$$\Delta L_{pre} = \{L(0) + L(1) + L(2) + L(3)\}/4 \quad (13)$$

Successively, the road line detection processing unit 93 calculates the weighted averaged of the presumption road width $\Delta L_{t-1}$ calculated at the last detection and this time presumption road width $\Delta L_{pre}$ in conformity with the following formula (14) to calculate this time presumption road width $\Delta L_t$.

$$\Delta L_t = (\Delta L_{pre} + 3 \times \Delta L_{t-1})/4 \quad (14)$$

Incidentally, the presumption road width $\Delta L_{t-1}$ calculated at the last detection is the presumption road width calculated in conformity with the formula (14) using the last presumption road width but one at the last detection, and is not the presumption road width $\Delta L_{pre}$ calculated in conformity with the formula (13) at the last detection. Moreover, the road line portions characterized as a road line branching or a road line joining is not used of the calculation of the presumption road width $\Delta L$.

Even when only the road line straight lines r1 and l1 on the right and the left sides have been detected, the calculation of the presumption road width $\Delta L$ is similarly performed based on the road line straight lines r1 and l1 on the right and the left sides.

In the manner described above, the right road line LR and the left road line LL are detected as shown in FIG. 26, and each road line have been characterized as a road line to be referred to, a road line of a road line branching, or a road line of a road line joining described above. Moreover, each road line position has been characterized as a continuous line, a broken line, a road line branching or a road line joining. Then, the road line detection processing (Step S30), which is the third process of the basic flow shown in FIG. 6, ends.

When the basic flow ends in this manner, the detection section 9 outputs the information detected by this flow such as the information of the road lines LR and LL, the information of the straight lines r1 and l1 indicating a road line, the information of the road line positions characterized as a continuous line, a broken line, a road line branching and a road line joining, the information of the maximum value $L_{maxth}$ and the minimum value $L_{minth}$ of a road width, the presumption road width $\Delta L$ and the like to the various control units described above, or displays the information on a monitor or the like.

Incidentally, when the detection section 9 has a recognition processing function using a road line model which divides a road line in the front of the own vehicle into a plurality of sections to perform the straight line approximation of a road line in each section like the road line recognition apparatus described in, for example, Patent Document 1, the reliability of the road line mode of each section can be calculated using the method similar to the one disclosed in the document.

At this time, the reliability of the road line model of each section can be improved by amending the reliability based on a label, a flag and the like of a continuous line, a broken line and a road line branching which characterizing each road line position.

The reliability of a road line is generally amended so that the reliability of the road line of a continuous line is higher than that of the road line of a broken line. However, if the order of the reliability is left as it is, for example, when key plane control is performed to a vehicle progressing as FIG. 28, a situation can be generated in which, although the vehicle should be made to go straight on at the road line branching point in the front, the vehicle advances into the right-turn lane following the right road line, which is a continuous line road line.

In such a case, if the road line positions are characterized as a continuous line, a broken line and a road line branching like the present embodiment, the vehicle can be made to go straight on even at the road line branching point by focusing attention on the label or the like at a road line position to perform control after amending the reliability of the road line model at each section in order to attach importance to the labels of a road line branching and the like than the labels of the continuous line broken line and the like. Thus, it becomes possible to perform the key plane control good.

As described above, according to the road line recognition apparatus of the present embodiment, because the road line detection is performed based on the luminance of each pixel of a reference image imaged by the imaging section and the derivation value of luminance calculated from the luminance, the luminance variations of a road surface and road lines and the luminance variations caused by the dirt on the road surface can be clearly distinguished to be recognized, and even in the case where the luminance of the road surface becomes wholly high owing to a rainy weather or the like, it becomes possible to precisely detect the road line.

Moreover, because the road line recognition apparatus detects straight lines, i.e. road line straight lines, proper as the right road line and the left road line by judging from the position, the behavior and the like of the own vehicle out of a plurality of straight lines obtained by performing the Hough conversion of the road line candidate points detected on the reference image, and because the road line recognition apparatus decides the road line positions on the lower side of the reference image, i.e. on the side closer to the own vehicle, on the basis of the detected straight lines and after that traces pertinent road line positions, even if a high luminance portion such as reflected light is generated on a road surface owing to a rainy weather or a mark other than the road line, i.e. for example a mark indicating a road line branching, which is shown in the center of FIG. 23, exists, the road line recognition apparatus can stably and precisely detects the road line while excluding such obstacles.

Moreover, because the road line recognition apparatus first detects a road line straight line on the side closer to the own vehicle to decide a road line position before tracing the road line positions, even if the road line has the shape of a straight line or the shape of a curved line, the road line recognition apparatus can precisely follow the road line positions to detect them. Moreover, even if the road line has the complicated road shape such as a sharp curve, the road line recognition apparatus can precisely follow the road line position to detect the road line.

Moreover, because the road line recognition apparatus always ascertains whether a point corresponding to a pixel on a reference image in the real space is situated on a road surface or not based on the distance data obtained by stereo matching processing in the image processing section while detecting a road line, or because the road line recognition apparatus can detect a road line in the state of excluding solid bodies situated at positions higher than the road surface in advance, the road line recognition apparatus can detect a road line very accurately without confusing the road line with the solid bodies.

Even if road line candidate points corresponding to a road line having a low luminance average are detected in road line candidate point detection and conversion processing, the present embodiment deletes road line candidate points and employs new road line candidate points corresponding to a road line having a high luminance average on the same horizontal line when such new road line candidate points are found, and thereby, when a fading road line and a newly repainted road line are marked on a road surface, the road line recognition apparatus can precisely detect the new road line, and can attain more accurate road line recognition.

Moreover, because the road line recognition apparatus according to the present embodiment precisely traces road line positions to detect a road line, the road line recognition apparatus can precisely recognize whether a road line is a road line as a continuous line indicating a no-passing line, a division line making off a side strip and a road way, and the like, or a road line as a broken line indicating a lane allowed to overtake by calculating the distance between road line positions belonging to the same road line.

Moreover, it can be judged whether a road width is increasing or not by calculating the distance between road line positions between road lines on both of the right and the left sides, and thereby it becomes possible to detect a road line branching when the road width is increasing.

In this manner, if it is possible to recognize whether a road line is a continuous line or a broken line, and whether the road line shows a road line branching or not, then it becomes possible to reflect the recognition on, for example, the reliability of a detected road line to take advantage of the judgment of which of the right road line and the left road line should be relied on to delete it from the candidate to be followed, and the like.

Incidentally, in the present embodiment, in the trace of road line positions by the road line detection processing unit 93 of the detection section 9, if the displacement from a road line position detected the last time into the i direction and the j direction is not within a predetermined value, FIG. 24B shows a case where the judgment of whether a road line candidate point detected this time is adopted as a road line position or not using a straight line connecting a road line position b detected the last time with a road line position a detected last time but one as an object. But, it is also possible to configure the system to determine the straight line as the object by also referring to a road line position detected further early time.

Moreover, although only a case where the characterizations of road line positions by a continuous line, a broken line and a road line branching is reflected on reliability is exemplified in the present embodiment, it is also possible to configure the system to take advantage of these characterizations on other kinds of control, and the modified system is suitably used.

By the way, as it has been described in the explanation of the condition 11, there is a case where road marks marked at the center of a road to indicate the maximum speed and a traveling direction, a white trace remained on a road by a tire of a front vehicle in a rainy weather or the like, and the like are recognized as road lines by mistake. In fact, also in the present embodiment, as shown in FIG. 19, a road mark at the center of a road is mistaken to cause the false detection of road line candidate points, and a peak straight line 12 is obtained by the Hough conversion.

Figure 31:
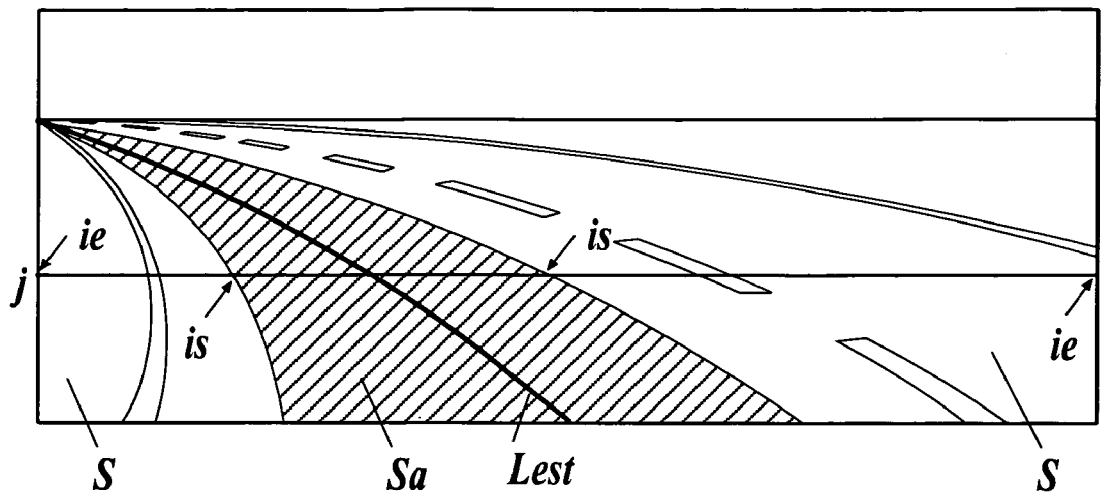
FIG. 31 is a figure illustrating a region of the width of a own vehicle excluded from a search region.

In order to prevent such false detection of road line candidate points, as shown in FIG. 31, it is possible to constitute the road line candidate point detection and conversion processing unit 91 to exclude a region Sa which is shown to be hatched with oblique lines in FIG. 31 and is located at the presumption locus $L_{est}$ of the own vehicle as the center to have a width same as the width of the own vehicle, and not to execute the search of road line candidate points. In this case, the search start point is is set at the right and the left ends of the width of the vehicle, as shown in FIG. 31.

However, when road line candidate point detection and conversion processing unit 91 is configured in this manner, similarly to the case of the proviso of the condition 11, if the own vehicle is straddling a road line owing to lane changing or the like, it becomes impossible to detect the road line. Accordingly, as shown in FIG. 32, it is preferable to configure the road line candidate point detection and conversion processing unit 91 to perform the search of a region Sb of from road lines $LR_{Last}$ and $LL_{Last}$ on the right and the left sides detected at the last detection or road line straight lines $r1_{Last}$ and $l1_{Last}$ on the right and the left sides to a position separated by a predetermined distance even in the region Sa excluded from the search region S.

Figure 32:
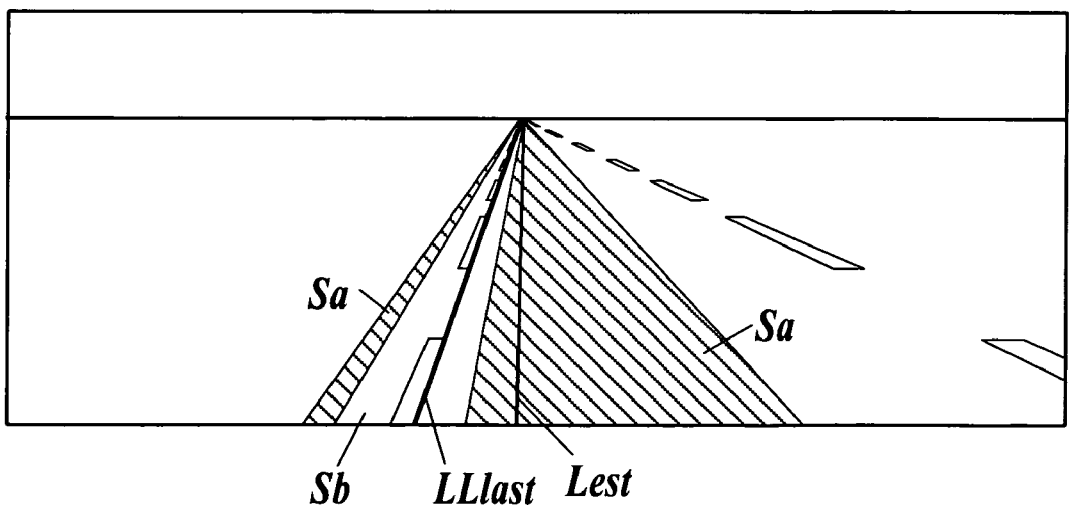
FIG. 32 is a figure illustrating performing a search with regard to the region of the circumference of a road line detected the last time even in the region of the width of the own vehicle.

For example, when the vehicle is going to perform lane changing straddling the left road line as shown in FIG. 32, the left road line $LL_{last}$ detected by the last detection advances into the region Sa gradually from the left side on the image. However, by configuring the road line candidate point detection and conversion processing unit 91 as described above, it becomes possible to surely trace a road line advancing into the un-detection region Sa to detect the road line.

Incidentally, like a case of lane changing, the road lines on the right and the left sides come to be recognized as road lines on the mutually opposite sides from a certain time point. In such a case, for example, when an extension line in the real space of the left road line $LL_{last}$ detected last time exceeds the center of the own vehicle onto the right side, it is possible to configure the system to perform road line changing processing to treat the road line as a right road line at the this time detection.

On the other hand, when a road line is continuously detected at a predetermined sampling period by the detection section 9, it is also possible to set the search region S to be limited only to the circumference of the detected positions of the road line and the road line straight line which have been detected last time on the basis of the road line and the road line straight line by utilizing the detected position of the road line and the road line straight line with the road line candidate point detection and conversion processing unit 91 of detection section 9. Thus, by narrowing the search region S, the throughput speed can be improved, and the false detection of the road line candidate points and the like can be decreased.

Figure 33:
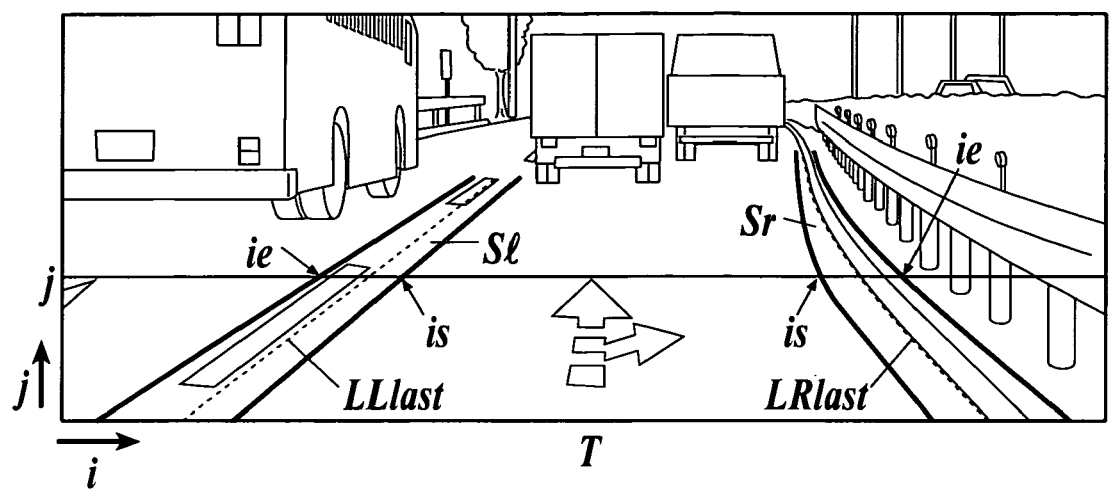
FIG. 33 is a figure illustrating search regions limited to the circumferences of the road lines detected the last time.

Specifically, in the search of a road line candidate point in the road line candidate point detection and conversion processing unit 91 of the detection section 9, when a road line is detected by the last detection processing, as shown in FIG. 33, only the ranges distant from the detected positions of the right road line $LR_{last}$ and the left road line $LL_{last}$, which have been detected last time, by a predetermined distance to the right and the left sides, respectively, in the real space are set as the search regions Sr and Sl, respectively, on the reference image T to be detected this time.

And the pixels at the intersection points of the horizontal line j to be searched with the left end of the search region Sr on the right road line side and the right end of the search region Sl on the left road line side are set as the search start points is of the respective regions, and searches are performed while offsetting by one pixel to the right on the horizontal line j on the right road line side and to the left on the horizontal line j on the left road line side. The searches of the road line candidate points are performed up to the respective search end points ie.

In this case, although it is also possible to obtain the corresponding pixels on the reference image T of the points distant from the detection positions of the right road line $LR_{last}$ and the left road line $LL_{last}$ to the right and the left directions severally by a predetermined distance in the real space by calculation, the load of the processing becomes large. Accordingly, it is preferable to prepare a table which gives the number of pixels corresponding to each horizontal line j in advance. The road line candidate point detection and conversion processing unit 91 reads the predetermined distance corresponding to each horizontal line j from the table to set the search regions Sr and Sl, and can also perform the searches of road line candidate points.

Moreover, when the road line straight lines r1 and l1 as shown in FIG. 23 are detected although no road lines detected at the last detection processing, the searches of road line candidate points are performed similarly to the above, though the illustration thereof is omitted. That is, the road line straight lines r1 and l1 are set as the road line straight line $r1_{last}$ and the left road line $l1_{last}$, respectively, which have been detected last time. The ranges distant from the detected positions of the road line straight line $r1_{last}$ and the left road line $l1_{last}$ into the right and the left directions by a predetermined distance, respectively, in the real space are set as the search regions Sr and Sl, respectively, on the reference image T to be detected this time. Then, the searches of the road line candidate points are performed.

Figure 34:
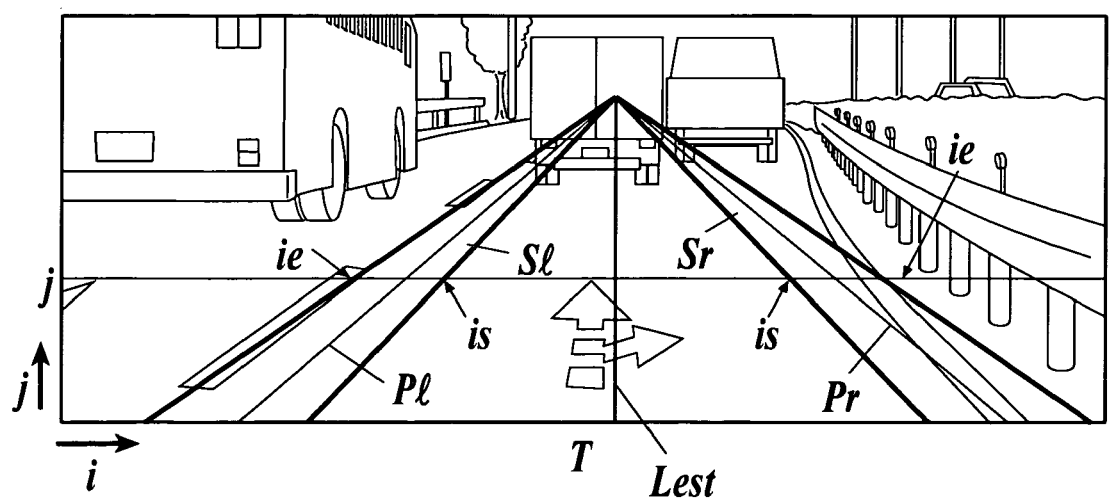
FIG. 34 is a figure illustrating search regions set as ranges distant from presumption loci of the own vehicle by a predetermined distance.

Moreover, when neither the road lines LR and LL nor the road line straight lines r1 and l1 have been detected by the last detection processing, as shown in FIG. 34, positions Pr and Pl distant from the presumption locus $L_{est}$ presumed from the yaw rate of the own vehicle shown in the reference image T to the right and the left, respectively, by a predetermined distance in the real space are set as the references, and the ranges distant from the references to the right and the left, respectively, by a predetermined distance in the real space are set as the search regions Sr and Sl. Then, the search start point is and the search end point ie are set similarly to the above, and the searches of road line candidate points are performed on the horizontal line j.

Here, the predetermined distances between the presumption locus Lest and the positions Pr and Pl on the right and the left, respectively, can be also set to be, for example, halves of the minimum value $L_{minth}$ of the latest road width currently recorded, and it is also possible to set values such as 1.5 m and the like beforehand. Moreover, there is also a case where no road lines and no road line straight lines have been detected at the last detection processing owing to some trouble but the positions of the road lines and the like are not so much moved from the last detection positions on the reference image T this time. Accordingly, it is also possible to adopt the configuration of performing the processing shown in FIG. 34 when no road lines and no road line straight lines are continuously detected at a predetermined sampling period.

Incidentally, when neither the road lines LR and LL nor the road line straight lines r1 and l1 have been detected by chance owing to some cause at the last detection, the probability of detecting road line candidate points at the neighborhood of the road lines and road line straight lines detected at the last detection processing but one in the detection processing this time is high. Accordingly, it is preferable to perform the setting of the search regions Sr and Sl based on the positions Pr and Pl distant from the presumption locus of the own vehicle as shown in FIG. 34 to the right and the left, respectively, by a predetermined distance when neither the road lines nor the lord line straight lines are detected continuously for a predetermined times.

Moreover, when neither road lines nor road line straight lines are detected at the last detection processing, there are a case where road lines are greatly moved from the positions detected by the last detection processing. Accordingly, it is possible to adopt the configuration of setting the search regions Sr and Sl of the detection processing this time to be expanded in comparison with the search regions Sr and Sl at the time of the last detection processing.

To put it concretely, when neither road lines nor road line straight lines have been detected by the last detection processing, for example, further wider search regions Sr and Sl which are severally expanded to the right direction and the left direction, respectively, by a predetermined width in comparison with the search regions Sr and Sl which would be set this time if the road lines $LR_{last}$ and $LL_{last}$ and the road line straight lines $r1_{last}$ and $l1_{last}$ have been detected at the last detection processing as shown in FIG. 33. If neither road lines nor road line straight lines will be detected at the next detection processing, the search regions Sr and Sl will be further expanded.

If such a configuration is adopted, the search regions Sr and Sl based on positions Pr and Pl, respectively, which are distant from the presumption locus $L_{est}$ to the right and the left by a predetermined distance in the real space are being expanded into the right and the left directions, respectively, every sampling period. Consequently, it becomes possible to detect the road lines and the road line straight lines surely.

Incidentally, because the load of search processing becomes larger if the search regions continue to be expanded in this case, it is also possible to adopt the configuration of, for example, stopping the expansion of the search regions Sr and Sl at a time point when the predetermined distance reaches a distance of about two road lines in the real space from the presumption locus $L_{est}$.

Figure 35:
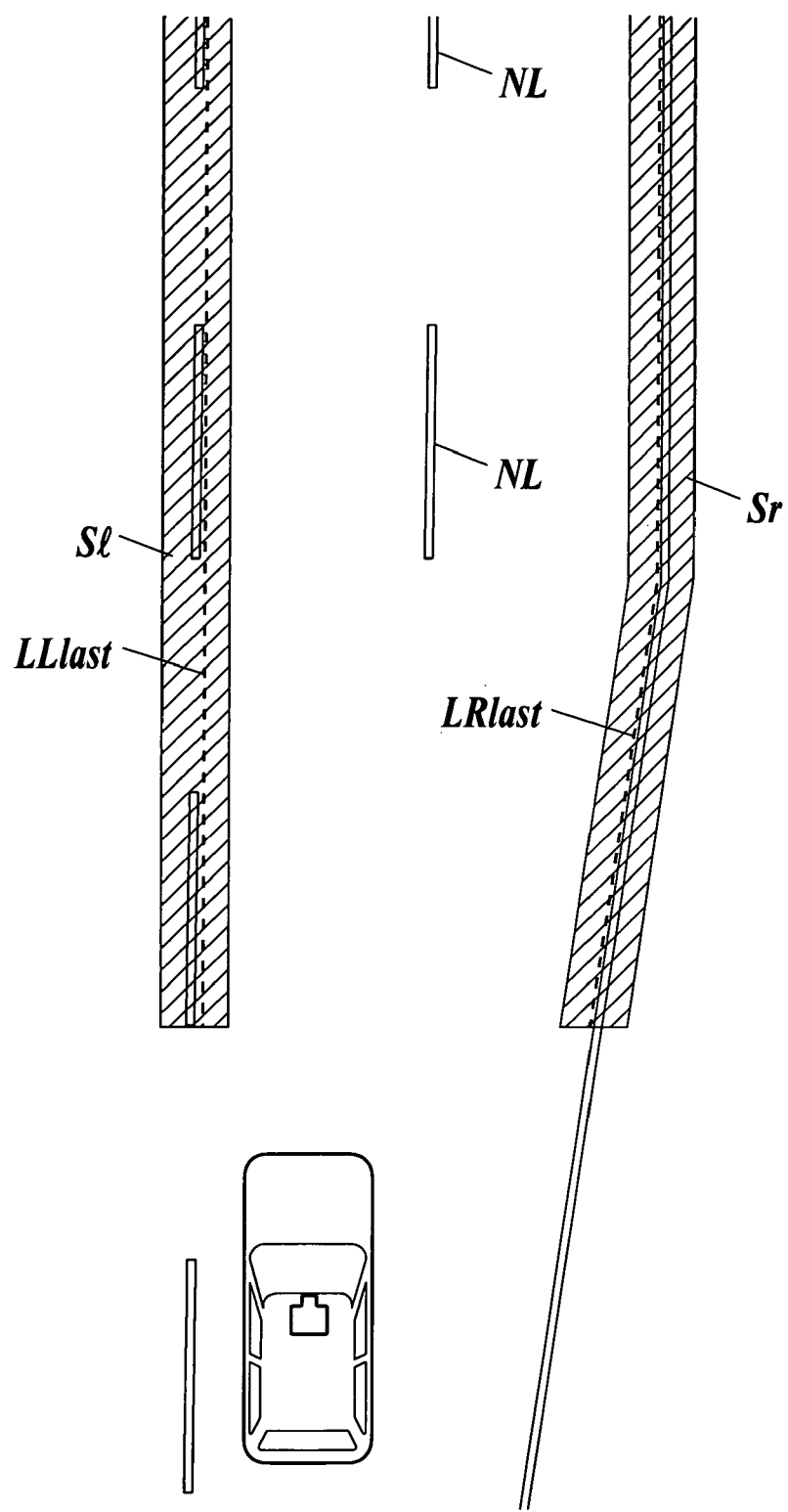
FIG. 35 is a figure illustrating search regions set as only the circumferences of road lines the road width of which is expanding.

By the way, when a road width is widening at a road line branching or the like as shown in FIG. 28, new road lines NL will frequently appear in the front in a short time, as shown in FIG. 35. However, if the search regions Sr and Sl of the present detection processing continue to be limited to the circumferences of the road lines $LR_{1ast}$ and $LL_{last}$ and the road line straight lines $r1_{last}$ and $l1_{last}$ which have been detected last time as shown in FIG. 33, for example, the detection position of the right road line $LR_{last}$ detected last time would be used as a reference to set the search region Sr of a narrow range for tracing the right road line LR, as shown in FIG. 35. Consequently, the possibility of making it impossible to detect the newly appeared road lines NL for recognizing it is high.

Figure 36:
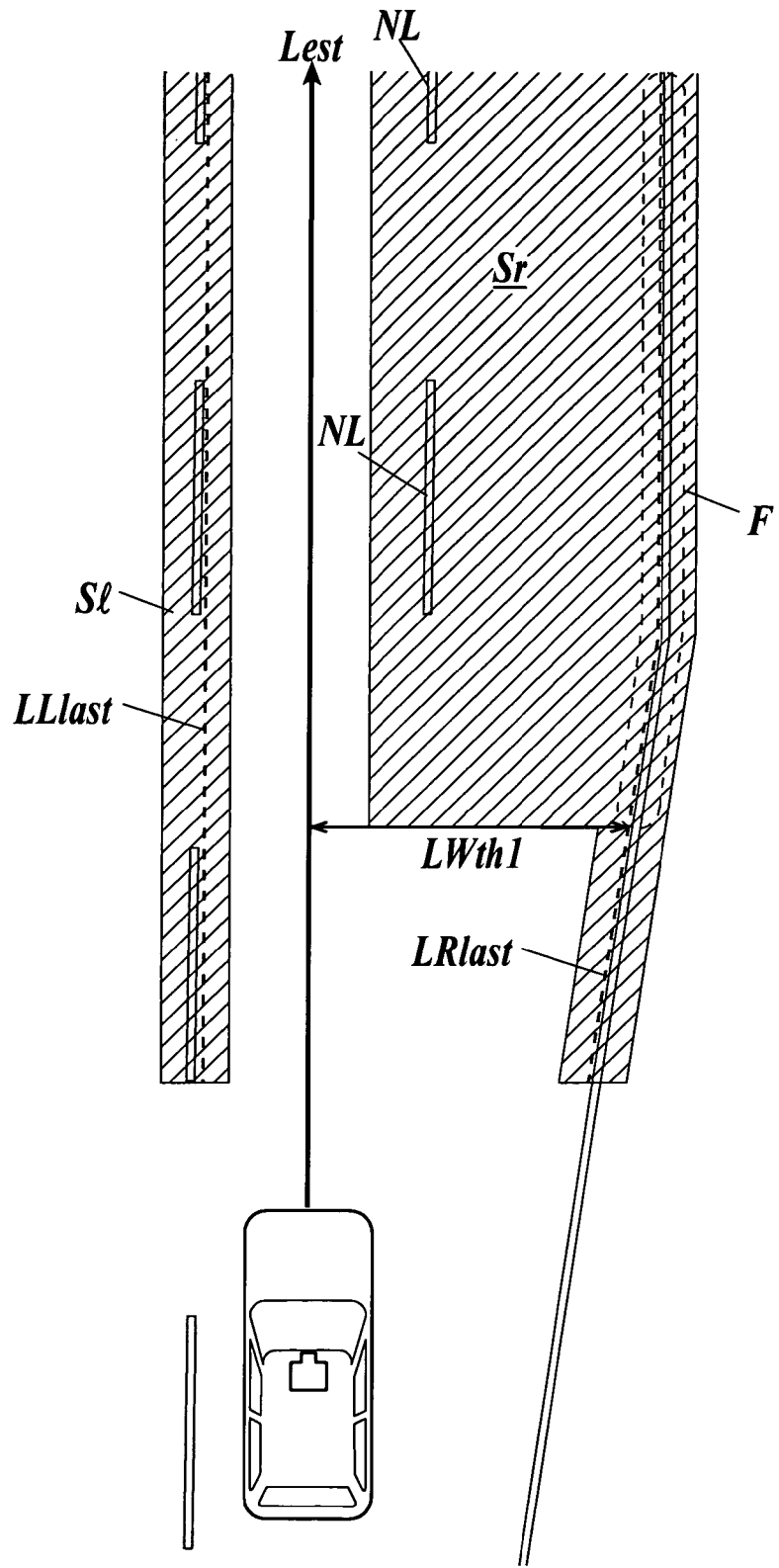
FIG. 36 is a figure illustrating a search region which is expanded on the inside in the case of FIG. 35.

Accordingly, it is preferable to adopt the configuration of expanding the search region Sr this time to the inside for a road part F in which the detection position of the right road line $LR_{last}$ detected last time is distant from the presumption locus $L_{est}$ more than a set first separation distance threshold value $L_{Wth1}$ as shown in FIG. 36. However, because a possibility of detecting a road mark or the lime marked at the center of the road for indicating the maximum speed or a traveling direction by mistake becomes high as described above if the search region Sr is expanded to the inside too much, it is preferable to confine the expansion of the search region to the inside to the neighborhood of the right end of the own vehicle presumed from the presumption locus Lest, namely to the position distant from the presumption locus Lest to the right side by a half of the width of the own vehicle.

Moreover, the expansion of the search region to the inner side can be similarly performed to the road line straight lines even when only road line straight lines have been detected by the last detection processing.

Figure 37:
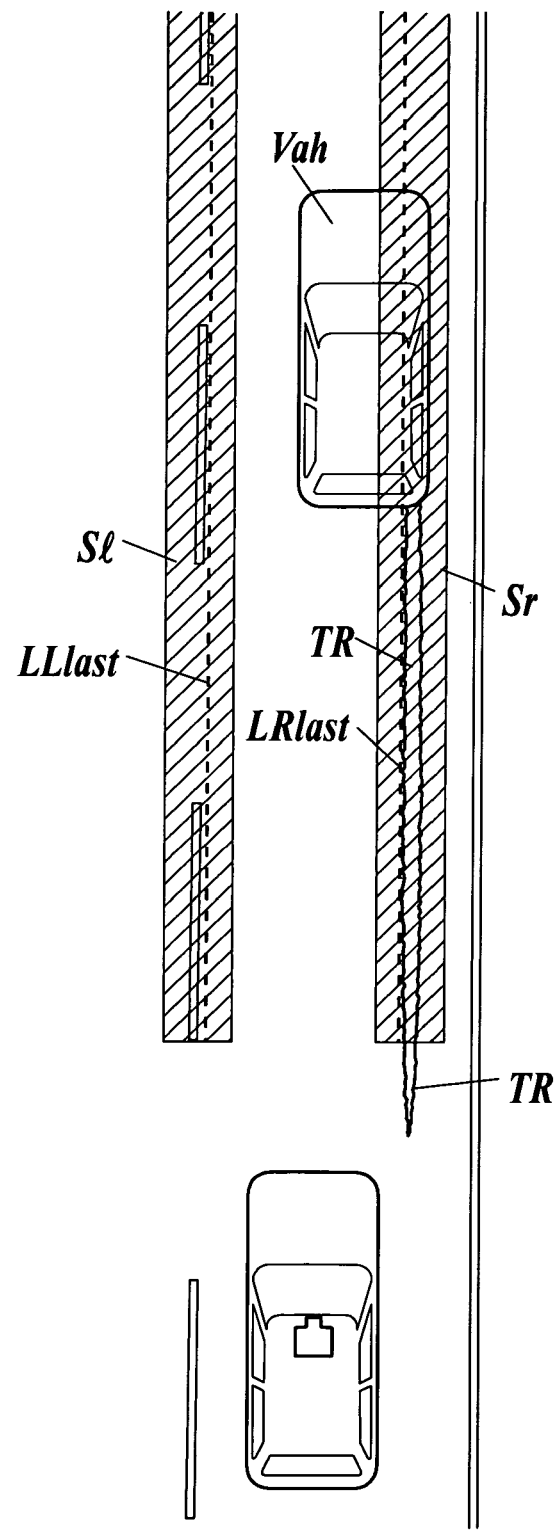

Moreover, if the search regions Sr and Sl of the present detection processing are limited and set to limit to the circumferences of the road lines $LR_{last}$ and $LL_{last}$ and the road line straight lines $r1_{last}$ and $l1_{last}$ which have been detected last time as shown in FIG. 33, when a white trace TR of a tire of a front vehicle Vah remaining on the road owing to some cause such as a rainy whether is detected as, for example, the right road line $LR_{last}$ by mistake as shown in FIG. 37, the present search region Sr is limited to the circumference of the trace TR, and the right road line becomes impossible to be correctly detected.

Figure 38:
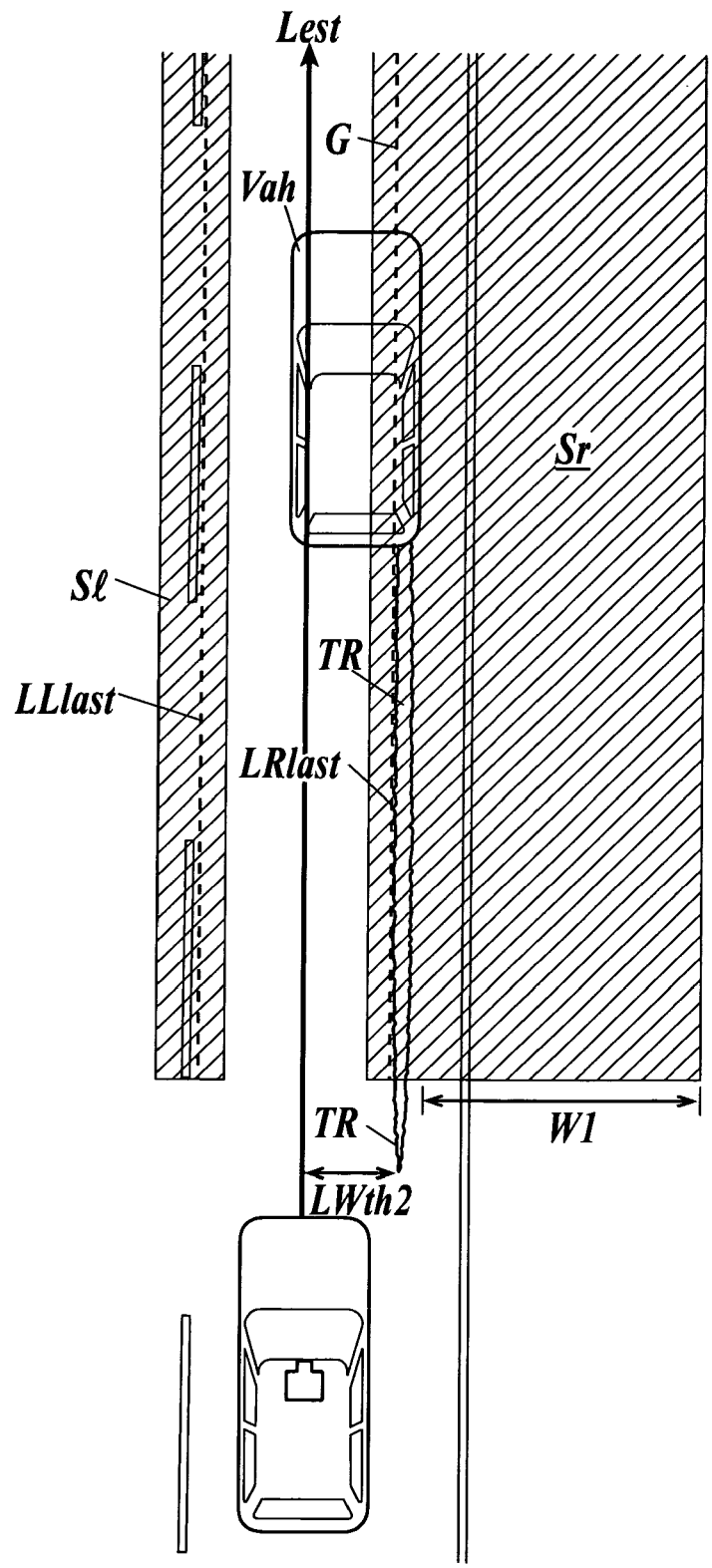
FIG. 38 is a figure illustrating the search region which is expanded on the outside in the case of FIG. 37.

Accordingly, as shown in FIG. 38, it is preferable to adopt the configuration of expanding the present search region Sr to the outside by a set predetermined quantity W1 to a road line part G in which the detection position of the right road line $LR_{last}$ detected last time is close to the presumption locus $L_{est}$ to be within a set second separation threshold value $L_{Wth2}$ from the presumption locus $L_{est}$. Incidentally, in FIG. 38, the road line part G is the whole region of the right road line $LR_{last}$ detected last time.

However, because unnecessary road lines may be detected if the search region Sr is expanded to the outside, it is preferable to set the predetermined quantity W1 to 2 m.

On the other hand, when the road width of detected road lines and road line straight lines on both the right and the left sides is expanding or reducing, a road line part on one side is characterized as a road line branching as shown in FIGS. 28 and 29, or a road line part on one side is characterized as a road line joining as shown in FIG. 30. However, these road line branching and road line joining may be actually a false detection.

Figure 39:
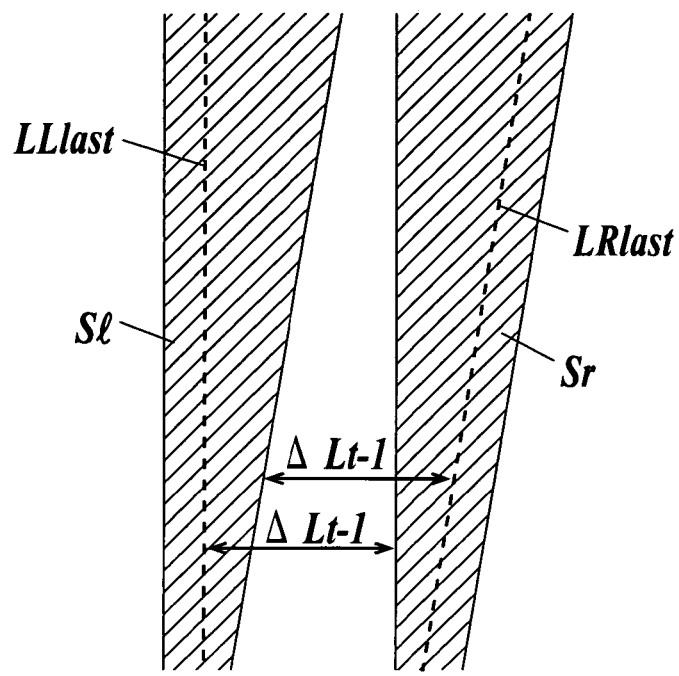
FIG. 39 is a figure illustrating the search regions expanded from the opposite road lines to a predetermined distance.
Figure 40:
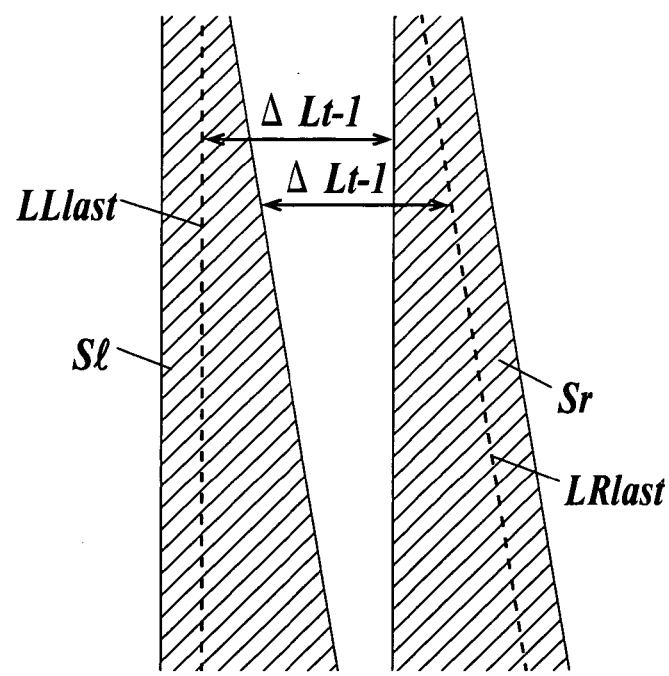
FIG. 40 is a figure illustrating the search regions expanded from the opposite road lines to the predetermined distance.

Accordingly, in the present detection in the road line candidate point detection and conversion processing unit 91, as shown in FIGS. 39 and 40, it is preferable to adopt the configuration of expanding the search region Sr of the right road line to a position distant from the left road line $LL_{last}$ detected last time by a predetermined quantity in addition to the circumference of the right road line $LR_{last}$ detected last time, and of also expanding the search region Sl of the left road line to a position distant from the right road line $LR_{last}$ detected last time by a predetermined quantity to perform the searches of road line candidate points.

Incidentally, although the presumption road width $\Delta L_{t-1}$ calculated by the road line detection processing unit 93 at the last detection is used as the predetermined quantity in the present embodiment, alternatively, for example, the minimum value $L_{minth}$ of road widths may be used, and fixed values such as 2 m or the like may be used. Moreover, although FIGS. 39 and 40 illustrate the case where both of the right and the left road lines $LR_{last}$ and $LL_{last}$ have been detected by the last detection, when only both the right and the left road line straight lines $r1_{last}$ and $l1_{last}$ have been obtained, similarly based on the road line straight lines, the left and the right search regions Sr and Sl are expanded.

Moreover, adversely, although a road width is actually expanded or reduced by a road line branching, a road line joining and the like, the true causes may not be detected and road lines and road line straight lines may be falsely detected. For example, although the left road line $LL_{last}$ detected last time is actually swollen onto the left side by a road line branching or the like, the fact may not be detected, and it is supposed that the left road line $LL_{last}$ is falsely detected.

Figure 41:
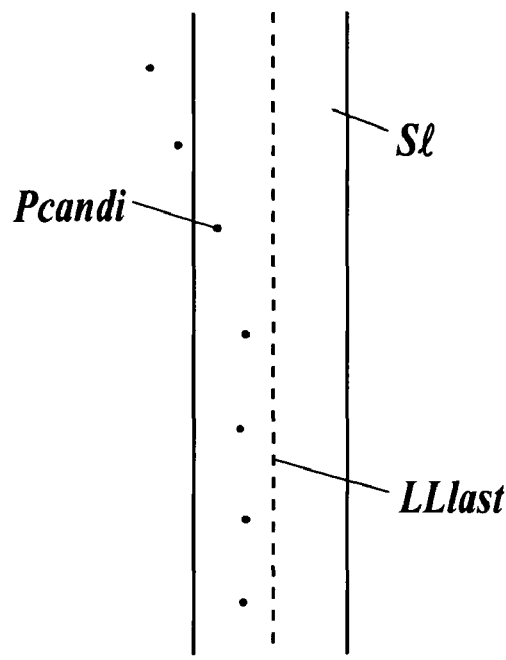
FIG. 41 is a figure illustrating road line candidate points which deviate from a search region.

In this case, at the present detection, if a road line candidate point is searched shifting the horizontal line upward by one pixel in the search region Sl on the basis of the left road line $LL_{last}$ detected last time and set on the reference image, as shown in FIG. 41, road line candidate points $P_{candi}$ deviate from the boundary of the search region Sl, and will no longer be detected.

Figure 42:
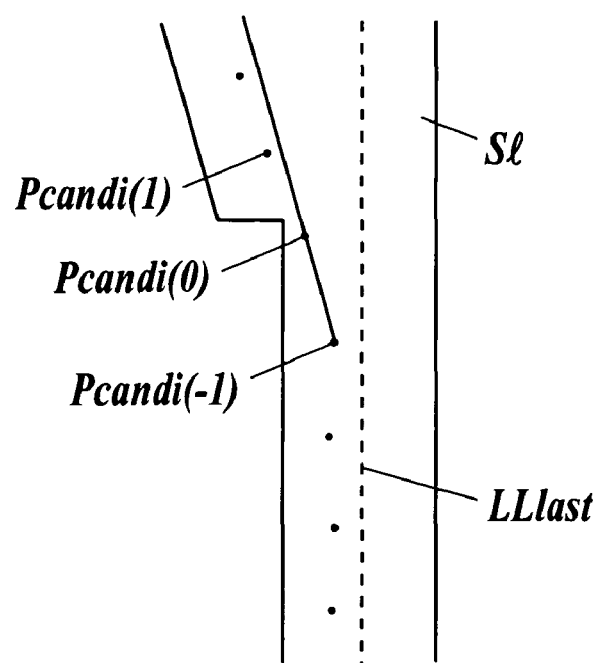
FIG. 42 is a figure illustrating a search region expanded into the direction into which road line candidate points deviate.
Figure 43A:
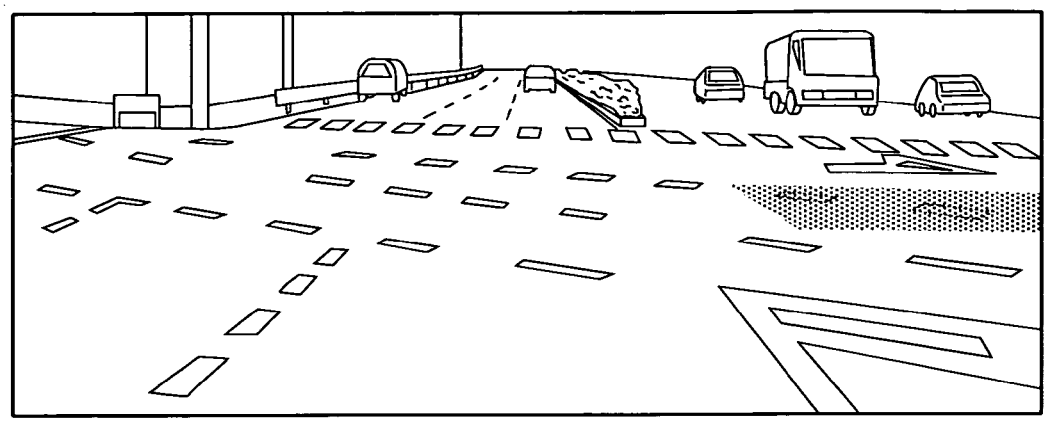
FIGS. 43A and 43B are a figure showing the front sight imaged with a conventional road line recognition apparatus and a figure illustrating a result of having mistaken a course in the imaged front sight, respectively.
Figure 43B:
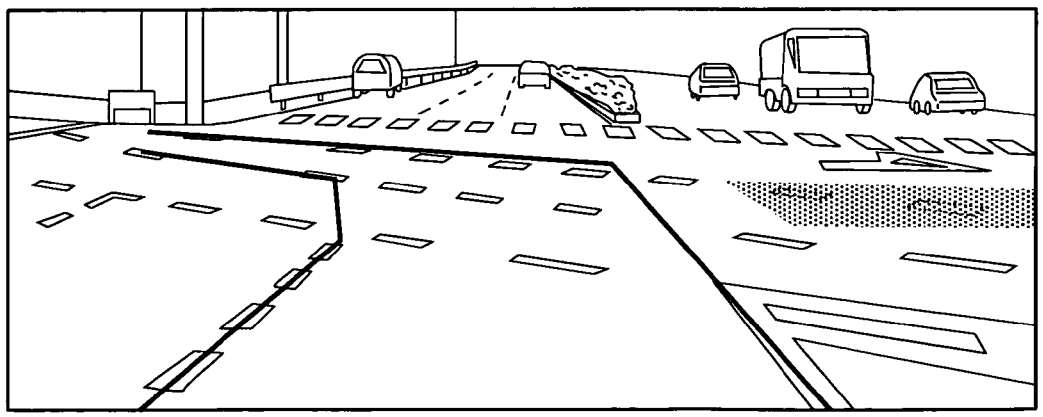

In order to avoid such disadvantage, when the road line candidate points $P_{candi}$ deviate from a search region, it is preferable to expand the search region. For example, in the case of FIG. 41, as shown in FIG. 42, the road line candidate point detection and conversion processing unit 91 searches the horizontal line j. When a road line candidate point $P_{candi}(0)$ is detected, the road line candidate point detection and conversion processing unit 91 calculates a line segment connecting the road line candidate point $P_{candi}(-1)$ detected just before the detection of the road line candidate point $P_{candi}(0)$ with the road line candidate point $P_{candi}(0)$ detected this time, and expands the search region to a position parallel to the line segment and distant by a certain distance.

Moreover, the road line candidate point detection and conversion processing unit 91 further searches the horizontal line j while shifting upward. When a next road line candidate point $P_{candi}(1)$ is found, the road line candidate point detection and conversion processing unit 91 calculates a line segment connecting the road line candidate point $P_{candi}(0)$ with the road line candidate point $P_{candi}(1)$, and expands the search region to a position parallel to the line segment and distant by a fixed distance.

Incidentally, at the time, there is the possibility that the detection of the line candidate points at abnormal positions is not caused by a road line branching, road line joining or a like, but caused by simple noises, false detection or the like. Accordingly, it is preferable to design the operation of the boundary on the opposite side of the expanded side between the boundaries of the search region, i.e. the boundary on the right side in FIG. 41, not to follow the operation of the boundary on the expanded side, but to keep the operation of the original boundary in the search region based on the left road line $LL_{last}$ detected last time.

The entire disclosure of Japanese Patent Applications No. Tokugan 2005-127732 filed on Apr. 26, 2005 and of Japanese Patent Applications No. 2006-28808 filed on Feb. 6, 2006 including specifications, claims, drawings and summaries are incorporated herein by reference in its entirety.

What is claimed is:

1. A road line recognition apparatus, comprising:
an imaging section imaging a progress path of an own vehicle including a road to output a couple of images;
an image processing section calculating a distance from the own vehicle to a pixel in a real space, wherein the pixel is in a set region of at least an image on one side based on the imaged couple of images; and
a detection section detecting a road line;
wherein the detection section includes:
a road line candidate point detection and conversion processing unit detecting a pixel on a road surface as a road line candidate point based on luminance and the distance with regard to the image on one side, and performing Hough conversion of the road line candidate point;
a road line straight line detection processing unit detecting one straight line proper to the road line on each of a right side and a left side of the own vehicle based on at least a position or a behavior of the own vehicle out of straight lines obtained by the Hough conversion; and
a road line detection processing unit detecting the road line by recording a road line position which is a road line candidate point indicating a road line among the road line candidate points based on the detected straight line.

2. The road line recognition apparatus according to claim 1, wherein the road line candidate point detection and conversion processing unit of the detection section sets a search region on the image on one side in order to search for a road line candidate point only in a circumference of a detection position of the road line or the straight line, detected last time, on the image on one side in this time detection when the road line has been detected in a last time detection or when the road line has not been detected but the straight line has been detected in the last time detection.

3. The road line recognition apparatus according to claim 1, wherein the road line candidate point detection and conversion processing unit of the detection section sets a search region on the image on one side in order to search for a road line candidate point only in a circumference of a position distant from a presumption locus presumed by a behavior of the own vehicle by a predetermined distance in this time detection when both of the road line and the straight line have not been detected for predetermined times.

4. The road line recognition apparatus according to claim 3, wherein the road line candidate point detection and conversion processing unit of the detection section sets the search region of this time detection to be expanded in comparison with the search region in a last time detection.

5. The road line recognition apparatus according to claim 2, wherein the road line candidate point detection and conversion processing unit of the detection section enlarges the search region of a road line part or a straight line part distant more than the first separation distance threshold value from a presumption locus presumed based on the behavior of the own vehicle in this time detection to a neighborhood of an end of the own vehicle presumed from the presumption locus when the road line or the straight line, detected in the last time detection, are distant more than the first separation distance threshold value from the presumption locus.

6. The road line recognition apparatus according to claim 2, wherein the road line candidate point detection and conversion processing unit of the detection section enlarges the search region of a road line part or a straight line part, close to be within a second separation distance threshold value to a presumption locus presumed based on the behavior of the own vehicle in this time detection to a direction of being distant from the own vehicle by a predetermined quantity when the road line or the straight line, detected in the last time detection, is close to be within a second separation distance threshold value to the presumption locus.

7. The road line recognition apparatus according to claim 2, wherein the road line candidate point detection and conversion processing unit of the detection section, when setting the search region based on the road line or the straight line detected in the last time detection, in this time detection, enlarges the search region from a road line or a straight line which is in an opposite side of the road line or the straight line detected in the last time detection, to a position distant to a direction of the road line or the straight line by a predetermined quantity.

8. The road line recognition apparatus according to claim 2, wherein the road line candidate point detection and conversion processing unit of the detection section expands the search region in a direction of a line segment when setting the search region based on the road line or the straight line detected in the last time detection, and searching for a road line candidate point while shifting a horizontal line of the image on one side upward by one pixel in the search region, in this time detection, and when the line segment connecting a road line candidate point detected on a present horizontal line with a road line candidate point detected immediately before deviates from the search region.

9. The road line recognition apparatus according to claim 1, wherein the road line candidate point detection and conversion processing unit of the detection section does not search a region with a width of the own vehicle from a presumption locus presumed based a behavior of the own vehicle, the presumption locus being set as a center of the width, in a search of a road line candidate point.

10. The road line recognition apparatus according to claim 9, wherein the road line candidate point detection and conversion processing unit of the detection section searches up to a position distant from the road line or the straight line, detected in the last detection, by a predetermined distance, in the region with the width of the own vehicle from the presumption locus presumed based on the behavior of the own vehicle, in the search of a road line candidate point.

11. The road line recognition apparatus according to claim 1, wherein the road line candidate point detection and conversion processing unit of the detection section sets a pixel portion other than a pixel portion indicating a solid body extracted on the image on one side based on information of the distance calculated by the image processing section, as a search region and perform a search for a road line candidate point in the set search region.

12. The road line recognition apparatus according to claim 1, wherein the road line straight line detection processing unit of the detection section detects the straight line proper to the road line based on a distance between road lines calculated from distance data detected by the image detection section and the number of pixels between the road lines.

13. The road line recognition apparatus according to claim 1, wherein the road line straight line detection processing unit of the detection section detects the straight line proper to the road line each of right and left sides of the own vehicle out of the straight lines obtained by the Hough conversion, based on parallelism with a presumption locus of the own vehicle calculated based on distance data detected by the image detection section, a distance from a road line detected last time, and a distance from a road line presumed from an opposite road line detected last time.

14. The road line recognition apparatus according to claim 13, wherein the road line straight line detection processing unit of the detection section detects only one of straight lines, each detected as the straight line proper to the road line on the right side and the left side of the own vehicle, as the straight line proper to the road line based on each counted value on the Hough plane of each straight line, the parallelism with the presumption locus of the own vehicle calculated based on the distance data detected by the image detection section, and a displacement quantity from a road line position detected last time when a road width in the real space of the straight lines detected on the right side and the left side of the own vehicle is not within a predetermined range, or the parallelism of the straight lines is worse than a set threshold value.

15. The road line recognition apparatus according to claim 1,
wherein the road line detection processing unit of the detection section converts the number of pixels between the road line positions on the right side and the left side to a road width in the real space based on distance data, and calculates a maximum value and a minimum value of the road width based on the converted road width when the road line positions on both of the right and the left sides are detected at time of recording the road line positions of the road line candidate points indicating the road line, out of the road line candidate points using the straight line detected on each of the right and the left sides of the own vehicle as a reference.

16. The road line recognition apparatus according to claim 1,
wherein the road line detection processing unit of the detection section is shifting a horizontal line of the image on one side upward by one pixel while recording a road line candidate point as the road line position when displacement in a vertical direction and a horizontal direction between a road line candidate point detected on an upper horizontal line after the road line positions detected on the horizontal line based on the detected straight lines have reached a predetermined number and the last detected road line position is severally within a predetermined value.

17. The road line recognition apparatus according to claim 15,
wherein the road line detection processing unit of the detection section is shifting a horizontal line of the image on one side upward by one pixel while recording a road line candidate point as the road line position when displacement in a vertical direction and a horizontal direction between a road line candidate point detected on an upper horizontal line after the road line positions detected on the horizontal line based on the detected straight lines have reached a predetermined number and the last detected road line position is severally within a predetermined value, and when the road width in the real space converted from the number of pixels between the road line positions on the right side and the left side is out of a range from the minimum value to the maximum value, the road line detection processing unit detects a road line on which a road line position having higher parallelism with the presumption locus of the own vehicle as a road line to be set as the reference.

18. The road line recognition apparatus according to claim 17,
wherein the road line detection processing unit of the detection section detects a road line on which a road line position having lower parallelism with the presumption locus of the own vehicle as a road line at a road line branching when the road width in the real space converted form the number of pixels between the road line positions on the right side and the left side exceeds the maximum value, and calculates a position in the real space of a road line position at which the calculated road width first exceeds the maximum value, and further calculates a distance from the own vehicle to the road line position to detect the calculated distance as a distance where the road line branching starts.

19. The road line recognition apparatus according to claim 17,
wherein the road line detection processing unit of the detection section detects a road line on which a road line position having lower parallelism with the presumption locus of the own vehicle as a road line at a road line joining when the road width in the real space converted form the number of pixels between the road line positions on the right side and the left side is lower than the minimum value, and calculates a position in the real space of a road line position at which the calculated road width first becomes lower than the minimum value, and further calculates a distance from the own vehicle to the road line position to detect the calculated distance as a distance where the road line joining starts.

20. The road line recognition apparatus according to claim 1,
wherein the road line detection processing unit of the detection section calculates distances between road line positions belonging to a detected road line to detect whether the road line is a continuous line or a broken line, and characterizes information of the detected road line or information of the road line positions as the continuous line or the broken line to output the information.

21. The road line recognition apparatus according to claim 1,
wherein the road line candidate point detection and conversion processing unit detects a pixel on the image on one side as a road line candidate point based on the luminance and the distance of each pixel with regard to the image on one side, and performs the Hough conversion of the road line candidate point, the pixel detected as the road line candidate having the luminance and a derivative value of luminance being larger than a predetermined first start point luminance threshold value and first start point edge strength threshold value, respectively.

22. The road line recognition apparatus according to claim 21, wherein the road line candidate point detection and conversion processing unit of the detection section searches a horizontal line of the image on one side, and when a pixel portion is found in which luminance values are equal to or more than a second start point luminance threshold value which is larger than the first start point luminance threshold value and derivative values of luminance is equal to or more than a second start point edge strength threshold value and further average luminance of a high luminance pixel portion corresponding to a road line is equal to or more than a predetermined first road line average luminance threshold value, the road line candidate point detection and conversion processing unit deletes road line candidate points corresponding to a pixel portion in which average luminance of an already detected high luminance pixel portion is smaller than the first road line average luminance threshold value, and saves road line candidate points corresponding to the newly found pixel portion to set as an object of the Hough conversion.

23. The road line recognition apparatus according to claim 21, wherein the road line candidate point detection and conversion processing unit of the detection section searches a horizontal line of the image on one side from a start point capable of being the road line candidate point, and when pixels, at each of which a derivative value of luminance is not more than a predetermined end point edged strength threshold value or a luminance value is smaller than a luminance value of the start point, are not detected, despite searching, up to the number of the pixels, the number corresponding to a road line width threshold value set according to a distance from the own vehicle on the real space of the horizontal line and a road line width, the road line candidate point detection and conversion processing unit does not set the start point as a road line candidate point and does not set it as an object of the Hough conversion.

24. The road line recognition apparatus according to claim 21,
wherein the road line candidate point detection and conversion processing unit of the detection section searches a horizontal line of the image on one side from a start point capable of being the road line candidate point, and detects a pixel at which a derivative value of luminance is not more than a predetermined end point edged strength threshold value or a luminance value is smaller than a luminance value of the start point as an end point, and further when a difference between average luminance of pixels from the start point to the end point and road surface luminance is smaller than a predetermined second road line average threshold value, the road line candidate point detection and conversion processing unit does not set the start point as a road line candidate point, and does not set it as an object of the Hough conversion.

25. The road line recognition apparatus according to claim 24,
wherein, when the derivative value of luminance at the start point is smaller than a third start point edge strength threshold value which is set to a value larger than the first start point edge strength threshold value, and the number of the pixels from the start point to the end point is larger than a second road line width threshold value set correspondingly to an ordinary road line width based on a distance from the own vehicle on the real space of the horizontal line and a road line width, the road line candidate point detection and conversion processing unit of the detection section sets the second road line width average luminance threshold value to a higher value, and compares the difference between the average luminance of the pixels from the start point to the end point and the road surface luminance with the second road line average luminance threshold value.

26. The road line recognition apparatus according to claim 24,
wherein when the derivative value of luminance at the start point is not smaller than a third start point edge strength value which is set to a value larger than the first start point edge strength threshold value, and a number of the pixels from the start point to the end point is not larger than a second road line width threshold value set correspondingly to an ordinal road line width based on a distance from the own vehicle on the real space of the horizontal line and a road line width, the road line candidate point detection and conversion processing unit of the detection section sets the second road line width average luminance threshold value to a lower value, and compares the difference between the average luminance of the pixels from the start point to the end point and the road surface luminance with the second road line average luminance threshold value.

* * * * *